(12) United States Patent
Hong et al.

(10) Patent No.: US 11,886,670 B2
(45) Date of Patent: Jan. 30, 2024

(54) FLEXIBLE DISPLAY DEVICE AND METHOD FOR DRIVING THE SAME

(71) Applicant: Samsung Display Co., Ltd., Yongin-si (KR)

(72) Inventors: Wonki Hong, Suwon-si (KR); Jongseo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/520,310

(22) Filed: Nov. 5, 2021

(65) Prior Publication Data

US 2022/0057875 A1   Feb. 24, 2022

Related U.S. Application Data

(63) Continuation of application No. 16/662,977, filed on Oct. 24, 2019, now Pat. No. 11,169,642, which is a (Continued)

(30) Foreign Application Priority Data

Apr. 24, 2015   (KR) .................. 10-2015-0058189

(51) Int. Cl.
*G06F 3/044* (2006.01)
*G06F 3/041* (2006.01)
*G06F 3/045* (2006.01)

(52) U.S. Cl.
CPC ............. *G06F 3/044* (2013.01); *G06F 3/045* (2013.01); *G06F 3/0414* (2013.01); *G06F 3/04166* (2019.05); *G06F 2203/04102* (2013.01)

(58) Field of Classification Search
CPC .............................................. G06F 3/041–048
See application file for complete search history.

(56) References Cited

U.S. PATENT DOCUMENTS 7,289,083 B1 * 10/2007 Canova, Jr. ........... G06F 1/1656
345/5
8,665,236 B2    3/2014 Myers
(Continued)

FOREIGN PATENT DOCUMENTS

KR     10-2010-0065418 A     6/2010
KR     10-2010-0103095 A     9/2010
(Continued)

OTHER PUBLICATIONS

Office action issued in related Korean Application No. 10-2015-0058189 dated Apr. 30, 2021, 4 pages.

*Primary Examiner* — Roy P Rabindranath
(74) *Attorney, Agent, or Firm* — Lewis Roca Rothgerber Christie LLP

(57) ABSTRACT

A flexible display device includes a bendable touch display panel, a touch detector, a screen divider, and a panel driver. The touch display panel includes at least one touch sensor. The touch detector detects a curved portion of the touch display panel and touch information corresponding to a touch applied to the touch display panel based on a sensing result from the at least one touch sensor. The screen divider divides a display area of the touch display panel into a plurality of divided areas with respect to the curved portion, and defines the divided areas as a display divided area and a non-display divided area, respectively, based on the touch information. The panel driver activates at least a portion of the display divided area and deactivate the non-display divided area.

18 Claims, 43 Drawing Sheets

Related U.S. Application Data continuation of application No. 14/973,775, filed on Dec. 18, 2015, now Pat. No. 10,481,720.

(56) References Cited

U.S. PATENT DOCUMENTS

| | | | |
|---|---|---|---|
| 8,803,797 B2 | 8/2014 | Scott et al. | |
| 2008/0303782 A1 | 12/2008 | Grant et al. | |
| 2010/0141605 A1* | 6/2010 | Kang | G06F 3/0487 345/174 |
| 2011/0187674 A1* | 8/2011 | Baker | G01L 1/10 345/173 |
| 2012/0038613 A1 | 2/2012 | Choi | |
| 2013/0222416 A1* | 8/2013 | Kim | G09G 3/20 345/173 |
| 2013/0278624 A1 | 10/2013 | Abe | |
| 2014/0104166 A1 | 4/2014 | Kim | |
| 2014/0247252 A1* | 9/2014 | Lee | G06F 1/1652 345/204 |
| 2014/0327630 A1 | 11/2014 | Burr et al. | |
| 2015/0116608 A1* | 4/2015 | Jeong | G06F 3/04166 349/12 |
| 2015/0261259 A1 | 9/2015 | Endo et al. | |
| 2016/0188142 A1* | 6/2016 | Oh | G06F 1/3265 345/87 |
| 2016/0328042 A1* | 11/2016 | Chang | G06F 3/0446 |
| 2017/0038905 A1* | 2/2017 | Bijamov | G06F 3/0416 |

FOREIGN PATENT DOCUMENTS

| | | |
|---|---|---|
| KR | 10-2012-0015890 A | 2/2012 |
| KR | 10-2014-0058977 A | 5/2014 |
| KR | 10-2014-0108971 A | 9/2014 |

* cited by examiner

* A : A1, A2

* A' : A1', A2'

\* A : A1, A2

FLEXIBLE DISPLAY DEVICE AND METHOD FOR DRIVING THE SAME

CROSS-REFERENCE TO RELATED APPLICATIONS

This application is a continuation of U.S. patent application Ser. No. 16/662,977, filed Oct. 24, 2019, which is a continuation of U.S. patent application Ser. No. 14/973,775, filed Dec. 18, 2015, now U.S. Pat. No. 10,481,720, which claims priority to and the benefit of Korean Patent Application No. 10-2015-0058189, filed on Apr. 24, 2015, and entitled, "Flexible Display Device and Method for Driving the Same," the entire contents of each of which are incorporated herein by reference.

BACKGROUND

1. Field

One or more embodiments described herein relate to a flexible display device and a method of driving a flexible display device.

2. Description of the Related Art

A flexible display device can bend or fold. To allow for this range of movement, a flexible display device may use a plastic film instead of a glass substrate. The plastic film allows the device to be thinner and lighter in weight and to assume various shapes.

SUMMARY

In accordance with one or more embodiments, a flexible display device includes a bendable touch display panel including at least one touch sensor; a touch detector to detect a curved portion of the touch display panel and touch information corresponding to a touch applied to the touch display panel based on a sensing result from the at least one touch sensor; a screen divider to divide a display area of the touch display panel into a plurality of divided areas with respect to the curved portion and to define the divided areas as a display divided area and a non-display divided area, respectively, based on the touch information; and a panel driver to activate at least a portion of the display divided area and deactivate the non-display divided area.

The touch information may include at least one of an area of touches applied to the divided areas or a number of the touches applied to the divided areas. The screen divider may define one of the divided areas to which a touch of a relatively smaller area is applied as the display divided area, and another one of the divided areas to which a touch of a relatively greater area is applied as the non-display divided area.

The screen divider may define one of the divided areas to which a relatively smaller number of touches is applied as the display divided area, and another one of the divided areas to which a relatively greater number of touches are applied as the non-display divided area.

The touch detector may detect the curved portion based on the sensing result from the at least one touch sensor in a first period, and the touch information based on the sensing result from the at least one touch sensor in a second period. The first period and the second period may be included in a single frame.

When the sensing result from the at least one touch sensor has a value in a predetermined first range, the touch detector may detect the touch information based on the sensing result, and when the sensing result from the at least one touch sensor has a value in a predetermined second range, the touch detector may detect the curved portion based on the sensing result.

The flexible display device may include a plurality of touch sensors and the panel driver may drive at least one of touch sensors in the display divided area and may stop a driving operation of touch sensors in the non-display divided area.

When the curved portion is substantially parallel to a data line of the touch display panel, the panel driver may drive at least one of data lines in the display divided area and may stop a driving operation of each of data lines in the non-display divided area.

When the curved portion is substantially parallel to a gate line of the touch display panel, the panel driver may drive at least one of gate lines in the display divided area and may stop a driving operation of each of gate lines in the non-display divided area.

When the curved portion intersects each of gate lines of the touch display panel and intersects at least one of data lines of the touch display panel, the panel driver may drive at least one of data lines in the display divided area and not intersecting the curved portion and may stop a driving operation of each of data lines in the non-display divided area.

When the curved portion intersects each of the data lines of the touch display panel and intersects at least one of the gate lines of the touch display panel, the panel driver may drive at least one of gate lines in the display divided area and not intersecting the curved portion and may stop a driving operation of each of gate lines in the non-display divided area.

The at least one touch sensor may be one of a resistive touch sensor, a capacitive touch sensor, or a force sensor. The force sensor may be at least one of a piezo sensor, a polyvinylidene fluoride sensor and a piezoresistive sensor.

The panel driver may include a gate driver connected to the gate line of the touch display panel; a data driver connected to the data line of the touch display panel; a sensor driver connected to the touch sensing element; a timing controller to control a driving operation of the gate driver, the data driver, and the sensor driver based on a detected result from the touch detector; and a power supplier to generate power for the driving operation of the touch display panel, gate driver, data driver, sensor driver, and timing controller.

In accordance with one or more other embodiments, a method for driving a flexible display device includes detecting a curved portion of a touch display panel and touch information corresponding to a touch applied to the touch display panel based on a signal output from at least one touch sensor; dividing a display area of the touch display panel into a plurality of divided areas with respect to the curved portion; defining the divided areas as a display divided area and a non-display divided area, respectively, based on the touch information; and activating at least a portion of the display divided area and deactivating the non-display divided area. The touch information may include at least one of an area of touches applied to each of the divided areas or a number of touches applied to each of the divided areas.

Defining the display divided area and the non-display divided area may include defining a divided area to which a touch of a relatively smaller area is applied as the display divided area; and defining a divided area to which a touch of a relatively greater area is applied as the non-display divided area.

When the curved portion intersects each of gate lines of the touch display panel and intersects at least one of data lines of the touch display panel, activating the at least the portion of the display divided area and deactivating the non-display divided area may include driving at least one of data lines in the display divided area and not intersecting the curved portion; and stopping a driving operation of each of data lines in the non-display divided area.

When the curved portion intersects each of the data lines of the touch display panel and intersects at least one of the gate lines of the touch display panel, activating at least the portion of the display divided area and deactivating of the non-display divided area may include driving at least one of gate lines in the display divided area and not intersecting the curved portion; and stopping a driving operation of each of gate lines in the non-display divided area.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
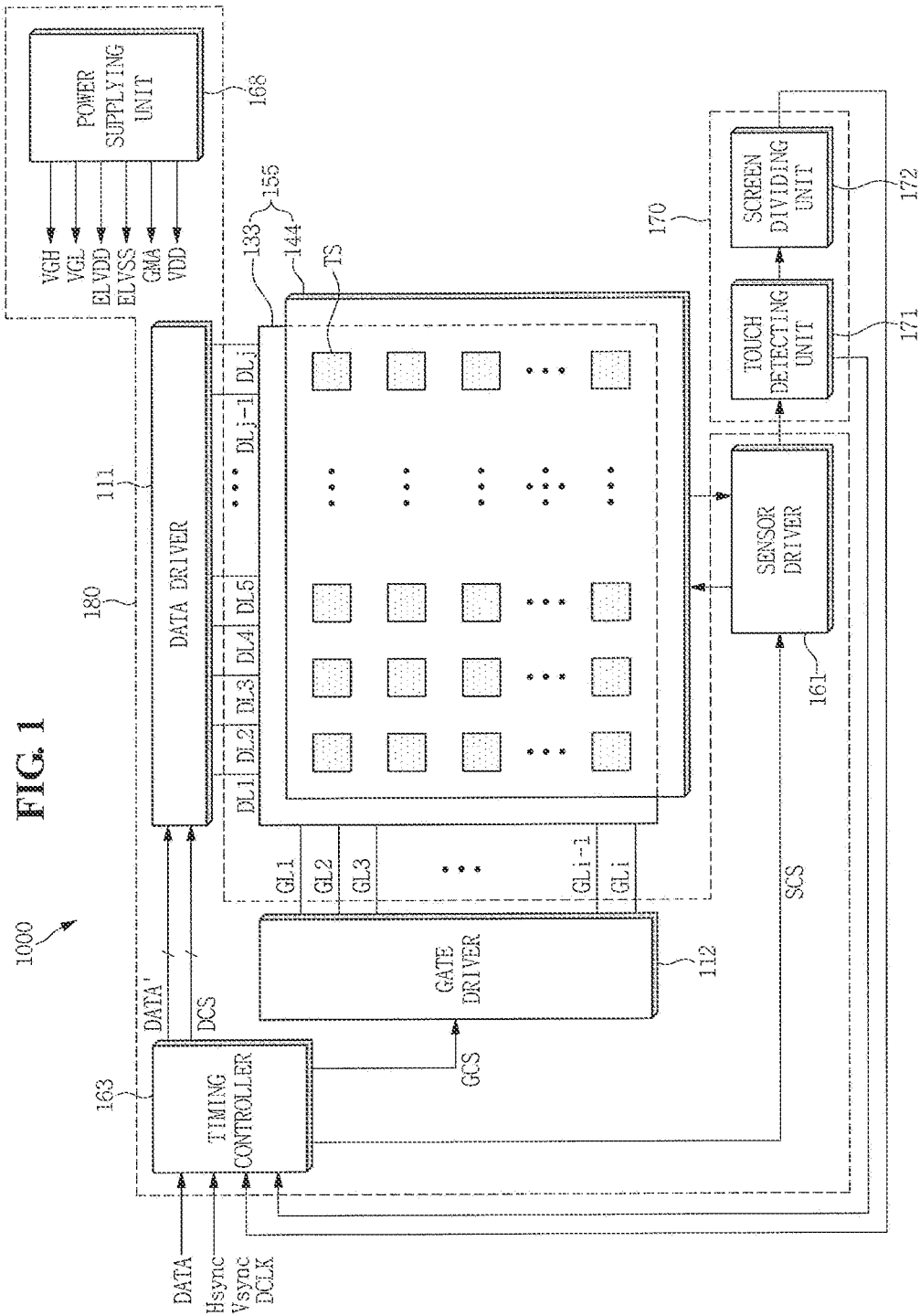
FIG. 1 is a block diagram illustrating a flexible display device according to one exemplary embodiment.

Example embodiments are described more fully hereinafter with reference to the accompanying drawings; however, they may be embodied in different forms and should not be construed as limited to the embodiments herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Figure 2:
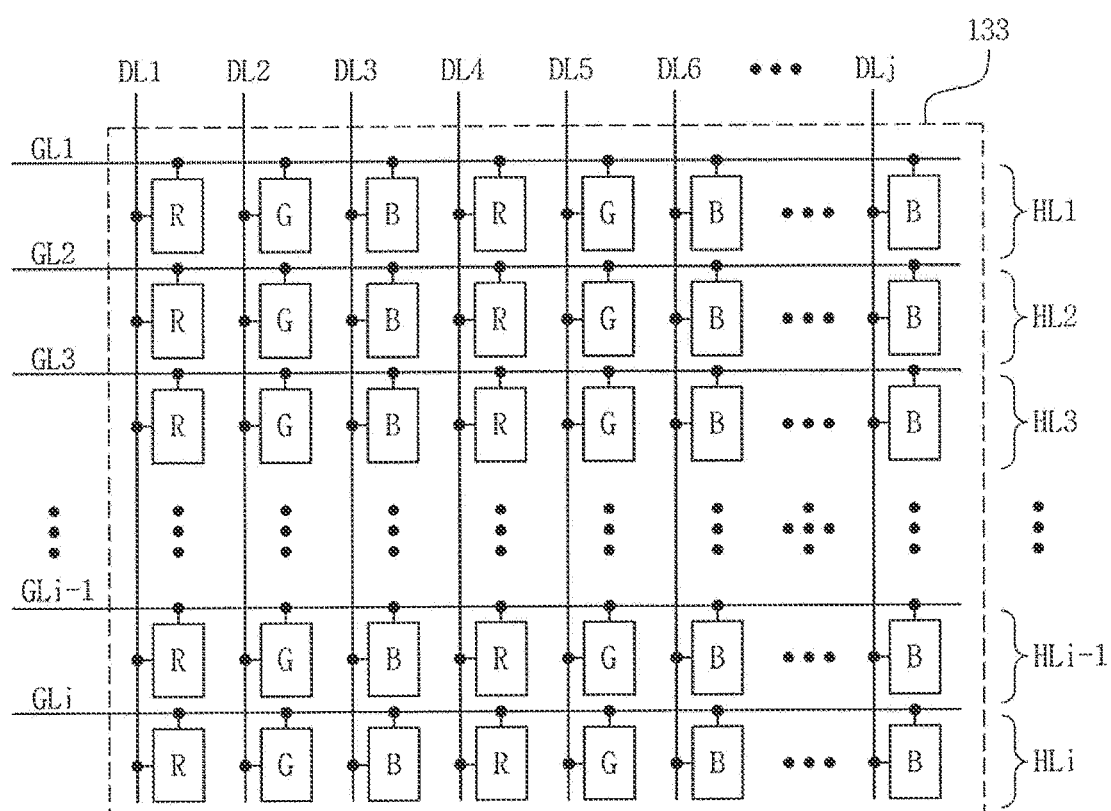
FIG. 2 is a detailed configuration view illustrating a display panel of FIG. 1.

FIG. 1 an embodiment of a flexible display device 1000, and FIG. 2 illustrates an embodiment of a display panel 133 in FIG. 1.

As illustrated in FIG. 1, the flexible display device 1000 includes a touch display panel 155, a touch control unit 170, and a panel driving unit 180 (or a panel driver). The touch display panel 155 includes at least one touch sensing element TS (or a touch sensor). The touch display panel 155 is bendable. An example of the disposition of a plurality of touch sensing elements TS is illustrated in FIG. 1.

The touch display panel 155 includes the display panel 133 and a touch panel 144. The display panel 133 includes i*j pixels R, G, and B, i gate lines GL1-GLi, and j data lines DL1-DLj (j is a natural number greater than 1). Herein, first to $i^{th}$ gate signals are applied to the first to $i^{th}$ gate lines GL1-GLi, respectively, and image data signals are applied to the first to $j^{th}$ data lines DL1-DLj, respectively. The display panel 133 may further include a first driving power line for supplying a first driving voltage ELVDD to the i*j pixels and a second driving power line for supplying a second driving voltage ELVSS to the i*j pixels.

As illustrated in FIG. 2, the pixels R, G, and B are arranged in a display area of the display panel 133 in a matrix form. The pixels R, G, and B include red pixels R to emit light of a red color, green pixels G to emit light of a green color, and blue pixels B to emit light of a blue color. The red, green, and blue pixels R, G, and B are adjacently disposed in a horizontal direction and may be considered to form a unit pixel for displaying light corresponding to one unit of an image.

J pixels arranged along an $n^{th}$ (n is one selected from 1 to i) horizontal line (hereinafter "$n^{th}$ horizontal line pixels") are connected to the first to the $j^{th}$ data lines DL1-DLj, respectively. Further, the $n^{th}$ horizontal line pixels are connected to the $n^{th}$ gate line together. Accordingly, the $n^{th}$ horizontal line pixels receive an $n^{th}$ gate signal together. For example, while the j pixels arranged in the same horizontal line each receive the same gate signal, pixels arranged in different horizontal lines receive different gate signals, respectively. For example, each of the red pixel R and the green pixel G on the first horizontal line HL1 receive a first gate signal. The red pixel R and the green pixel G on the second horizontal line HL2 receive a second gate signal that is output at a timing different from an output timing of the first gate signal.

The touch panel 144 includes at least one touch sensing element TS. The touch sensing element TS may be embedded in the touch panel 144 In one embodiment, a single touch sensing element TS may correspond to k pixels, where k is a natural number. The touch panel 144 may be above or below the display panel 133.

When a touch is applied to the touch sensing element TS, the touch sensing element TS generates a touch sensing signal. The touch sensing element TS may generate the touch sensing signal to have a magnitude which varies according to the magnitude of the touch. For example, the touch sensing element TS may generate a touch sensing signal having a magnitude proportional, or inversely proportional, to the pressure of the touch. For example, the touch sensing signal from the touch sensing element TS may have a value in a predetermined first range or may have a value in a predetermined second range. Further, the touch sensing signal may have a value out of the first range and the second range. The touch sensing signal is input to the touch control unit 170.

The touch sensing element TS may be, for example, a force sensor, e.g., at least one of a piezo sensor, a polyvinylidene fluoride, sensor and a piezoresistive sensor.

In one embodiment, the separate touch panel 144 may not be included. In this case, the display panel 133 may perform the function of the touch panel 144 and a display function. In this case, the touch sensing element TS and a related elements for driving the touch sensing element TS may be embedded in the display panel 133.

The touch control unit 170 detects the position of a curved portion in the touch display panel 155 and touch information relating to a touch applied to the touch display panel 155 based on the sensing result from the touch sensing element TS. The touch control unit 170 may control the display area of the touch display panel 155 to be divided into a plurality of areas based on the detection result.

The touch control unit 170 may include a touch detecting unit 171 (or a touch detector) and a screen dividing unit 172 (or a screen divider). The touch detecting unit 171 detects the position of the curved portion in the touch display panel 155 and the touch information about the touch applied to the touch display panel 155 based on the sensing result from the touch sensing element TS. The touch information may include, for example, at least one of an area of touches applied to each of the divided areas or the number of the touches.

The screen dividing unit 172 divides the display area of the touch display panel 155 into a plurality of divided areas with respect to the curved portion, and defines the plurality of divided areas as a display divided area and a non-display divided area, respectively, based on the touch information. For example, when the touch display panel 155 is divided into two divided areas with respect to the curved portion, one of the divided areas may be defined as a display divided area and the other of the divided areas may be defined as a non-display divided area, based on the touch information.

The position information corresponding to the curved portion and the touch information generated in the touch detecting unit 171 and the information corresponding to the display divided area and the non-display divided area generated in the screen dividing unit 172 are applied to the panel driving unit 180.

The panel driving unit 180 activates at least a portion of the display divided area and deactivates the non-display divided area based on the information from the touch detecting unit 171 and the screen dividing unit 172. An image may be displayed on at least portion of the displaying area which is activated, and an image may not be displayed on a portion of the display divided area which is deactivated.

The panel driving unit 180 includes a timing controller 163, a gate driver 112, a data driver 111, a sensor driver 161, and a power supplying unit 168. The timing controller 163 corrects externally applied image data signals DATA based on the information from the touch detecting unit 171 and the screen dividing unit 172, and supplies the corrected image data signals DATA' to the data driver 111.

Further, the timing controller 163 generates a gate control signal GCS, a data control signal DCS, and a sensor control signal SCS based on a horizontal synchronization signal Hsync, a vertical synchronization signal Vsync, and a dot clock DCLK externally applied thereto. The data control signal DCS is a control signal for controlling a driving operation of the data driver 111, and the data control signal DCS is applied to the data driver 111. The gate control signal GCS is a control signal for controlling the gate driver 112, and the gate control signal GCS is applied to the gate driver 112. Further, the sensor control signal SCS is a control signal for controlling the sensor driver 161, and the sensor control signal SCS is applied to the sensor driver 161.

The gate driver 112 sequentially drives the pixels with respect to each horizontal line. For example, the gate driver 112 may divide the i*j pixels into j pixels and perform a sequential driving. In this case, the gate driver 112 may simultaneously drive the j pixels in a single horizontal line. To this end, the gate driver 112 sequentially outputs the first to $i^{th}$ gate signals according to the gate control signal GCS from the timing controller 163. The $n^{th}$ horizontal line pixels may be controlled by the $n^{th}$ gate signal. The $n^{th}$ gate signal is a pulse signal which is maintained in an activated state in an $n^{th}$ horizontal period at each frame and is maintained in a deactivated state in other periods. The i gate signals each are a pulse signal having the same form, but have different output points in time, respectively.

An activated state of a predetermined signal including the gate signal may refer to a state in which a switching element that receives the signal in the activated state is turned on. On the other hand, a deactivated state of a predetermined signal including the gate signal may refer to a state in which a switching element that receives the signal in the deactivated state may be turned off. For example, the first to $i^{th}$ gate signals each have a voltage of 20[V] in the activated state and have a voltage of −5[V] in the deactivated state.

The data driver 111 samples the corrected image data signals DATA' according to the data control signal DCS from the timing controller 163, latches the sampled image data signals corresponding to one horizontal line every horizontal period, and supplies the latched image data signals to the data lines DL1-DLj. In this case, the data driver 111 converts the image data signals DATA' from the timing controller 163 to analog signals (e.g., data voltages) using a gamma voltage GMA applied from the power supplying unit 168, and supplies the converted image data signals, which are analog signals, to the data lines DL1-DLj.

The sensor driver 161 drives the touch sensing element TS and reads the sensing result, that is, a touch sensing signal, from the touch sensing element T which is driven. In order to drive the touch sensing element TS, the sensor driver 161 generates a driving signal having a pulse form and supplies the driving signal to touch sensing element TS.

When a plurality of touch sensing elements TS are provided as illustrated, for example, in FIG. 1, the sensor driver 161 drives the touch sensing elements TS sequentially. For example, the sensor driver 161 sequentially supplies the driving signals to the touch sensing elements TS through driving lines connected to respective touch sensing elements TS. Accordingly, the touch sensing elements TS are sequentially driven one by one. The touch sensing elements TS that are driven generate a touch sensing signal sequentially. In this case, the sensor driver 161 reads the touch sensing signals through a plurality of read-out lines connected to the touch sensing elements TS, respectively.

The power supplying unit 168 increases or decreases a driving power that is externally applied, and generates a power for driving the touch display panel 155, the timing controller 163, the gate driver 112, the data driver 111, and the sensor driver 161. The power supplying unit 168 may include, for example, an output switching element for switching an output voltage of an output terminal thereof, and a pulse width modulator PWM for adjusting a duty ratio or a frequency of a control signal applied to a control terminal of the output switching element so as to increase or decrease the output voltage.

The power supplying unit 168 may include a pulse frequency modulator PFM, in lieu of the pulse width modulator PWM. The pulse width modulator PWM increases the duty ratio of the aforementioned control signal to increase the output voltage of the power supplying unit 168 or decreases the duty ratio of the control signal to lower the output voltage of the power supplying unit 168. The pulse frequency modulator PFM increases the frequency of the aforementioned control signal to increase the output voltage of the power supplying unit 168 or decreases the frequency of the control signal to lower the output voltage of the power supplying unit 168.

The power supplying unit 168 generates various power signals including, for example, a reference voltage VDD, the gamma voltage GMA, a first driving voltage ELVDD, a second driving voltage ELVSS, a gate high voltage VGH, and a gate low voltage VGL. The gamma voltage GMA is a voltage generated by voltage division of the reference voltage VDD. The reference voltage VDD and the gamma reference voltage GMA correspond to an analog gamma voltage, and they are provided to the data driver 111. The gate high voltage VGH is a high logic voltage of the gate signal, which is set to be a threshold voltage of a switching element of the pixel (e.g., a driving switching element of FIG. 3) or more. The gate low voltage VGL is a low logic voltage of the gate signal, which is set to be an off voltage of the switching element. The gate high voltage VGH and the gate low voltage VGL are applied to the gate driver 112.

Figure 3:
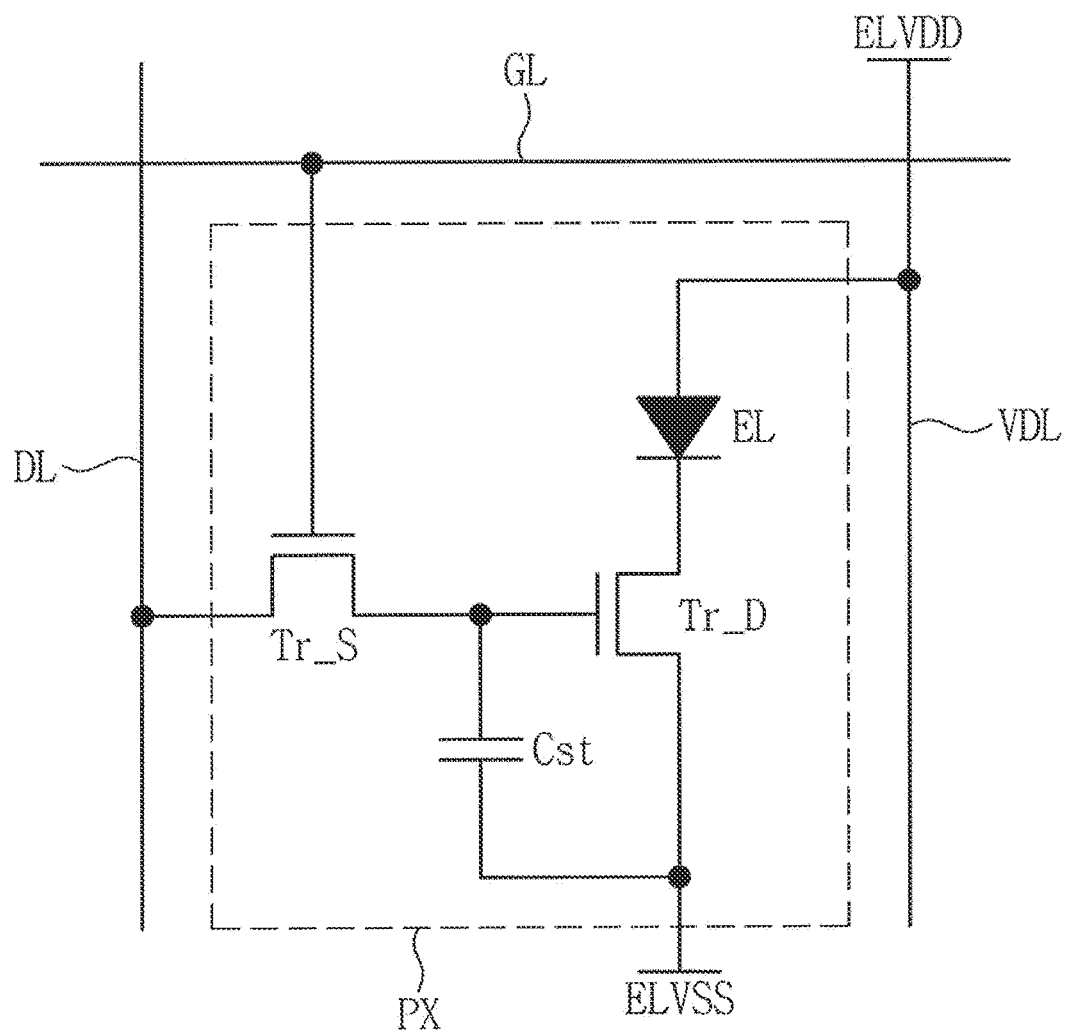
FIG. 3 is a view illustrating a circuit configuration of a pixel of FIG. 2.

FIG. 3 illustrating an embodiment of a pixel circuit PXn, which, for example, may correspond to the pixels R, G, and B in FIG. 2. In another embodiment, one or more of the pixels R, G, and B may have a different circuit configuration.

As illustrated in FIG. 3, the pixel PXn includes a driving switching element Tr_DR, a data switching element SW_data, a storage capacitor Cst, and a light emitting element EL. The driving switching element Tr_D is controlled by a signal applied to its gate electrode, and is connected between a cathode electrode of the light emitting element EL and a second driving power line VSL which transmits a second driving voltage ELVSS. The driving switching element Tr_D adjusts an amount (e.g., density) of a driving current flowing from the first driving power line VDL to the second driving power line VSL based on the magnitude of the signal to its gate electrode.

The data switching element Tr_S is controlled by the gate signal from the gate line GLn and is connected between the data line DL and the gate electrode of the driving switching element Tr_D.

The storage capacitor Cst is connected between the gate electrode of the driving switching element Tr_D and the second driving power line VSL. The storage capacitor Cst stores electric charges based on a voltage applied to the gate electrode of the driving switching element Tr_D.

The light emitting element EL emits light according to the driving current applied through the driving switching element Tr_D. The emitted light has different luminance values according to the magnitude of the driving current. An anode electrode of the light emitting element EL is connected to the first driving power line VDL which transmits the first driving voltage ELVDD. The light emitting element EL may be, for example, an organic light emitting diode.

Figure 4:
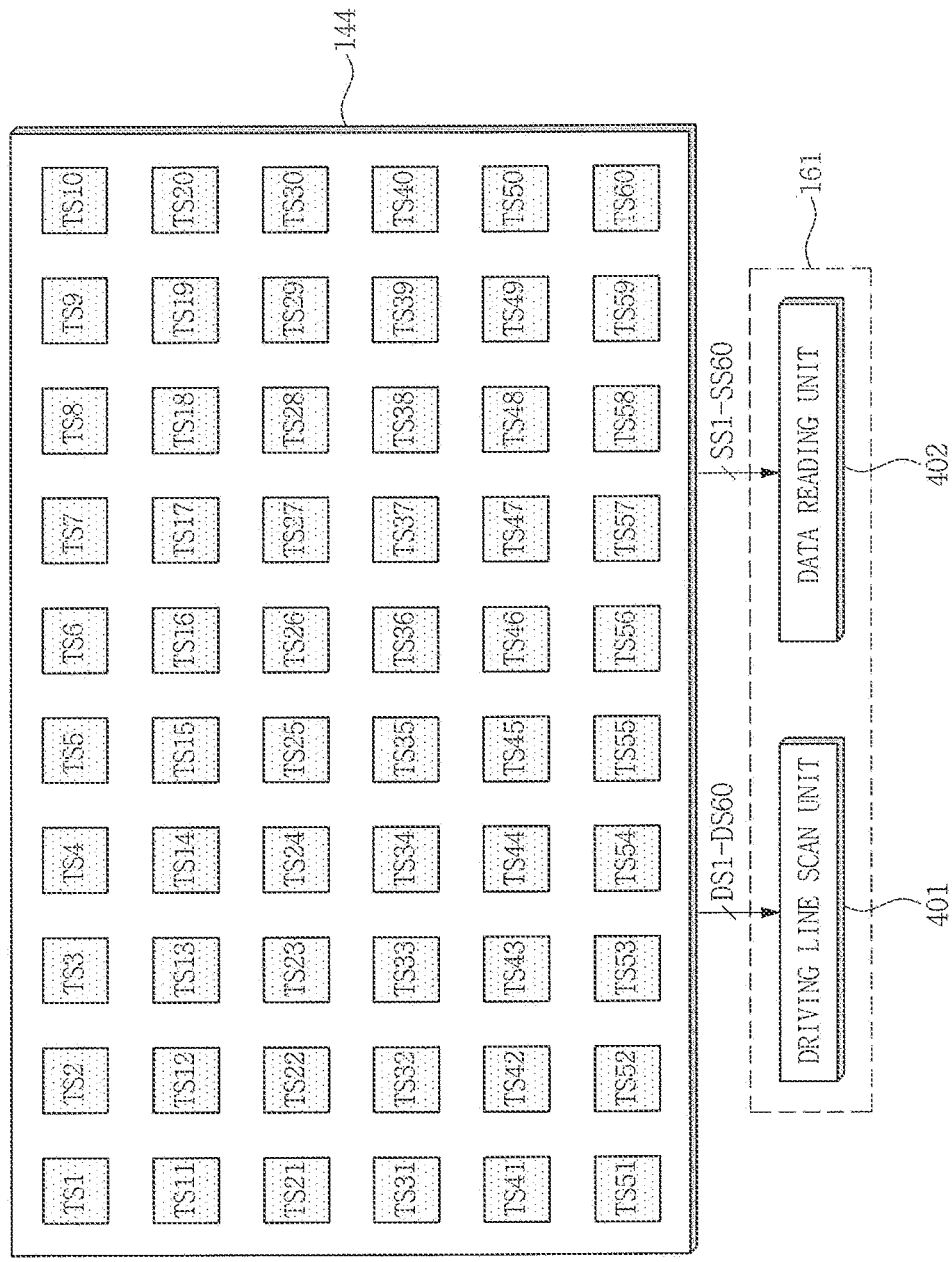
FIG. 4 is a detailed configuration view illustrating a touch panel and a sensor driver of FIG. 1.

FIG. 4 illustrating an embodiment of the touch panel 144 and the sensor driver 161 in FIG. 1, and FIG. illustrates an embodiment representative of the touch sensing elements TS in FIG. 4. As illustrated in FIG. 4, the touch panel 144 includes a plurality of touch sensing elements TS1-TS60. For example, the touch panel 144 may include sixty touch sensing elements arranged in a matrix form. The number of touch sensing elements in FIG. 4 is merely as example and may be a different number in another embodiment.

Figure 5:
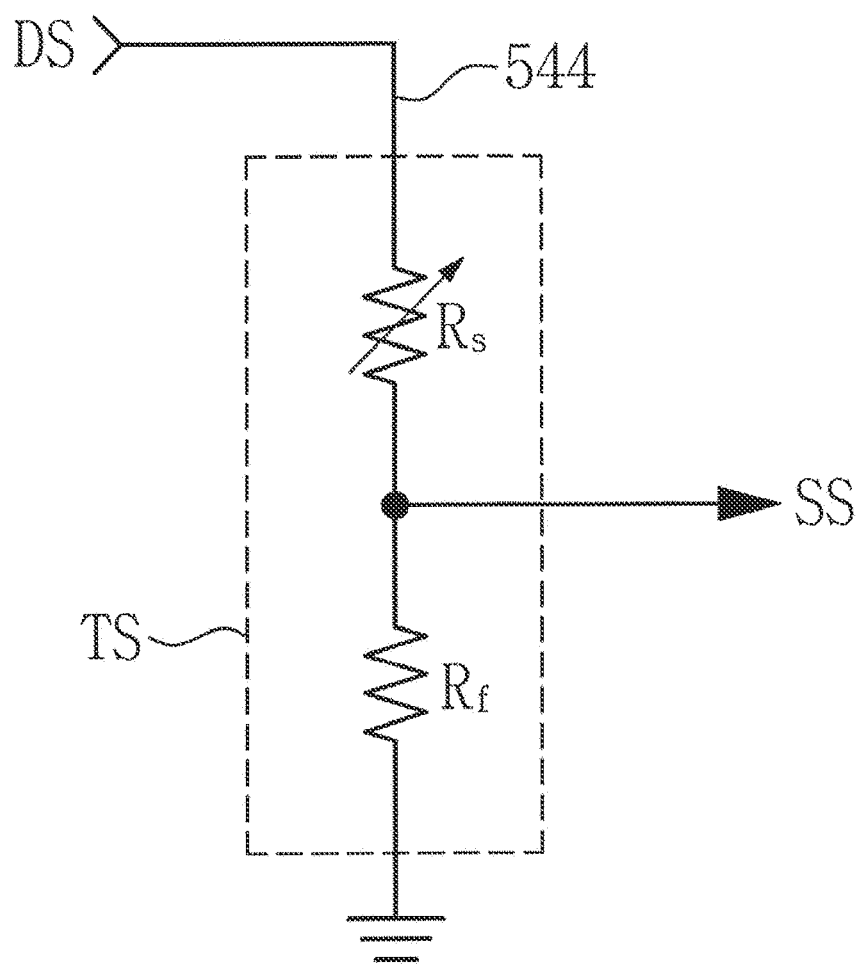
FIG. 5 is a detailed configuration view illustrating a touch sensing element of FIG. 4.

As illustrated in FIG. 5, the touch sensing element TS includes a sensing resistor Rs and a filter resistor Rf. The sensing resistor Rs and the filter resistor Rf serve to divide the driving signal DS so as to generate a touch sensing signal SS. The sensing resistor Rs is connected between a driving line 544 and the filter resistor Rf. The sensing resistor Rs is a variable resistor having a resistance value that varies depending on the pressure of an externally applied touch. The sensing resistor Rs, for example, may have a larger or maximum resistance value when the touch is absent, e.g., when the applied pressure is zero. The greatest resistance value may be, for example, infinity.

The filter resistor Rf is connected between the sensing resistor Rs and ground. The filter resistor Rf may have a constant resistance value.

When the driving signal DS is in the activated state, for example, when the driving signal DS has a high voltage, the driving signal DS may be divided based on a ratio of a resistance value of the sensing resistor Rs to a resistance value of the filter resistor Rf. The divided driving signal may be a voltage across opposite ends of the filter resistor Rf, which corresponds to the touch sensing signal SS.

A driving operation of the touch sensing element TS having the above described configuration will be described hereinbelow. When the driving signal DS is in the activated state (e.g., a predetermined direct current (DC) voltage having a positive polarity), the magnitude of the touch sensing signal from the touch sensing element TS is inversely proportional to the resistance value of the sensing resistor Rs. That is, as the resistance value of the sensing resistor Rs decreases, the magnitude of the touch sensing signal increases. In other words, as the pressure of the touch increases, the magnitude of the touch sensing signal increases.

When the driving signal DS is in the deactivated state, for example, when having a low voltage of 0 [V], the touch sensing signal SS has a value of 0 [V]. Accordingly, when the driving signal DS is in the deactivated state, the touch sensing element TS outputs a touch sensing signal having a value of 0 [V], regardless of the presence of the touch.

The sensing resistor Rs may have a smallest resistance value when a touch is absent. The smallest resistance value may be, for example, zero. In this case, the magnitude of the touch sensing signal from the touch sensing element TS is inversely proportional to the pressure of the touch. The first to sixtieth touch sensing elements TS1-TS60 in FIG. 4 may have the circuit configuration in FIG. 4. The touch sensing element TS may include, for example, a wheatstone bridge circuit.

The sensor driver 161 in FIG. 4 may include a driving line scan unit 401 and a data reading unit 402.

Figure 6:
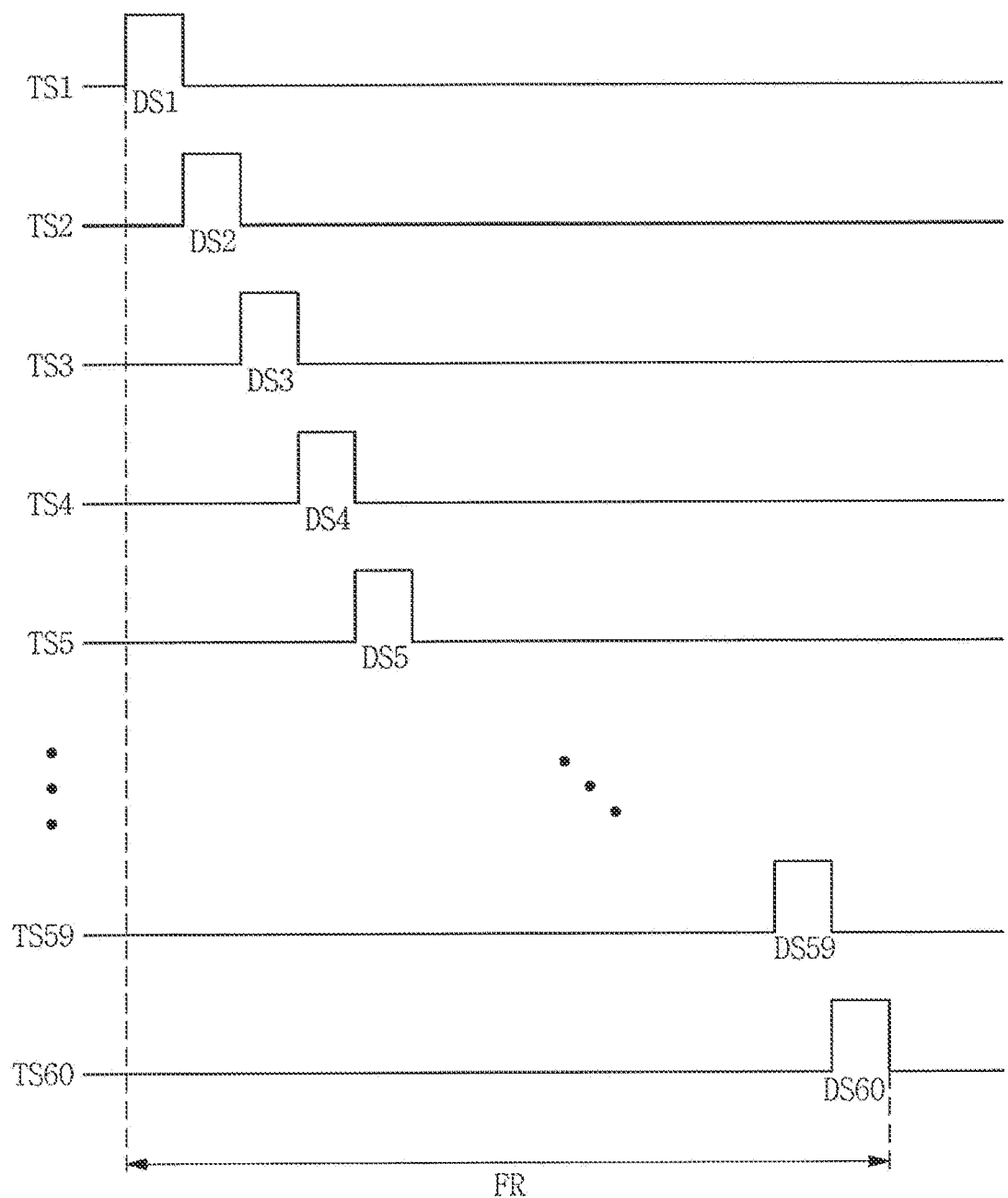
FIG. 6 is a timing diagram illustrating driving signals generated from a driving line scan unit of FIG. 4.

FIG. 6 is a timing diagram illustrating an example of driving signals generated from the driving line scan 401 unit in FIG. 4. As illustrated in FIG. 6, the driving line scan unit 401 outputs first to sixtieth driving signals DS1-DS60 sequentially. The first to sixtieth driving signals DS1-DS60 may be output in a single frame FR sequentially.

The first to sixtieth driving signals DS1-DS60 from the driving line scan unit 401 are applied to the first to sixtieth touch sensing elements TS1-TS60 through the first to sixtieth driving lines sequentially. The first to sixtieth touch sensing elements TS1-TS60 generate first to sixtieth touch sensing signals in response to the first to sixtieth driving signals DS1-DS60. The first to sixtieth touch sensing signals from the first to sixtieth touch sensing elements TS1-TS60 are input to the touch detecting unit 171 through first to sixtieth read-out lines, respectively.

The data reading unit 402 converts the first to sixtieth touch sensing signals, which are applied from the first to sixtieth read-out lines, to respective digital signals and stores the digital signals. The touch detecting unit 171 detects a curved portion and touch information based on the first to sixtieth touch sensing signals stored in the data reading unit 402.

Figure 7:
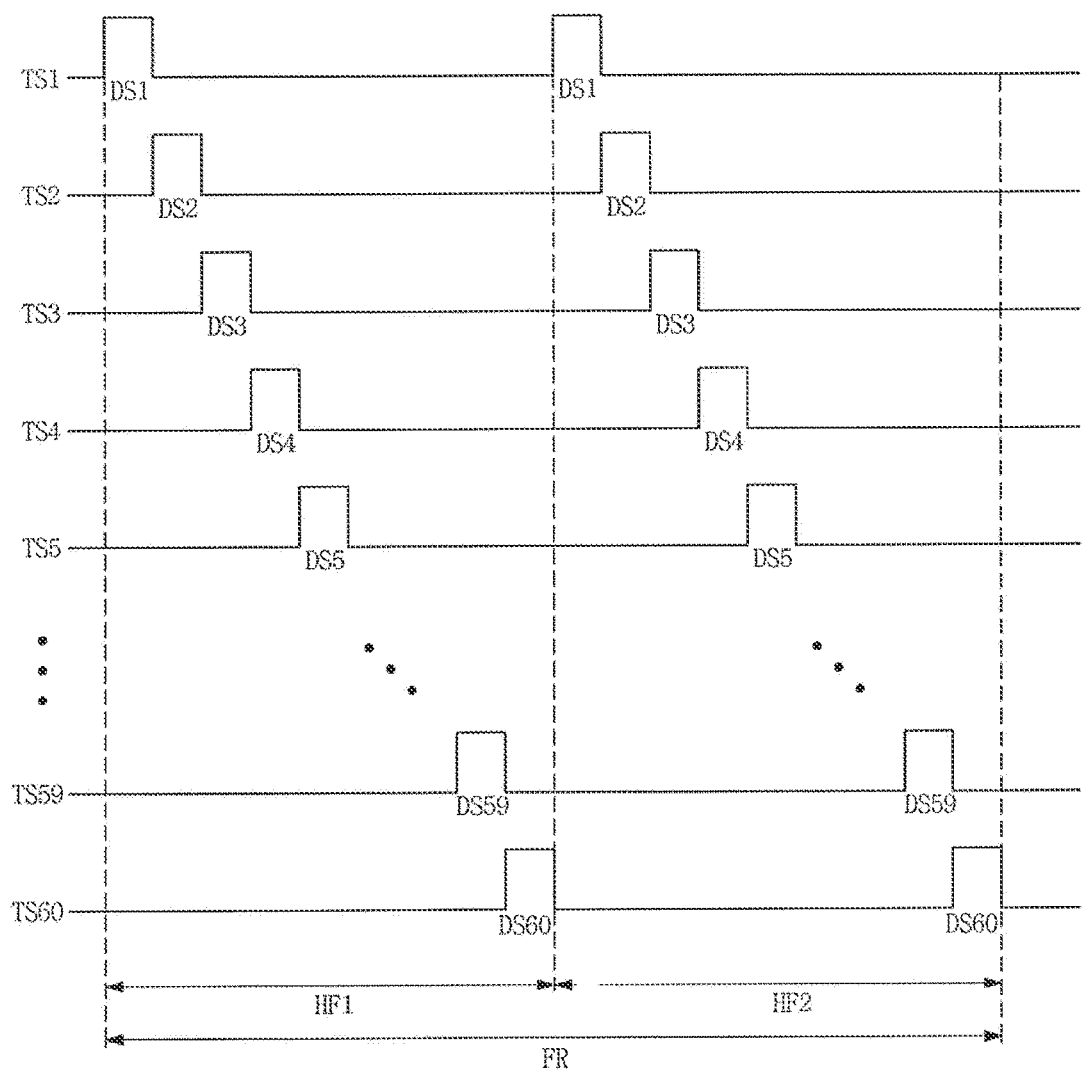
FIG. 7 is another timing diagram illustrating driving signals generated from the driving line scan unit of FIG. 4.

FIG. 7 is a timing diagram illustrating another example of driving signals generated from the driving line scan unit 401 of FIG. 4. As illustrated in FIG. 7, a single frame FR may be divided into a first half period HF1 and a second half period HF2.

The driving line scan unit 401 in FIG. 7 sequentially outputs the first to sixtieth driving signals DS1-DS60 in the first half period HF1, and then sequentially outputs the first to sixtieth driving signals DS1-DS 60 in the second half period HF2. Accordingly, a driving signal is output two times in a single frame FR.

In the first half period HF1, the first to sixtieth driving signals DS1-DS60 from the driving line scan unit 401 are sequentially applied to the first to sixtieth touch sensing elements TS1-TS60 through the first to sixtieth driving lines. Subsequently, in the second half period HF2, the first to sixtieth driving signals DS1-DS60 generated from the driving line scan unit 401 are sequentially applied to the first to sixtieth touch sensing elements TS1-TS60 through the first to sixtieth driving lines, respectively.

In the first half period HF1, the first to sixtieth touch sensing elements TS1-TS60 generate first to sixtieth touch sensing signals in response to the first to sixtieth driving signals DS1-DS60. Subsequently, in the second half period HF2, the first to sixtieth touch sensing elements TS1-TS60 generate first to sixtieth touch sensing signals in response to the first to sixtieth driving signals DS1-DS60.

In the first half period HF1, the first to sixtieth touch sensing signals generated from the first to sixtieth touch sensing elements TS1-TS60 are applied to the first to sixtieth read-out lines, respectively. Subsequently, in the second half period HF2, the first to sixtieth touch sensing signals generated from the first to sixtieth touch sensing elements TS1-TS60 are applied to the first to sixtieth read-out lines, respectively.

The data reading unit 402 converts the first to sixtieth touch sensing signals, which are applied from the first to sixtieth read-out lines, to respective digital signals and stores the digital signals. For example, the data reading unit 402 stores the first to sixtieth touch sensing signals, which are generated in the first half period HF1, in a first storing unit and stores the first to sixtieth touch sensing signals, which are generated in the second half period HF2, in a second storing unit. The first storing unit and the second storing unit may be different memories or may be different areas of a single memory.

The touch detecting unit 171 detects the curved portion and the touch information based on the first to sixtieth touch sensing signals stored in the data reading unit 402. For example, the touch detecting unit 171 may detect the curved portion based on the first to sixtieth touch sensing signals in the first half period HF1, and may detect the touch information based on the first to sixtieth touch sensing signals in the second half period HF2.

The length of the aforementioned first half period HF1 may be the same as or different from the length of the second half period HF2. For example, the length of the first half period HF1 associated with the curved portion, may be longer than the length of the second half period HF2 associated with the touch information.

The driving signals DS1-DS60 may be simultaneously output together. As an example, the first to sixtieth driving signals DS1-DS60 may be output simultaneously in the same period. In another example, the first to sixtieth driving signals DS1-DS60 may be output simultaneously in the first half period HF1, and the first to sixtieth driving signals DS1-DS60 may be output simultaneously in the second half period HF2.

Figure 8:
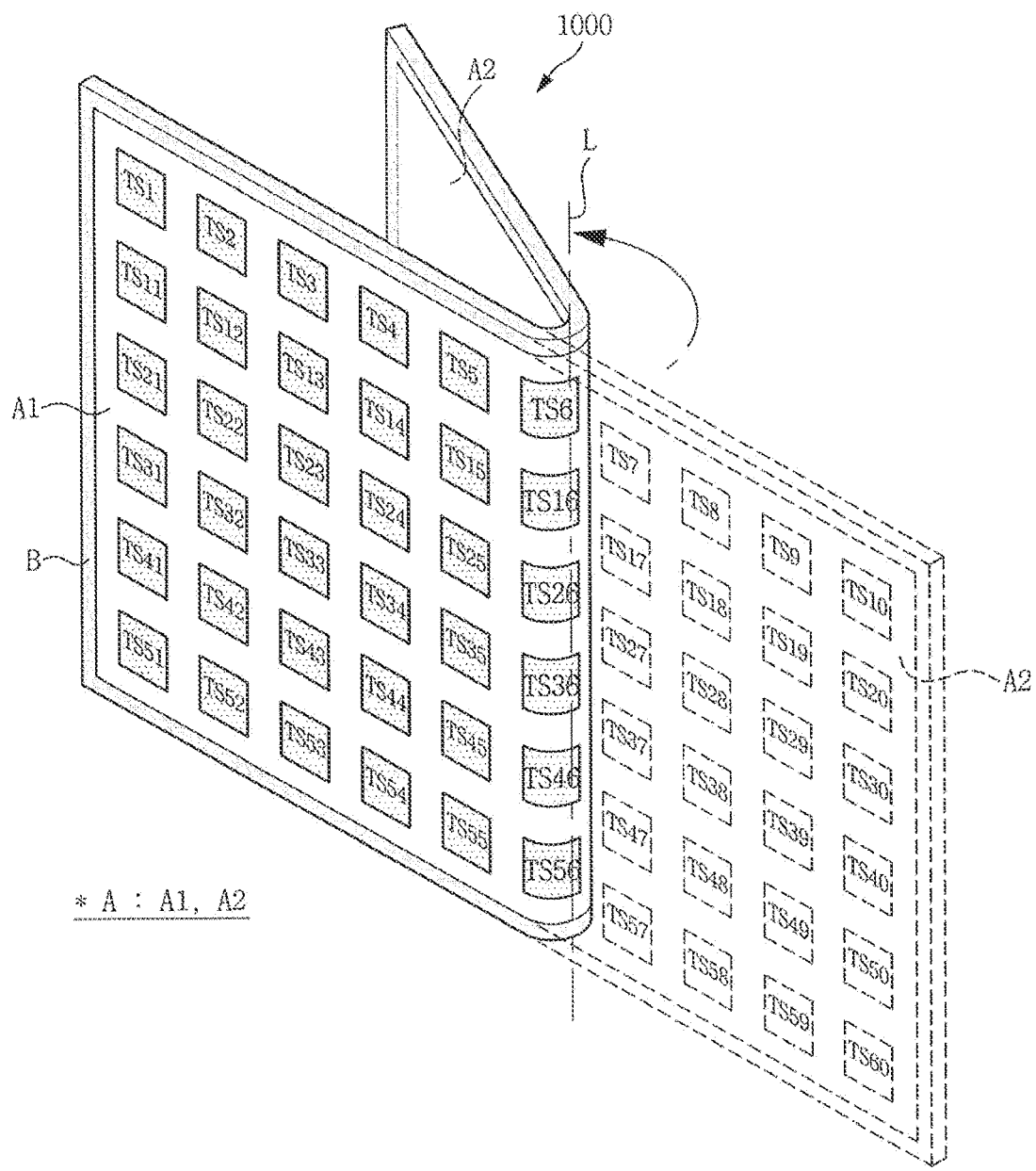
FIG. 8 is a view illustrating a state in which a flexible display device including elements of FIG. 1 is folded.

FIG. 8 illustrates an example of the flexible display device 1000 in a folded state. As illustrated in FIG. 8, a display panel 155 of the flexible display device 1000 includes a display area A and a non-display area B. Gate lines GL1-GL10 (refer, e.g., to FIG. 11), data lines DL1-DL14 (refer, e.g., to FIG. 11), touch sensing elements TS1-TS60, and pixels may be in the display area A. The panel driving unit 180 in FIG. 1 may be in the non-display area B.

As illustrated in FIG. 8, the flexible display device 1000 may be folded with respect to an imaginary straight line L. The imaginary straight line L may be substantially parallel to at least one data line and, in this example, may intersect each of the gate lines GL1-GL10.

The sixth, sixteenth, twenty-sixth, thirty-sixth, forty-sixth, and fifty-sixth touch sensing elements TS6, TS16, TS26, TS36, TS46, and TS56 disposed along the imaginary straight line L may be bent to a greater extent than the other touch sensing elements. Accordingly, the sixth, sixteenth, twenty-sixth, thirty-sixth, forty-sixth, and fifty-sixth touch sensing elements TS6, TS16, TS26, TS36, TS46, and TS56 may receive a greater pressure than the other touch sensing elements. As a result, the sixth, sixteenth, twenty-sixth, thirty-sixth, forty-sixth, and fifty-sixth touch sensing elements TS6, TS16, TS26, TS36, TS46, and TS56 may exhibit a resistance value different from a resistance value of the other touch sensing elements.

For example, when a touch sensing element has a resistance value inversely proportional to pressure, the sixth, sixteenth, twenty-sixth, thirty-sixth, forty-sixth, and fifty-sixth touch sensing elements TS6, TS16, TS26, TS36, TS46, and TS56 have a resistance value less than a resistance value of the other touch sensing elements. In this case, touch sensing signals generated from the sixth, sixteenth, twenty-sixth, thirty-sixth, forty-sixth, and fifty-sixth touch sensing elements TS6, TS16, TS26, TS36, TS46, and TS56 disposed along the imaginary straight line L may have a value greater than a value of the touch sensing signals generated from the other touch sensing elements.

For example, the touch sensing signals generated from the sixth, sixteenth, twenty-sixth, thirty-sixth, forty-sixth, and fifty-sixth touch sensing elements TS6, TS16, TS26, TS36, TS46, and TS56 may have values greater than a predetermined threshold upper limit. The touch sensing signals generated from the other touch sensing elements, which are not disposed on the imaginary straight line L, may have values smaller than the predetermined threshold upper limit.

The touch detecting unit 171 detects a curved portion of the touch display panel 155 based on the touch sensing signals from the touch sensing elements TS1-TS60. For example, the touch detecting unit 171 may define the curved portion as a portion of the display area A overlapping the imaginary straight line L, which intersects at least two of the sixth, sixteenth, twenty-sixth, thirty-sixth, forty-sixth, and fifty-sixth touch sensing elements TS6, TS16, TS26, TS36, TS46, and TS56 that generate touch sensing signals having values greater than the predetermined threshold upper limit. For example, a portion of the display area A overlapping the imaginary straight line L, which intersects the sixth touch sensing element TS6 and the fifth-sixth touch sensing element TS56 disposed farthest from each other in space, may be defined as the curved portion. In related exemplary embodiments, the curved portion will be represented by reference mark "L", which may be substantially parallel to at least one data line and which intersects each of the gate lines GL1-GL10.

When the position of the curved portion L is defined in the manner described hereinabove, the screen dividing unit 172 divides the display area A of the touch display panel 155 into a plurality of divided areas with respect to the curved portion L. For example, as illustrated in FIG. 8, the display area A may be divided into two divided areas A1 and A2 with respect to the single curved portion L. When one of the divided areas is defined as a first divided area A1 and the other of the divided areas is defined as a second divided area A2, the second divided area A2 may be rotated by about 180 degrees with respect to the curved portion L as an axis to be disposed backwardly of the first divided area A1.

Subsequently, the screen dividing unit 172 defines the plurality of divided areas as a display divided area and a non-display divided area based on the touch information.

Figure 9A:
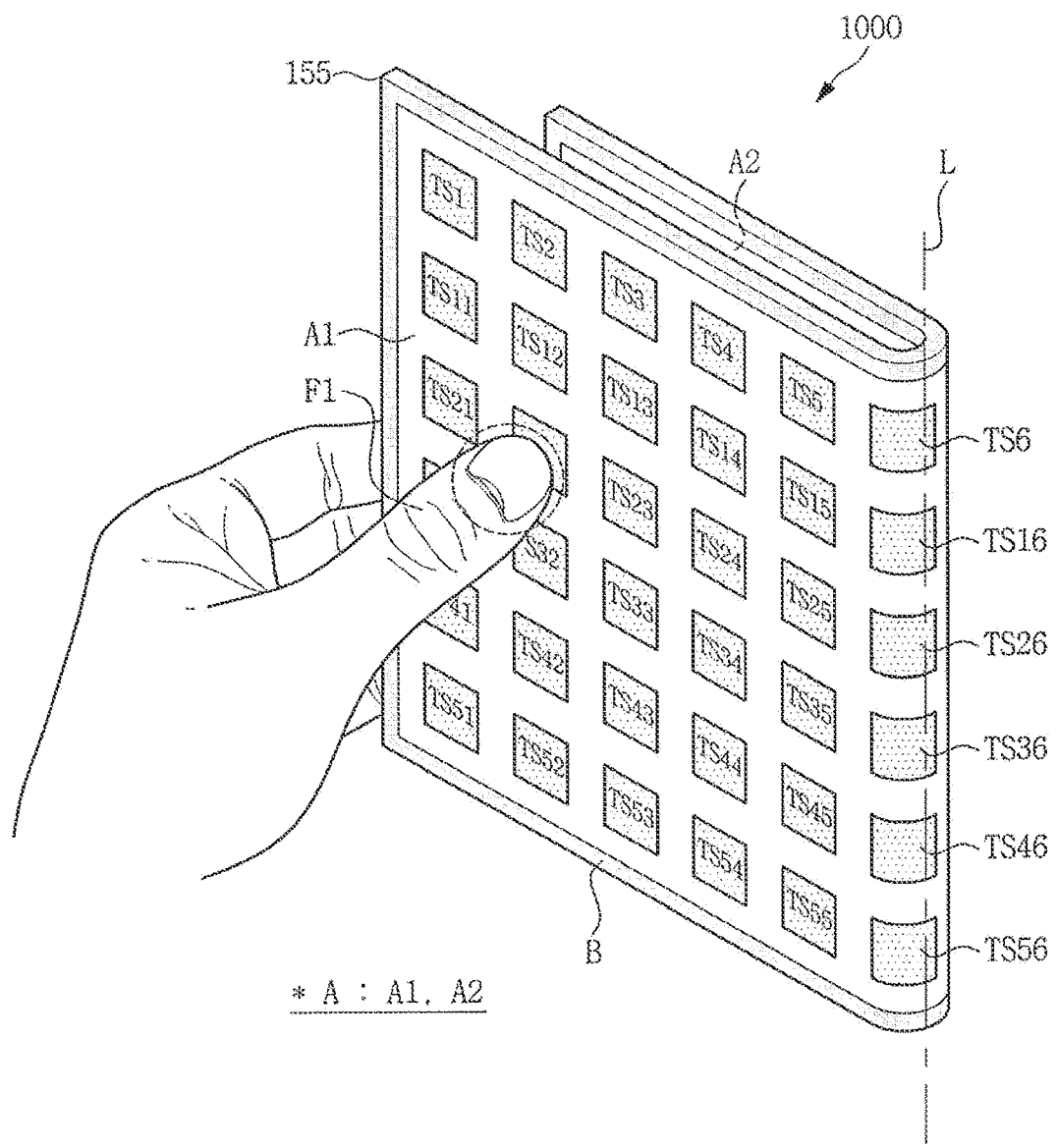
FIGS. 9A and 9B are views illustrating a method of defining a display divided area and a non-display divided area.
Figure 9B:
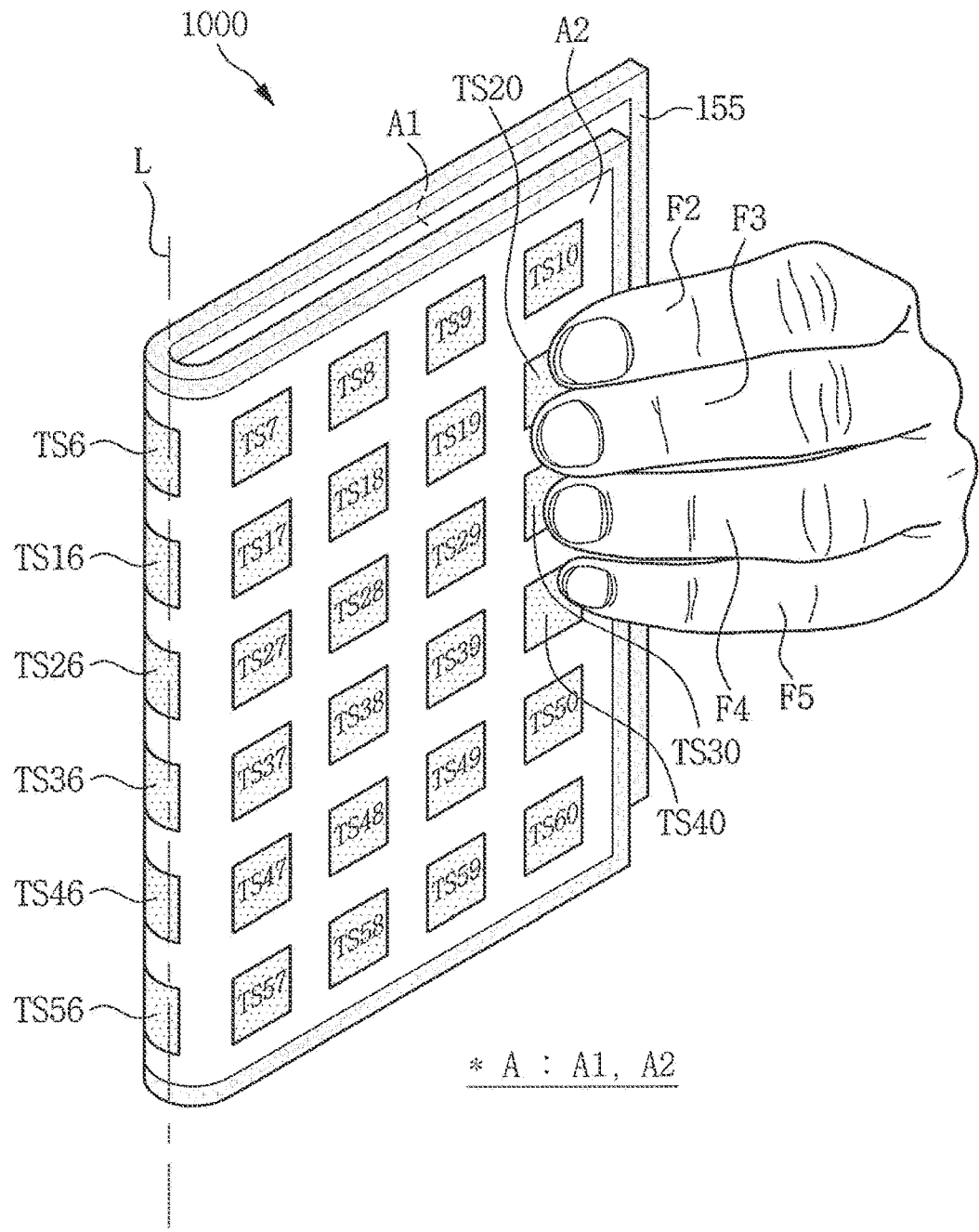

FIGS. 9A and 9B illustrate an embodiment of a method for defining a display divided area and a non-display divided area. FIG. 9B illustrates an example of a rear surface of the touch display panel 155 in FIG. 9A.

When a user views the touch display panel 155 while holding the touch display panel 155 as illustrated in FIG. 9A, the thumb F1 of the user may contact the first divided area A1 which is visible from the user. Also, as illustrated in FIG.

9B, one or more fingers (e.g., index finger F2, middle finger F3, ring finger F4, and little finger F5) may contact the second divided area A2, which may not be visible to the user.

Accordingly, the area of a touch applied to the first divided area A1 is different from an area of a touch applied to the second divided area A2. For example, the area of the touch applied to the first divided area A1 is smaller than the area of the touch applied to the second divided area A2. Further, the number of the touches applied to the first divided area A1 may be different from the number of the touches applied to the second divided area A2. For example, the number of the touches applied to the first divided area A1 may be less than the number of the touches applied to the second divided area A2.

The screen dividing unit 172 divides the first divided area A1 and the second divided area A2 into the display divided area and the non-display divided area based on a difference in the area of the touches and/or a difference in the number of touches. As an example, the screen dividing unit 172 may define the first divided area A1 to which a touch of a relatively smaller area is applied as the display divided area, and may define the second divided area A2 to which a touch of a relatively greater area is applied as the non-display divided area. In another example, the screen dividing unit 172 may define the first divided area A1 to which a relatively smaller number of touches are applied as the display divided area, and may define the second divided area A2 to which a relatively greater number of touches are applied as the non-display divided area. In another example, the screen dividing unit 172 may define the first divided area A1 and the second divided area A2 as the display divided area and the non-display divided area, respectively, based on the difference in an area of the touch and the difference in the number of the touches. In related exemplary embodiments, the display divided area will be represented by reference mark "A1" and the non-display divided area will be represented by reference mark "A2".

A touch sensing signal output from a touch sensing element touched by a finger of the user may have a greater value than the value of a touch sensing signal output from a touch sensing element not touched by a finger of the user. Further, the touch sensing signal output from the touch sensing element touched by the finger of the user has a smaller value than the value of a touch sensing signal output from a touch sensing element in the curved portion L.

For example, as illustrated in FIG. 9A, the touch sensing element T22 touched by the thumb F1 outputs a touch sensing signal having a value greater than a predetermined threshold lower limit and smaller than or equal to a threshold upper limit. Likewise, as illustrated in FIG. 9B, the touch sensing elements TS20, TS30, and TS40, which are touched by the index finger F2, the middle finger F3, the ring finger F4, and the little finger F5, each output a touch sensing signal having a value greater than the predetermined threshold lower limit and smaller than or equal to the threshold upper limit. The other touch sensing elements, aside from the touch sensing elements touched by the fingers and the touch sensing elements in the curved portion L, output touch sensing signals having a value smaller than or equal to the threshold lower limit.

The touch detecting unit 171 detects whether touched or not and coordinates of the touched position based on a difference in values of the touch sensing signals. For example, when the touch sensing signal from the touch sensing element is greater than the threshold upper limit, the touch detecting unit 171 detects the curved portion L based on the position of the touch sensing element. Further, when the touch sensing signal from the touch sensing element is greater than the threshold lower limit and smaller than or equal to the threshold upper limit, the touch detecting unit 171 detects the touch information based on the position of the touch sensing element.

When the touch sensing signal from the touch sensing element is smaller than or equal to the threshold lower limit, the touch detecting unit 171 verifies that the touch sensing element is not touched.

The aforementioned touch information may further include information corresponding to a predetermined touch pattern. The screen dividing unit 172 may define the divided areas as the display divided area A1 and the non-display divided area A2 based on the predetermined touch pattern. For example, when a user draws a circular pattern in the first divided area A1 with a finger, stylus, or another object, the screen dividing unit 172 recognizes this and defines the first divided area A1 as the display divided area A2 and defines the second divided area A2 as the non-display divided area A2.

Figure 10:
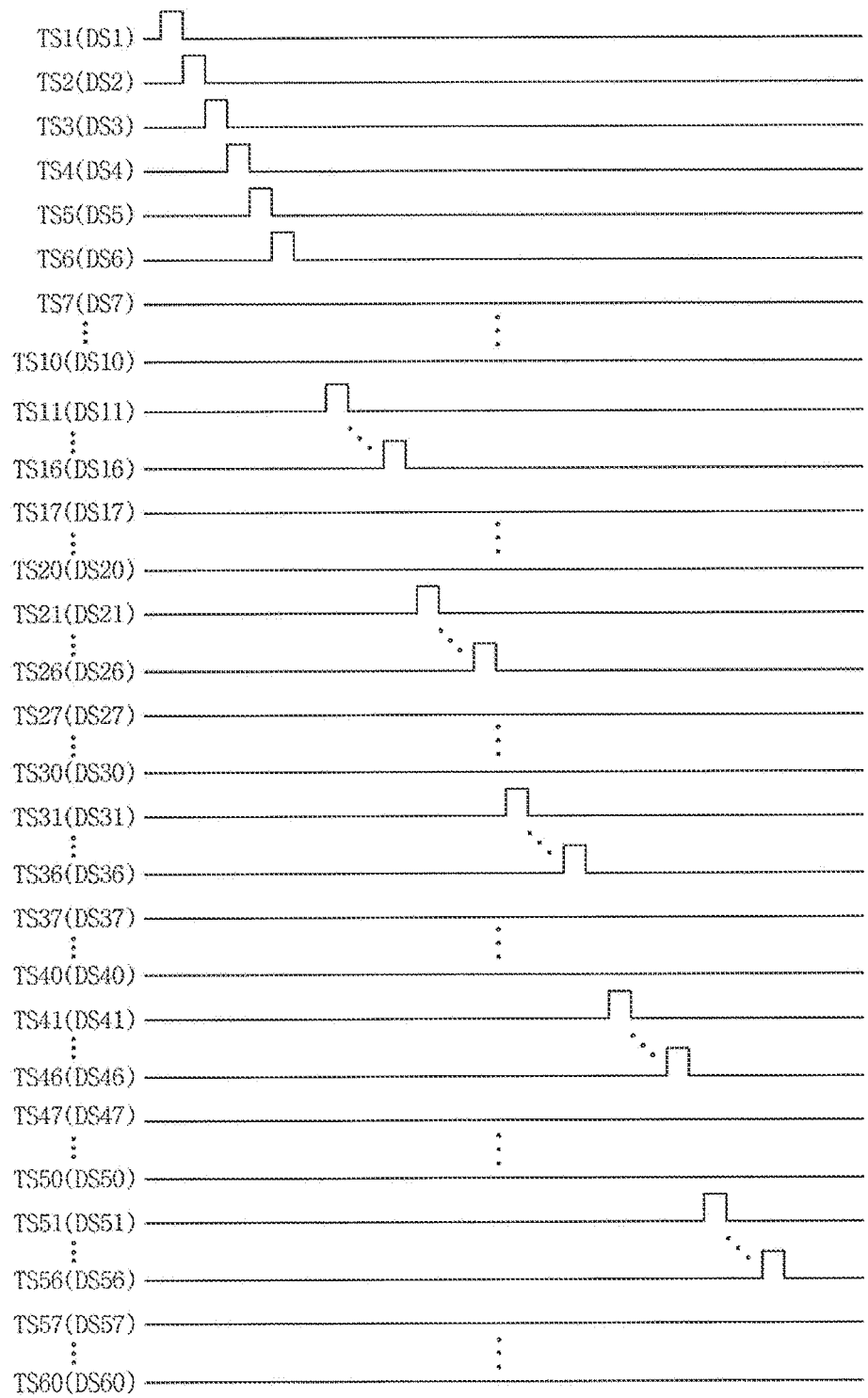
FIG. 10 is a timing diagram illustrating driving signals generated based on a curved portion of a touch display panel, the display divided area, and the non-display divided area of FIGS. 9A and 9B.

FIG. 10 is a timing diagram illustrating an embodiment of driving signals generated based on the curved portion L, the display divided area A1, and the non-display divided area A2 of the touch display panel 155 in FIGS. 9A and 9B.

When the curved portion L, the display divided area A1, and the non-display divided area A2 of the touch display panel 155 are defined as in FIGS. 9A and 9B, a driving line scan unit 401 drives at least one of the touch sensing elements in the display divided area A1, but stops a driving operation of each of the touch sensing elements TS7-TS10, TS17-TS20, TS27-TS30, TS37-TS40, TS47-TS50, and TS57-TS60 in the non-display divided area A2. The driving line scan unit 401 may drive each of the touch sensing elements TS1-TS5, TS11-TS15, TS21-TS25, TS31-TS35, TS41-TS45, and TS51-TS55 in the display divided area A1.

The driving line scan unit 401 applies a driving signal to at least one of the touch sensing elements in the display divided area A1, but applies a driving signal to none of the touch sensing elements in the non-display divided area A2. For example, as illustrated in FIG. 10, the driving line scan unit 401 may sequentially output each of driving signals DS1-DS5, DS11-DS15, DS21-DS25, DS31-DS35, DS41-DS45, and DS51-DS55 for driving the touch sensing elements TS1-TS5, TS11-TS15, TS21-TS25, TS31-TS35, TS41-TS45, and TS51-TS55 in the display divided area A1, but may deactivate each of driving signals DS7-DS10, DS17-DS20, DS27-DS30, DS37-DS40, DS47-DS50, and DS57-DS60 for driving the touch sensing elements TS7-TS10, TS17-TS20, TS27-TS30, TS37-TS40, TS47-TS50, and TS57-TS60 in the non-display divided area A2.

Accordingly, while all the touch sensing elements TS1-TS5, TS11-TS15, TS21-TS25, TS31-TS35, TS41-TS45, and TS51-TS55 in the display divided area A1 may be operated, all the touch sensing elements in the non-display divided area A2 may not be operated. Accordingly, even though a touch is applied, each of the touch sensing elements TS7-TS10, TS17-TS20, TS27-TS30, TS37-TS40, TS47-TS50, and TS57-TS60 may not respond to the touch.

At least one of the touch sensing elements TS6, TS16, TS26, TS36, TS46, and TS56 in the curved portion L receives a driving signal. For example, in FIG. 8, each of the sixth, sixteenth, twenty-sixth, thirty-sixth, forty-sixth, and fifth-sixth touch sensing elements TS6, TS16, TS26, TS36, TS46, and TS56 may receive driving signals.

A driving operation of the driving line scan unit 401 with respect to FIG. 10 may be controlled by a timing controller 163. For example, the timing controller 163 detects the touch sensing elements in the display divided area A1 and the touch sensing elements in the non-display divided area A2 based on information from a touch control unit 170, generates a sensor control signal SCS based on the detected information, and applies the sensor control signal SCS to the driving line scan unit 401. Subsequently, the driving line scan unit 401 controls a driving operation of the driving lines based on the sensor control signal SCS in FIG. 10.

Figure 11:
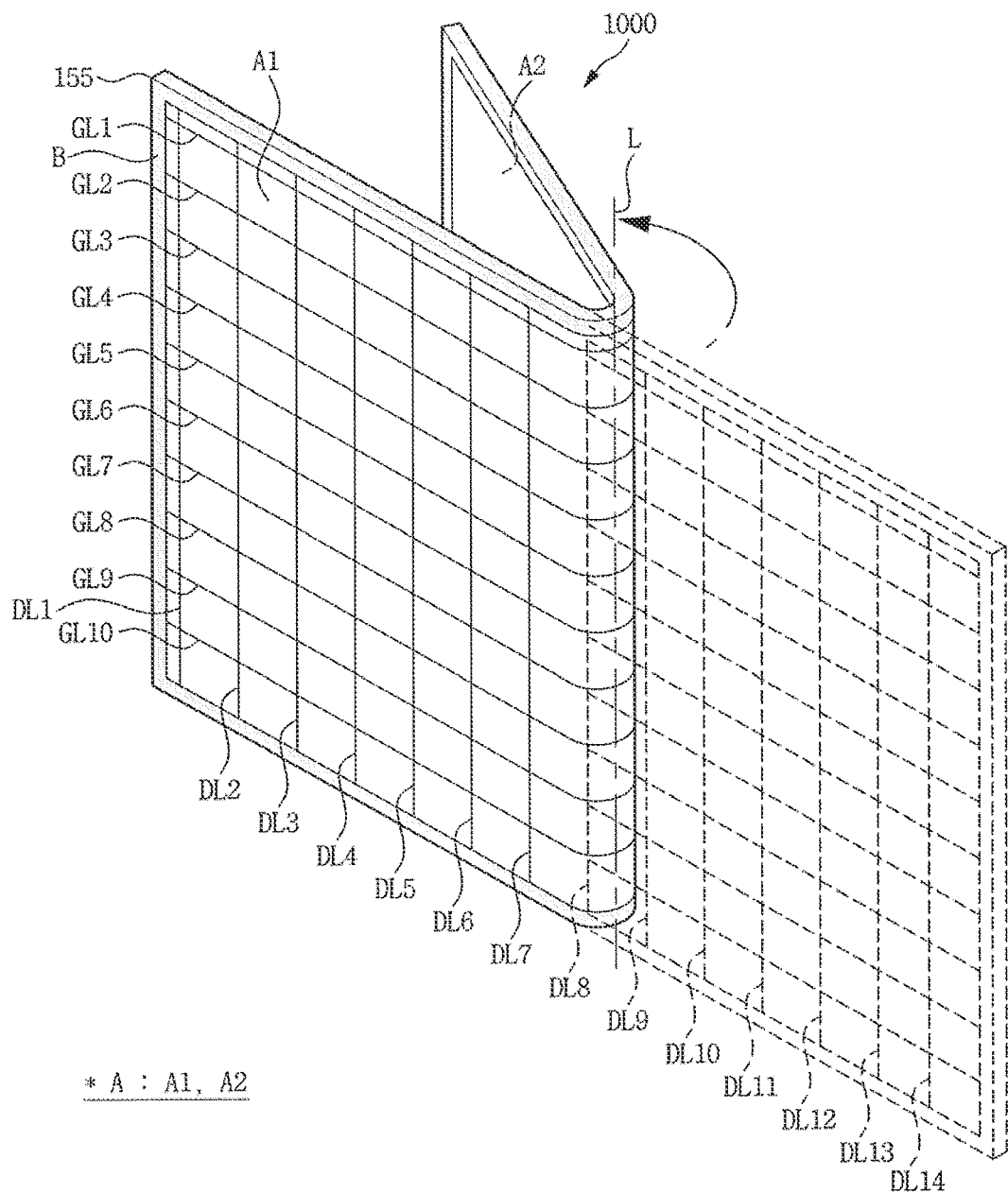
FIG. 11 is a view illustrating gate lines and data lines disposed in the display divided area and the non-display divided area of FIGS. 9A and 9B.
Figure 12:
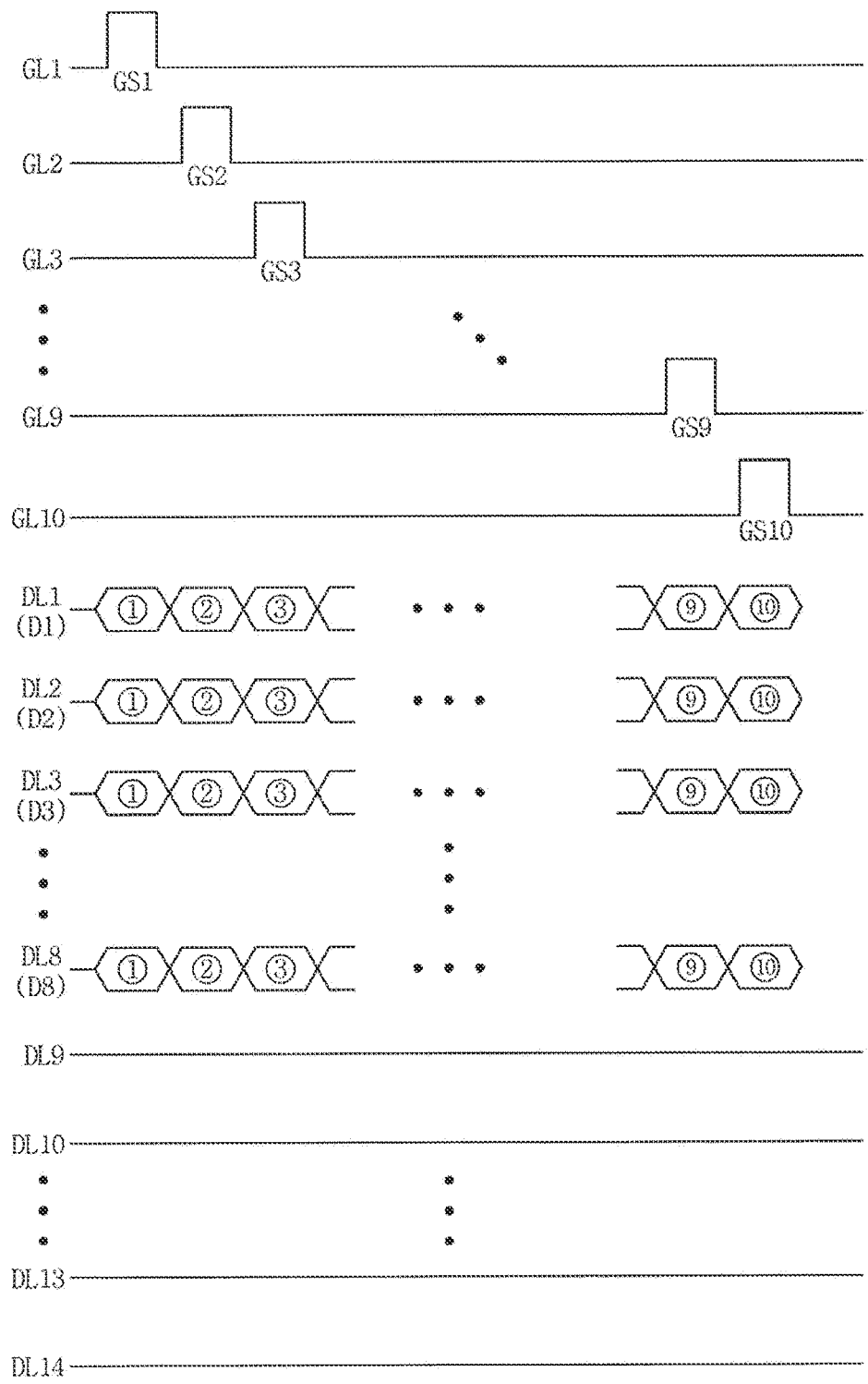
FIG. 12 is a timing diagram illustrating gate signals and data signals generated based on the curved portion, the display divided area, and the non-display divided area of the touch display panel of FIGS. 9A and 9B.

FIG. 11 illustrates an embodiment of gate lines GL1-GL10 and the data lines DL1-DL14 in the display divided area A1 and the non-display divided area A2 in FIGS. 9A and 9B. For illustrative purposes only, FIG. 11 illustrates that the flexible display device 1000 includes ten gate lines GL1-GL10 and fourteen data lines DL1-DL14. FIG. 12 is a timing diagram illustrating an example of the gate signals and the data signals generated based on the curved portion L, the display divided area A1, and the non-display divided area A2 of the touch display panel 155 in FIGS. 9A and 9B.

When the curved portion L, the display divided area A1, and the non-display divided area A2 of the touch display panel 155 are defined as in FIGS. 9A and 9B, the curved portion L is parallel to at least one data line and intersects each of the gate lines GL1-GL10 as illustrated in FIG. 11.

The gate driver 112 drives at least one gate line. In one embodiment, the gate driver 112 may drive the first to tenth gate lines GL1-GL10. In this case, the gate driver 112, as illustrated in FIG. 12, may output first to tenth gate signals GS1-GS10 sequentially. The first to tenth gate signals GS1-GS10 are applied to the first to tenth gate lines GL1-GL10 sequentially.

The data driver 111 drives at least one data line in the display divided area A1, but stops a driving operation of each of the data lines DL9-DL14 in the non-display divided area A2. The data driver 111 may drive each of the data lines DL1-DL8 in the display divided area A1. For example, the data driver 111 may drive the first to eighth data lines DL1-DL8 in the display divided area A1, but stop the driving operation of the ninth to fourteenth data lines DL9-DL14 in the non-display divided area A2. To this end, the data driver 111, as illustrated in FIG. 12, may output first to eighth image data signals D1-D8, simultaneously. The first to eighth image data signals D1-D8 are applied to the first to eighth data lines DL1-DL8, simultaneously. The first to eighth image data signals D1-D8 each include first to tenth pixel data ①, ②, ③, . . . , ⑨, and ⑩. On the other hand, the data driver 111 may not output image data signals corresponding to the ninth to fourteenth data lines DL9-DL14.

The driving operation of the gate driver 112 and the data driver 111 with respect to FIG. 12 may be controlled by the timing controller 163. For example, the timing controller 163 detects the gate lines in the display divided area A1 and the gate lines in the non-display divided area A2 based on the information from the touch control unit 170, generates a gate control signal GCS based on the detected result, and supplies the gate control signal GCS to the gate driver 112.

Subsequently, the gate driver 112, as illustrated in FIG. 12, controls a driving operation of the gate lines based on the gate control signal GCS.

Further, the timing controller 163 detects the data lines in the display divided area A1 and the data lines in the non-display divided area A2 based on the information from the touch control unit 170, generates a data control signal DCS and corrected image data signals based on the detected result, and supplies the data control signal DCS and the corrected image data signals to the data driver 111.

Subsequently, the data driver 111, as illustrated in FIG. 12, controls a driving operation of the data lines based on the data control signal DCS and the corrected image data signals.

Figure 13A:
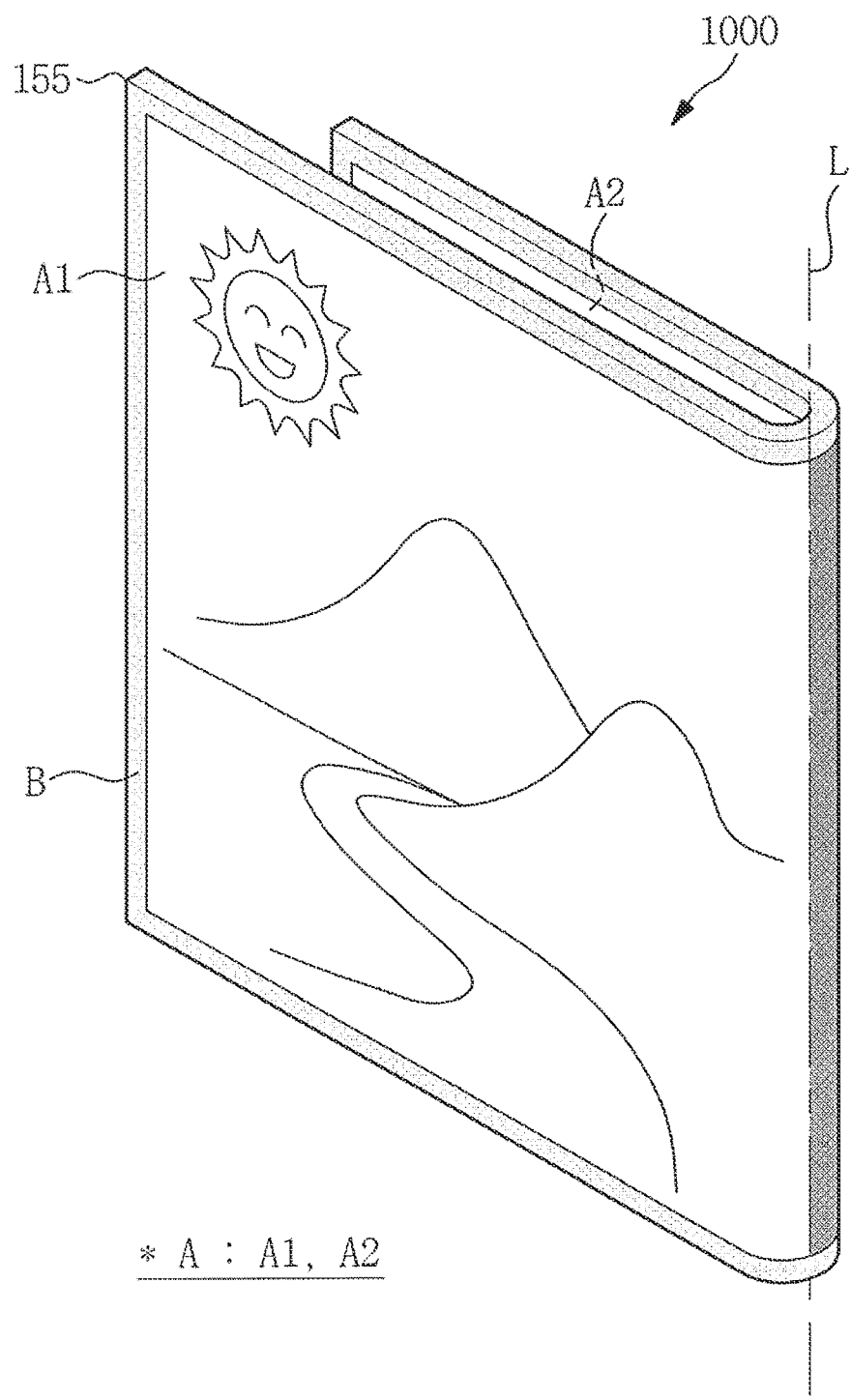
FIGS. 13A and 13B are views illustrating an image displayed in the display divided area and the non-display divided area based on the driving operation of the gate lines and the data lines of FIGS. 11 and 12.
Figure 13B:
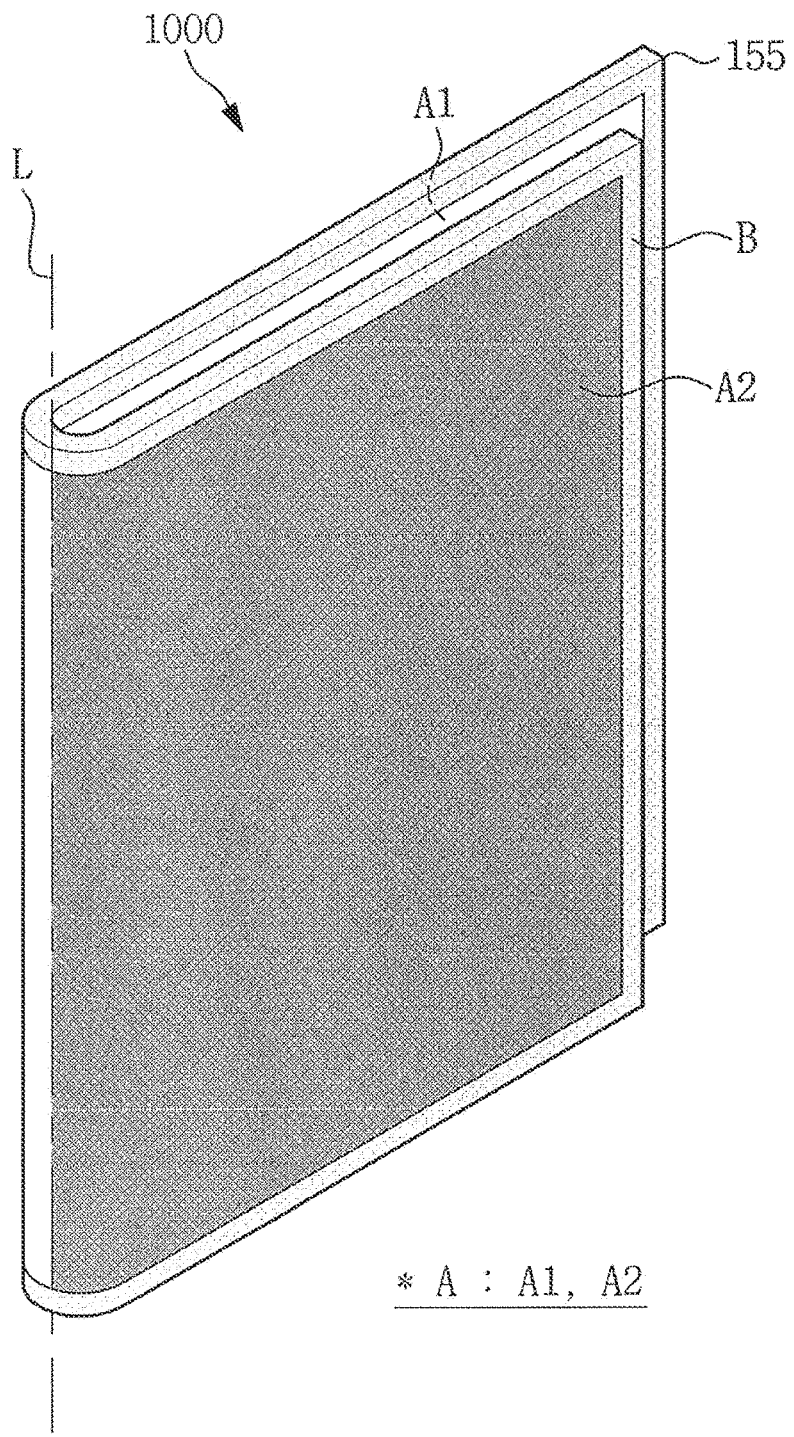

FIGS. 13A and 13B are views respectively illustrating an image displayed in the display divided area A1 and the case where an image is not displayed the non-display divided area A2, based on the driving operation of the gate lines and data lines of FIGS. 11 and 12.

As illustrated in FIG. 13A, an image may be displayed throughout an entire portion of the display divided area A1. The image displayed on the display divided area A1 is based on the first to eighth image data signals D1-D8.

On the other hand, as illustrated in FIG. 13B, an image may not be displayed throughout an entire portion of the non-display divided area A2. For example, since the image data signals are not applied to the data lines in the non-display divided area A2, as time elapses, storage capacitors Cst of the pixels (hereinafter "non-display pixels") in the non-display divided area A2 are to be discharged. In this case, driving switching elements Tr_D of the non-display pixels are turned off. Accordingly, light emitting elements EL of the non-display pixels no longer emit light.

Figure 14:
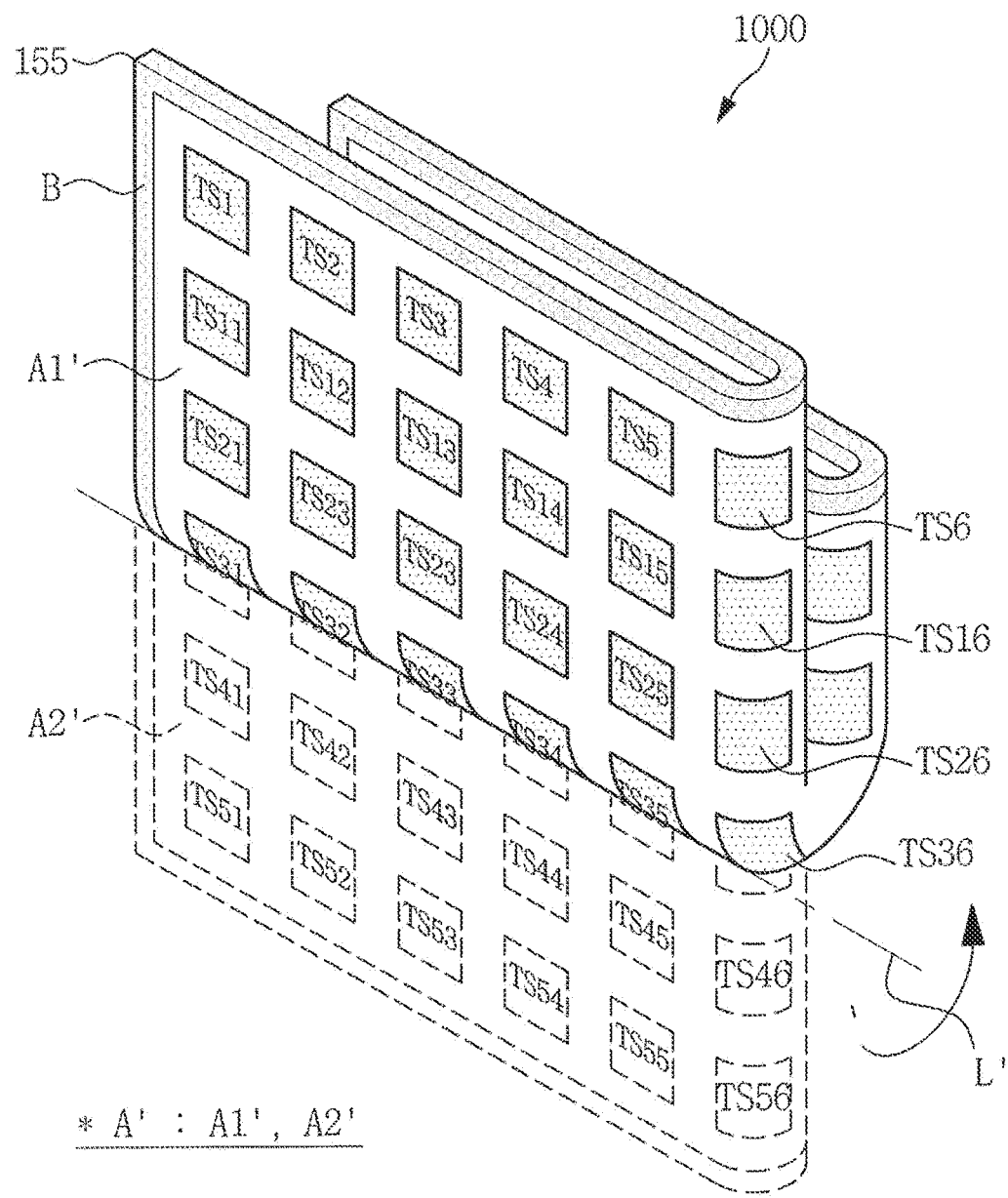
FIG. 14 is a view illustrating a state in which the flexible display device of FIG. 13A is folded once again with respect to another curved portion.

FIG. 14 illustrating an embodiment of the flexible display device 1000 in FIG. 13A that is folded once again with respect to another curved portion L'. As illustrated in FIG. 14, a touch display panel 155 of the flexible display device 1000 includes a display area A and a non-display area B. The display area A of FIG. 14 corresponds to the display divided area A1 in FIG. 13A.

The flexible display device 1000 may be folded once again with respect to the imaginary straight line L'. The imaginary straight line L' may be substantially parallel to at least one gate line and intersects each of data lines DL1-DL7 (refer, e.g., to FIG. 16).

Thirty-first, thirty-second, thirty-third, thirty-fourth, thirty-fifth, and thirty-sixth touch sensing elements TS31, TS32, TS33, TS34, TS35, and TS36 disposed along the imaginary straight line L' are bent to a greater extent than the other touch sensing elements. Accordingly, the thirty-first, thirty-second, thirty-third, thirty-fourth, thirty-fifth, and thirty-sixth touch sensing elements TS31, TS32, TS33, TS34, TS35, and TS36 receive a greater pressure than a pressure the other touch sensing elements.

The driving operation of the thirty-first, thirty-second, thirty-third, thirty-fourth, thirty-fifth, and thirty-sixth touch sensing elements TS31, TS32, TS33, TS34, TS35, and TS36 may be the same as the driving operation of the sixth, sixteenth, twenty-sixth, thirty-sixth, forty-sixth, and fifty-sixth touch sensing elements TS6, TS16, TS26, TS36, TS46, and TS56 in FIG. 8.

The touch detecting unit 171 detects a curved portion of the touch display panel 155 based on touch sensing signals from the touch sensing elements. For example, the touch detecting unit 171 may define, as the curved portion, a portion of the display area A overlapping the imaginary straight line L'. The imaginary straight line L' intersects at least two of the thirty-first, thirty-second, thirty-third, thirty-fourth, thirty-fifth, and thirty-sixth touch sensing elements TS31, TS32, TS33, TS34, TS35, and TS36 generating touch sensing signals having values greater than a predetermined threshold upper limit.

For example, as illustrated in FIG. 14, a portion of the display area A overlapping the imaginary straight line L', which intersects the thirty-first touch sensing element TS31 and the thirty-sixth touch sensing element TS36 disposed farthest from each other in space, may be defined as the curved portion. In related exemplary embodiments, the curved portion will be represented by reference mark "L". The curved portion L' of FIG. 14 is substantially parallel to at least one gate line, and intersects each of the data lines DL1-DL7.

When the position of the curved portion L' is defined in the manner described above, a screen dividing unit 172 divides the display area A of the touch display panel 155 into a plurality of divided areas with respect to the curved portion L'. For example, as illustrated in FIG. 14, the display area A may be divided into two divided areas A1' and A2' with respect to the single curved portion L'. When one of the divided areas is defined as a first divided area A1' and the other of the divided areas is defined as a second divided area A2', the second divided area A2' may be rotated by about 180 degrees with respect to the curved portion L' as an axis to be disposed backwardly of the first divided area A1'.

Subsequently, the screen dividing unit 172 defines the plurality of divided areas A1' and A2' as a display divided area and a non-display divided area, respectively, based on the touch information, with reference to FIGS. 9A and 9B. In related exemplary embodiments, the display divided area will be represented by reference mark "A1'" and the non-display divided area will be represented by reference mark "A2'". As illustrated in FIG. 14, The display area A' is divided into the display divided area A1' and the non-display divided area A2' by the screen dividing unit 172. The non-display divided area A2' includes the non-display divided area A2 of FIG. 13A, in addition to the non-display divided area A2' of FIG. 14.

Figure 15:
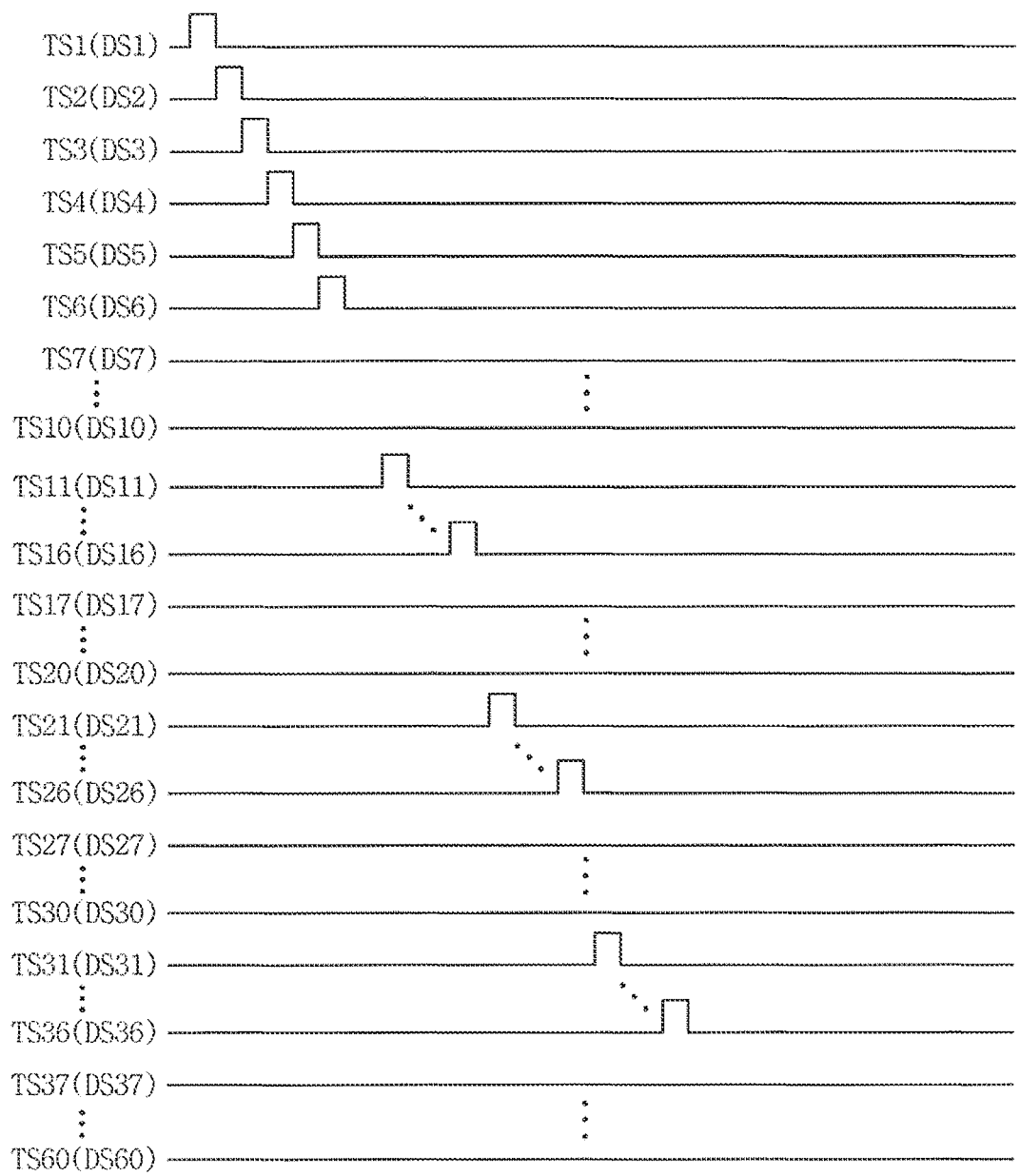
FIG. 15 is a timing diagram illustrating driving signals generated based on a curved portion, the display divided area, and the non-display divided area of the touch display panel of FIG. 14.

FIG. 15 is a timing diagram illustrating an example of driving signals generated based on the curved portion L', the display divided area A1', and the non-display divided area A2' of the touch display panel 155 of FIG. 14. When the curved portion L', the display divided area A1', and the non-display divided area A2' of the touch display panel 155 are defined as in FIG. 14, a driving line scan unit 401 drives at least one of touch sensing elements in the display divided area A1', but stops a driving operation of each of touch sensing elements TS41-TS46 and TS51-TS56 in the non-display divided area A2'. The driving line scan unit 401 may drive each of touch sensing elements TS1-TS5, TS11-TS15, and TS21-TS25 in the display divided area A1'.

In this case, the driving line scan unit 401 applies a driving signal to at least one of the touch sensing elements in the display divided area A1', but applies a driving signal to none of the touch sensing elements in the non-display divided area A2. For example, as illustrated in FIG. 15, the driving line scan unit 401 may sequentially output each of driving signals DS1-DSS, DS11-DS15, and DS21-DS25 for driving the touch sensing elements TS1-TS5, TS11-TS15, and TS21-TS25 in the display divided area A1', but may deactivate each of driving signals DS41-DS46 and DS51-DS56 for driving the touch sensing elements TS41-TS46 and TS51-TS56 in the non-display divided area A2'. Accordingly, while all the touch sensing elements TS1-TS5, TS11-TS15, and TS21-TS25 in the display divided area A1' may be operated, all the touch sensing elements TS41-TS46 and TS51-TS56 in the non-display divided area A2' may not be operated. Accordingly, even though a touch is applied, each of the touch sensing elements TS41-TS46 and TS51-TS56 may not respond to the touch.

At least one of the touch sensing elements in the previous curved portion L and at least one of the touch sensing elements in the curved portion L' receive a driving signal. For example, each of the sixth, sixteenth, twenty-sixth, thirty-sixth, thirty-first, thirty-second, thirty-third, thirty-fourth, thirty-fifth, and thirty-sixth touch sensing elements TS6, TS16, TS26, TS36, TS31, TS32, TS33, TS34, TS35, and TS36 may receive driving signals DS6, DS16, DS26, DS36, DS31, DS32, DS33, DS34, DS35, and DS36.

A driving operation of the driving line scan unit 401 with respect to FIG. 15 may be controlled by a timing controller 163, which, for example, may perform one or more operations similar to the timing controller 163 and driving line scan unit 401 of FIG. 10.

Figure 16:
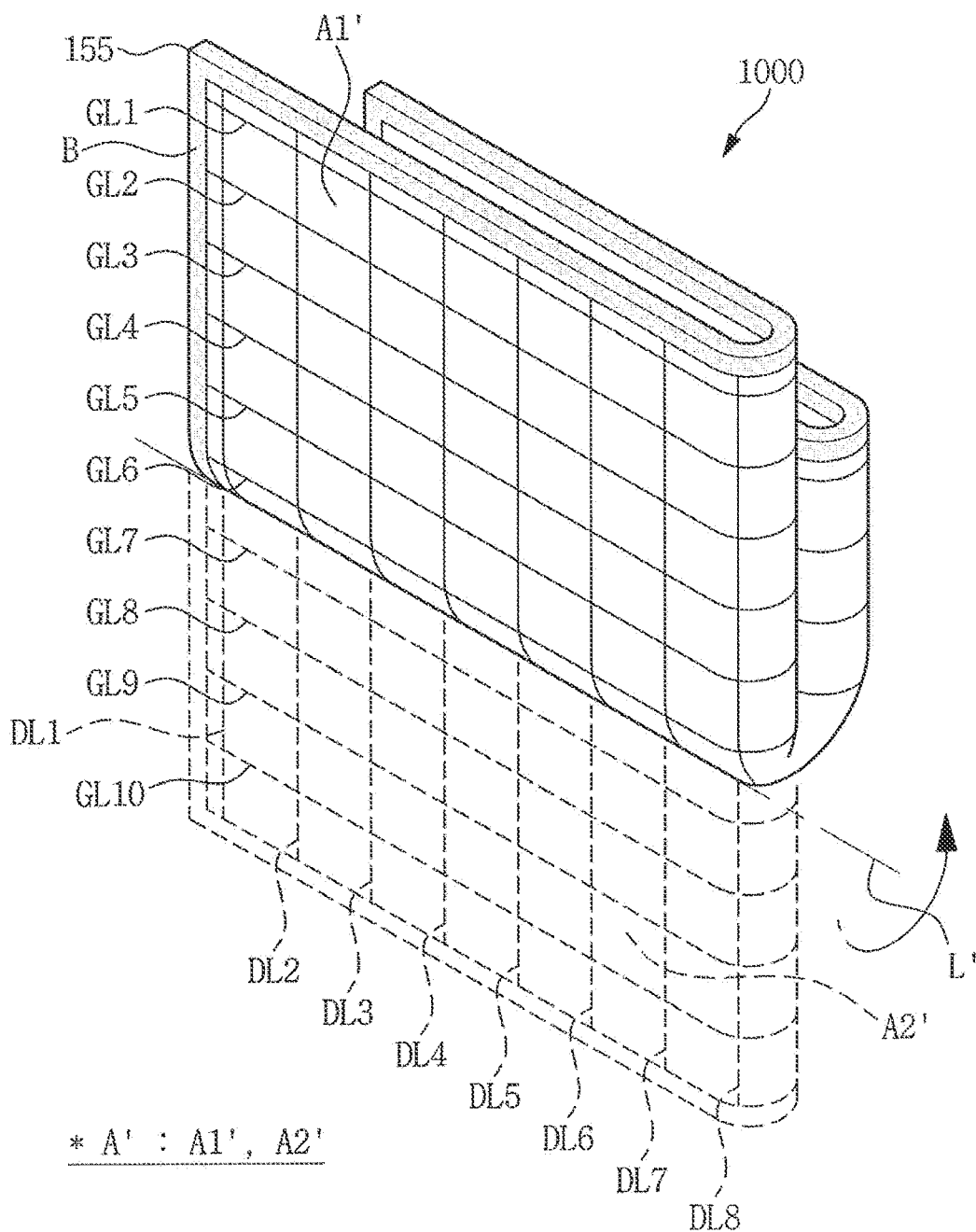
FIG. 16 is a view illustrating gate lines and data lines disposed in the display divided area and the non-display divided area of FIG. 15.
Figure 17:
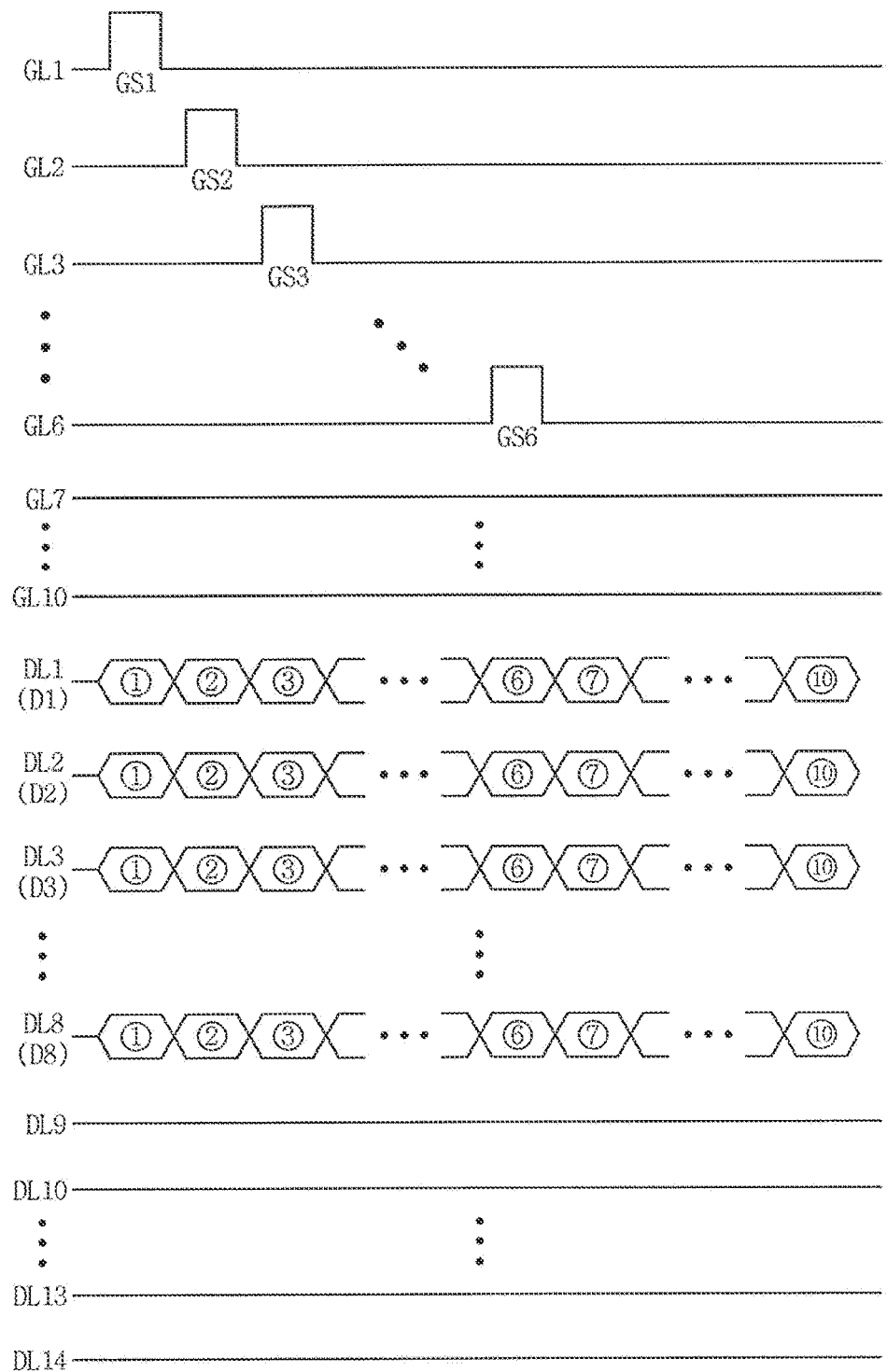
FIG. 17 is a timing diagram illustrating gate signals and data signals generated based on the curved portion, the display divided area, and the non-display divided area of the touch display panel of FIG. 14.

FIG. 16 illustrates an embodiment of gate lines and data lines in the display divided area A1' and the non-display divided area A2' of FIG. 15. FIG. 17 is a timing diagram illustrating an example of gate signals and data signals generated based on the curved portion L', the display divided area A1' and the non-display divided area A2' of the touch display panel 155 in FIG. 14. For illustrative purposes only, the flexible display device 1000 includes ten gate lines GL1-GL10 and fourteen data lines DL1-DL14.

When the curved portion L', the display divided area A1', and the non-display divided area A2' of the touch display panel 155 are defined as in FIG. 14, the curved portion L' is parallel to at least one gate line and intersects each of the data lines DL1-DL8 as illustrated in FIG. 16. In this case, a driving operation of a gate driver 112 and a data driver 111 will be described hereinbelow.

The gate driver 112 drives at least one gate line in the display divided area A1', but stops a driving operation of each of the gate lines GL7-GL10 in the non-display divided area A2'. The gate driver 112 may drive each of the gate lines GL1-GL10 in the display divided area A1'. For example, the gate driver 112 may drive the first to sixth gate lines GL1-GL6 in the display divided area A1', but may not drive the seventh to tenth gate lines GL7-GL10 in the non-display divided area A2'. To this end, the gate driver 112, as illustrated in FIG. 17, may output first to sixth gate signals GS1-GS6 sequentially. The first to sixth gate signals GS1-GS6 are applied to the first to sixth gate lines GL1-GL6 sequentially. However, the gate driver 112 may not output gate signals to the seventh to tenth gate lines GL7-GL10. For example, the gate driver 112 may apply a gate low voltage VGL to the seventh to tenth gate lines GL7-GL10.

The data driver 111 drives at least one data line in the display area A' which corresponds to the previous display divided area A1. The data driver 111 may drive the first to eighth data lines DL1-DL8. To this end, as illustrated in FIG. 17, the data driver 111 may output first to eighth image data signals D1-D8 simultaneously. The first to eighth image data signals D1-D8 are simultaneously applied to the first to eighth data lines DL1-DL8. Each of the first to eighth image data signals D1-D8 include first to tenth pixel data ①, ②, ③, ..., ⑥, ⑦, ..., ⑩. Since the seventh to tenth gate lines GL7-GL10 to which the non-display pixels are connected are not driven, the seventh to tenth pixel data ⑦ to ⑩ of each image data signal are not applied to non-display pixels.

The data driver 111 may not output image data signals corresponding to the ninth to fourteenth data lines DL9-DL14. The driving operation of the gate driver 112 and the data driver 111 with respect to FIG. 17 may be controlled by the timing controller 163, which, for example, may correspond to the timing controller 163, the gate driver 112, and the data driver 111 described with reference to FIG. 10.

Figure 18A:
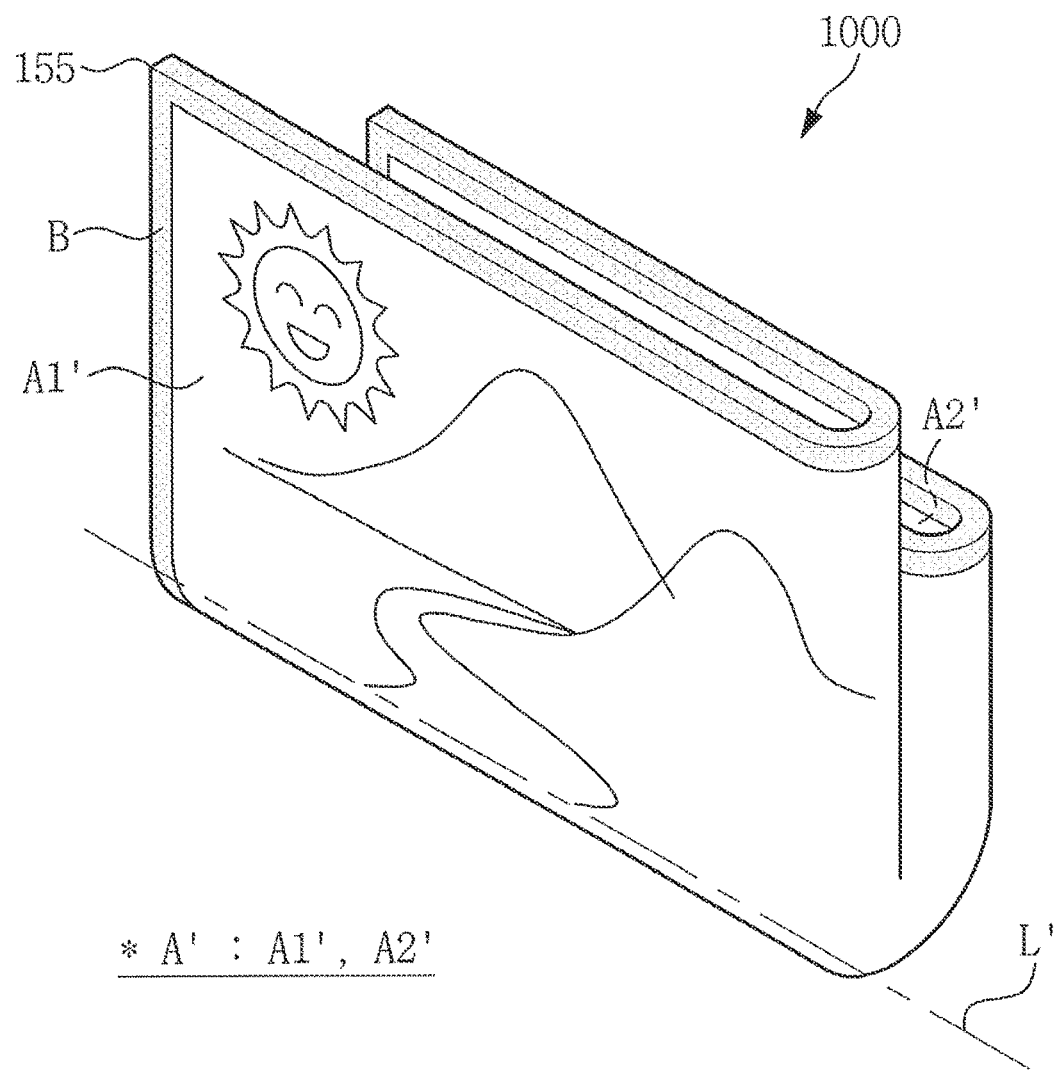
FIGS. 18A and 18B are views illustrating an image displayed in the display divided area and the non-display divided area based on the driving operation of the gate lines and the data lines of FIG. 17.

FIG. 18A illustrates an example of an image displayed in the display divided area A1', and FIG. 18A illustrates an example where an image is not displayed in the non-display divided area A2'. The driving operation of the gate lines and the data lines for these examples may correspond to FIG. 17.

As illustrated in FIG. 18A, an image may be displayed throughout an entire portion of the display divided area A1'. The image displayed in the display divided area A1' is based on the first to eighth image data signals D1-D8.

Figure 18B:
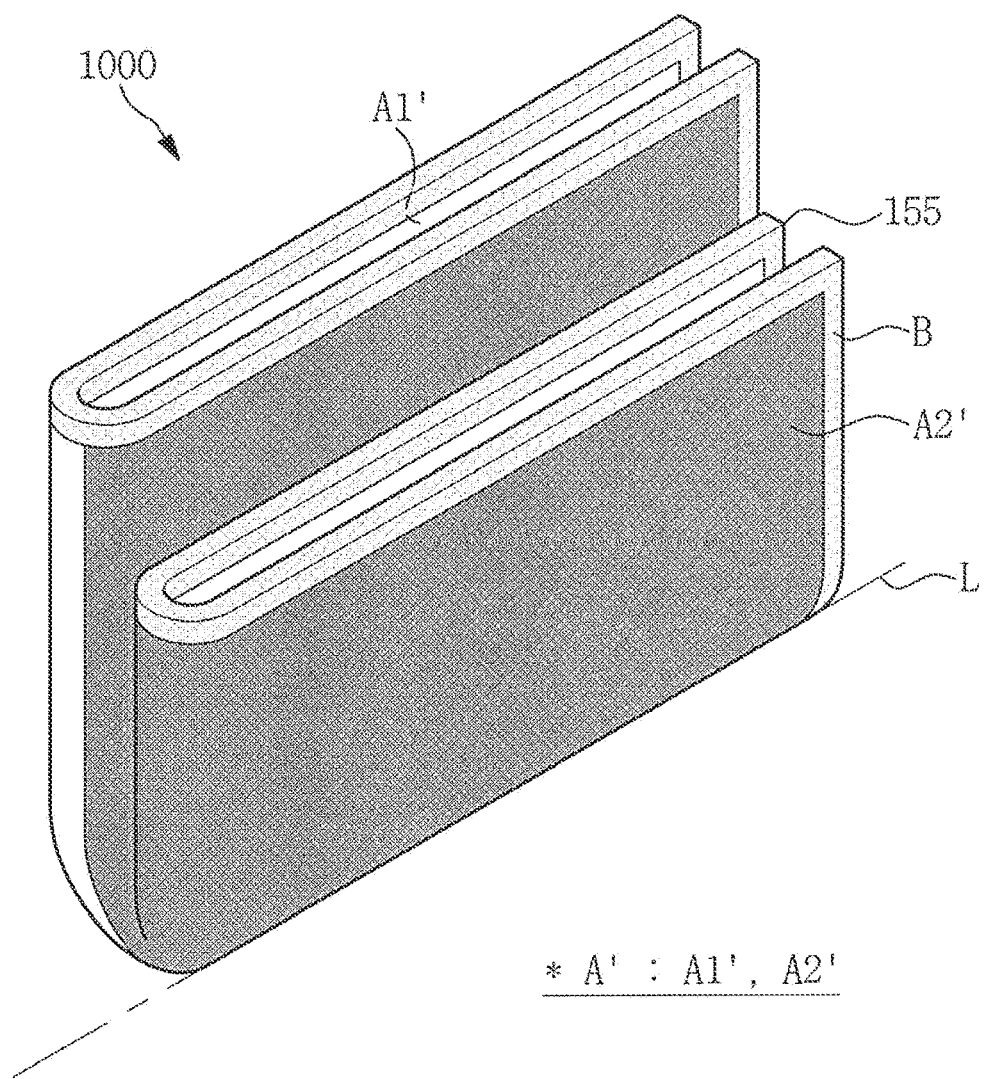

As illustrated in FIG. 18B, an image may not be displayed throughout an entire portion of the non-display divided area A2'. For example, since the gate signals are not applied to the gate lines in the non-display divided area A2', the image data signals may not be applied to the non-displaying pixels. Accordingly, as time elapses, storage capacitors Cst in the non-display pixels are to be discharged. In this case, driving switching elements Tr_D in the non-display pixels are turned off. Accordingly, light emitting elements EL of the non-display pixels no longer emit light.

Figure 19:
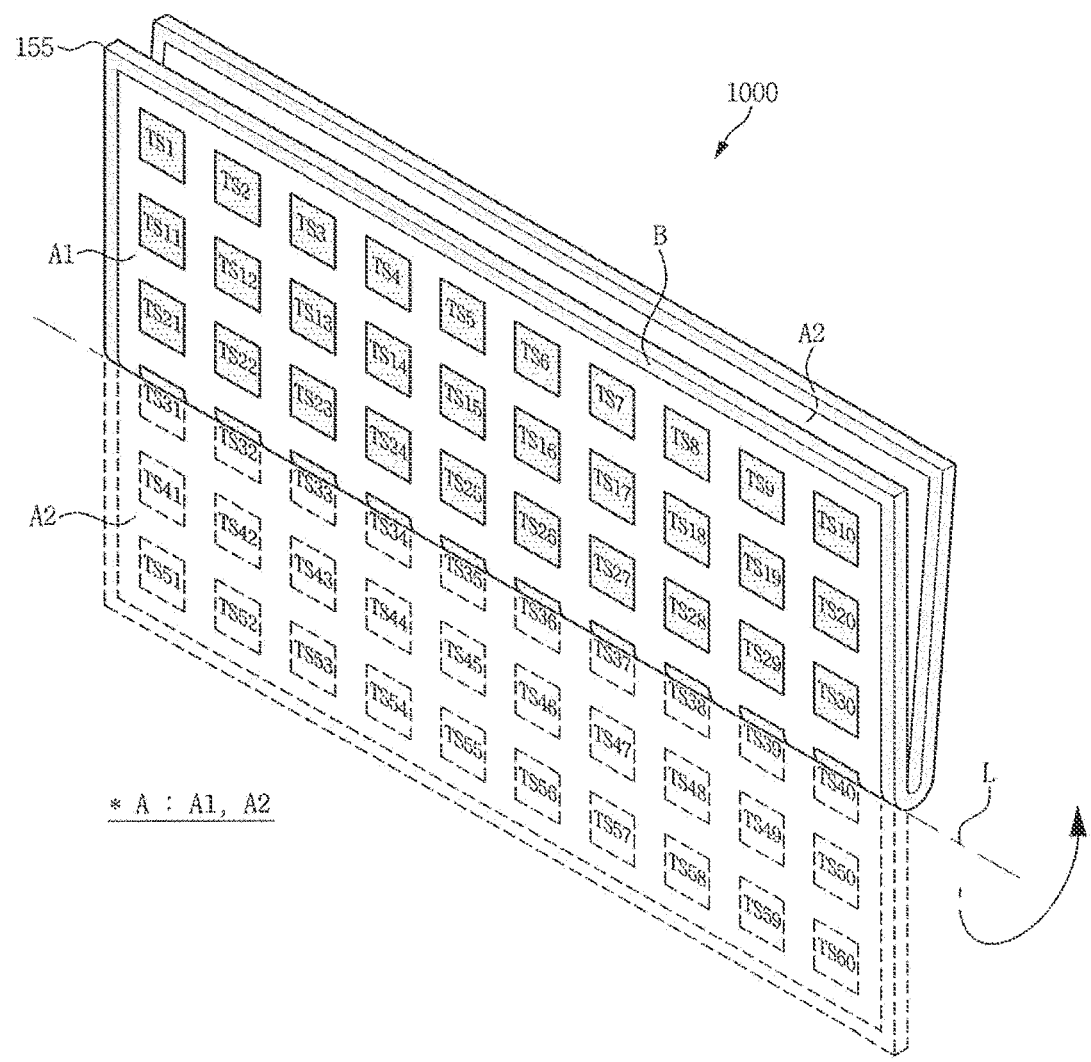
FIG. 19 is another view illustrating a state in which a flexible display device including elements of FIG. 1 is folded.

FIG. 19 illustrates another embodiment of the flexible display device 1000 in a folded state. As illustrated in FIG. 19, the flexible display device 1000 may be folded with respect to an imaginary straight line L. The imaginary straight line L illustrated in FIG. 19 may be substantially parallel to at least one gate line and intersects each of the data lines DL1-DL14 (refer, e.g., to FIG. 21).

Thirty-first, thirty-second, thirty-third, thirty-fourth, thirty-fifth, thirty-sixth, thirty-seventh, thirty-eighty, thirty-ninth, and fortieth touch sensing elements TS31, TS32, TS33, TS34, TS35, TS36, TS37, TS38, TS39, and TS40 disposed along the imaginary straight line L may be bent to a greater extent than the other touch sensing elements. Accordingly, the thirty-first, thirty-second, thirty-third, thirty-fourth, thirty-fifth, thirty-sixth, thirty-seventh, thirty-eighty, thirty-ninth, and fortieth touch sensing elements TS31, TS32, TS33, TS34, TS35, TS36, TS37, TS38, TS39, and TS40 disposed along the imaginary straight line L may receive a greater pressure than a pressure the other touch sensing elements.

The driving operation of the thirty-first, thirty-second, thirty-third, thirty-fourth, thirty-fifth, thirty-sixth, thirty-seventh, thirty-eighty, thirty-ninth, and fortieth touch sensing elements TS31, TS32, TS33, TS34, TS35, TS36, TS37, TS38, TS39, and TS40 disposed along the imaginary straight line L may be the same as the driving operation of the sixth, sixteenth, twenty-sixth, thirty-sixth, forty-sixth, and fifty-sixth touch sensing elements TS6, TS16, TS26, TS36, TS46, and TS56 described with reference to FIG. 8.

The touch detecting unit 171 detects a curved portion of the touch display panel 155 based on touch sensing signals from the touch sensing elements. For example, the touch detecting unit 171 may define, as the curved portion, a portion of the display area A overlapping the imaginary straight line L, which intersects at least two of the thirty-first, thirty-second, thirty-third, thirty-fourth, thirty-fifth, thirty-sixth, thirty-seventh, thirty-eighty, thirty-ninth, and fortieth touch sensing elements TS31, TS32, TS33, TS34, TS35, TS36, TS37, TS38, TS39, and TS40 generating touch sensing signals having values greater than a predetermined threshold upper limit. For example, as illustrated in FIG. 19, a portion of the display area A overlapping the imaginary straight line L which intersects the thirty-first touch sensing element TS31 and the fortieth touch sensing element TS40 disposed farthest from each other in space, may be defined as the curved portion. In related exemplary embodiments, the curved portion will be represented by reference mark "L". The curved portion L of FIG. 19 may be substantially parallel to at least one gate line, and intersects each of the data lines DL1-DL14.

When the position of the curved portion L is defined in the manner described above, a screen dividing unit 172 divides the display area A of the touch display panel 155 into a plurality of divided areas with respect to the curved portion L. For example, as illustrated in FIG. 19, the display area A may be divided into two divided areas A1 and A2 with respect to the single curved portion L. When one of the divided areas is defined as a first divided area A1 and the other of the divided areas is defined as a second divided area A2, the second divided area A2 may be rotated by about 180 degrees with respect to the curved portion L as an axis to be disposed backwardly of the first divided area A1.

Subsequently, the screen dividing unit 172 defines the plurality of divided areas as a display divided area and a non-display divided area, respectively, based on the touch information, with reference to FIGS. 9A and 9B. The display area A, as illustrated in FIG. 19, is divided into the display divided area and the non-display divided area by the screen dividing unit 172. In exemplary embodiments, the display divided area will be represented by reference mark "A1" and the non-display divided area will be represented by reference mark "A2".

Figure 20:
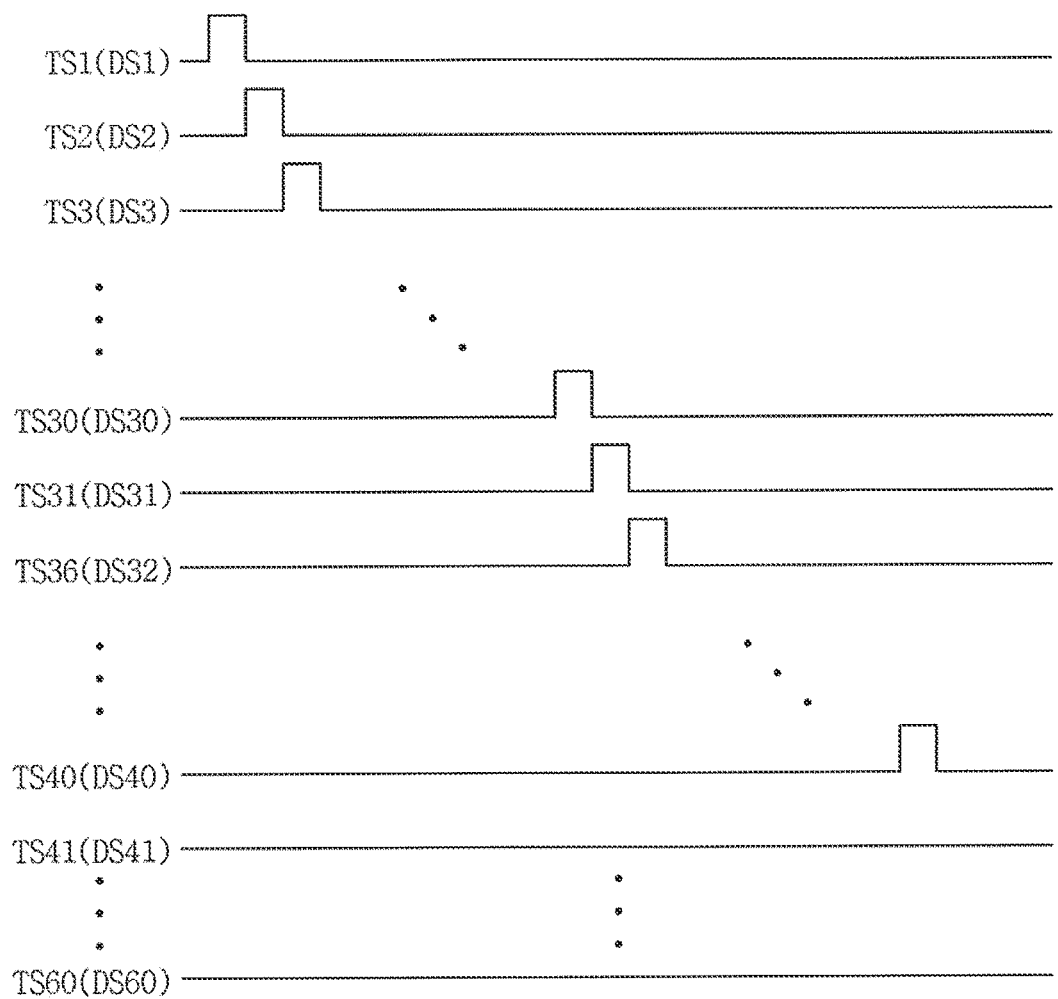
FIG. 20 is a timing diagram illustrating driving signals generated based on a curved portion of a touch display panel, a display divided area, and a non-display divided area of FIG. 19.

FIG. 20 is a timing diagram illustrating an example of driving signals generated based on the curved portion L, the display divided area A1, and the non-display divided area A2 of the touch display panel 155 in FIG. 19. When the curved portion L, the display divided area A1, and the non-display divided area A2 of the touch display panel 155 are defined as in FIG. 19, a driving line scan unit 401 drives at least one of touch sensing elements in the display divided area A1, but stops a driving operation of each of touch sensing elements TS41-TS60 in the non-display divided area A2. The driving line scan unit 401 may drive each of touch sensing elements TS1-TS30 in the display divided area A1.

The driving line scan unit 401 applies a driving signal to at least one of the touch sensing elements in the display divided area A1, but applies a driving signal to none of the touch sensing elements TS41-TS60 in the non-display divided area A2. For example, as illustrated in FIG. 19, the driving line scan unit 401 may sequentially output each of driving signals DS1-DS30 for driving the touch sensing elements TS1-TS30 in the display divided area A1, but may deactivate each of driving signals DS41-DS60 for driving the touch sensing elements TS41-TS60 in the non-display divided area A2. Accordingly, while all the touch sensing elements TS1-TS30 in the display divided area A1 may be operated, all the touch sensing elements TS41-TS60 in the non-display divided area A2 may not be operated. Accordingly, even though a touch is applied, each of the touch sensing elements TS41-TS60 may not respond to the touch.

At least one of the touch sensing elements TS31-TS40 in the curved portion L receives a driving signal. For example, in FIG. 19, each of the thirty-first to fortieth touch sensing elements TS31-TS40 may receive driving signals.

A driving operation of the driving line scan unit 401 with respect to FIG. 19 may be controlled by the timing controller 163, which may operate as the timing controller 163 and in accordance with the driving line scan unit 401 described for FIG. 10.

Figure 21:
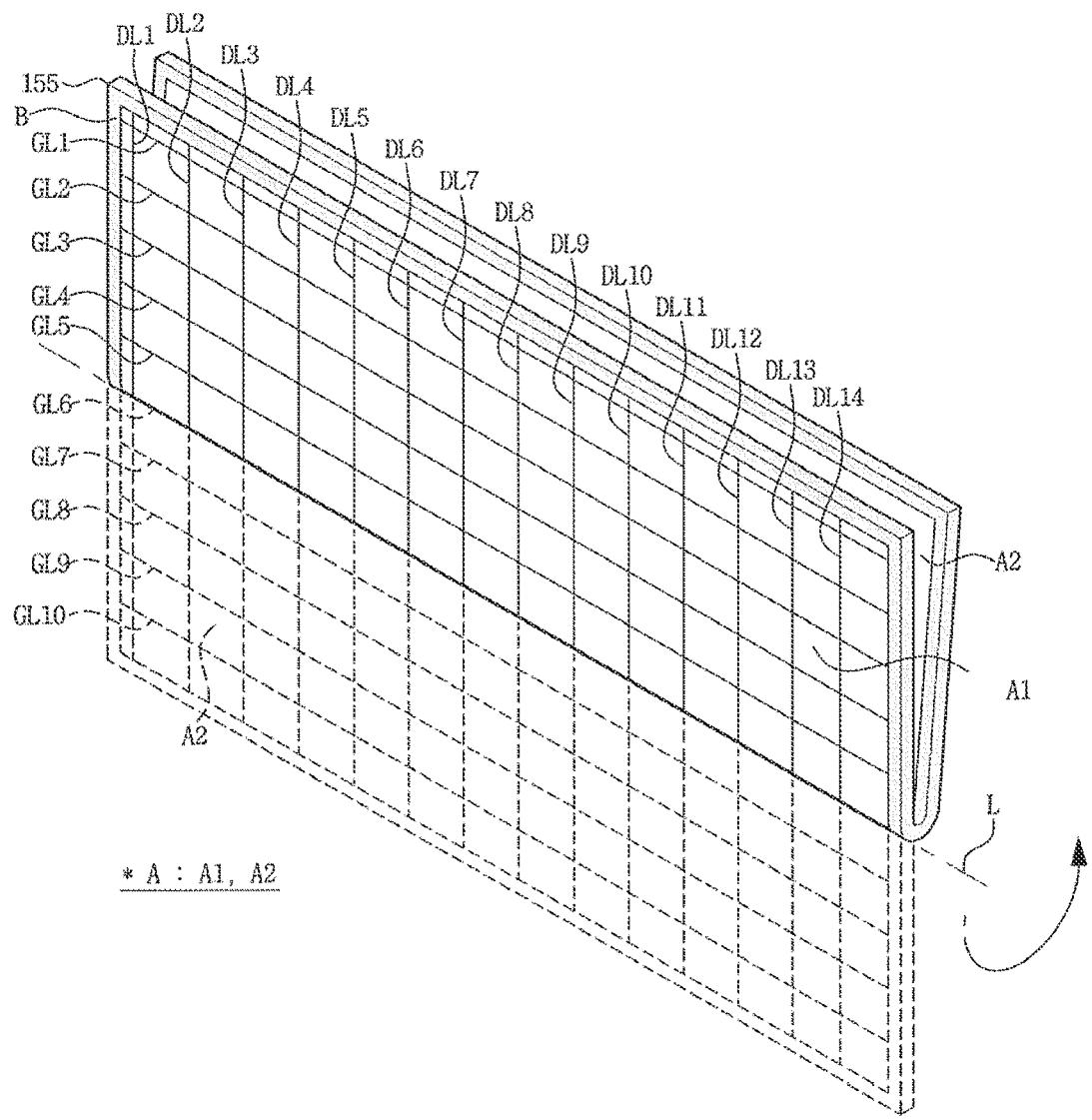
FIG. 21 is a view illustrating gate lines and data lines disposed in the display divided area and the non-display divided area of FIG. 19.
Figure 22:
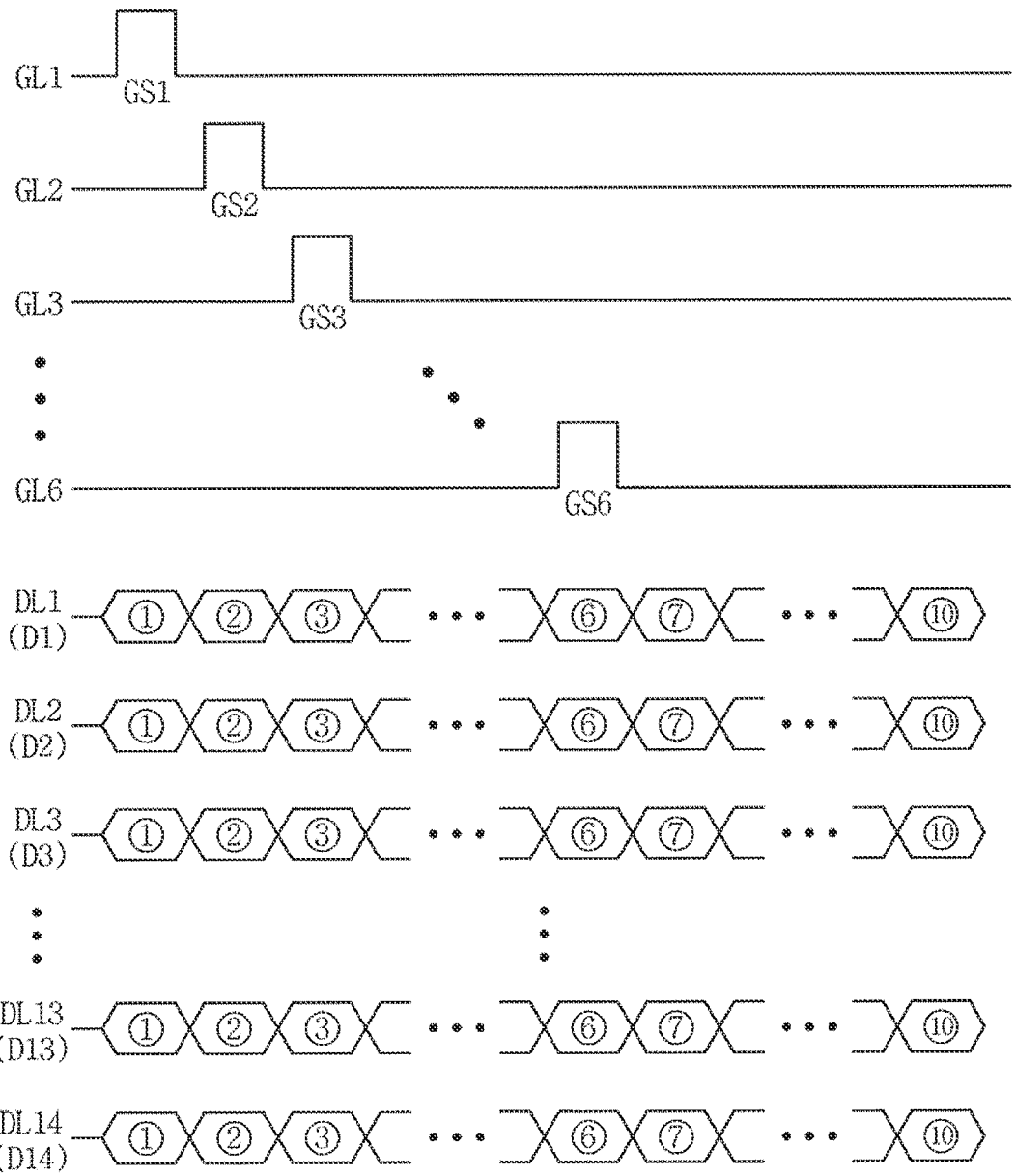
FIG. 22 is a timing diagram illustrating gate signals and data signals generated based on the curved portion, the display divided area, and the non-display divided area of the touch display panel of FIG. 19.

FIG. 21 illustrates an embodiment of the gate lines and the data lines in the display divided area A1 and the non-display divided area A2 of FIG. 19. FIG. 22 is a timing diagram illustrating an example of gate signals and data signals generated based on the curved portion L, the display divided area A1, and the non-display divided area A2 of the touch display panel 155 of FIG. 19. For illustrative purposes only, the flexible display device 1000 includes ten gate lines GL1-GL10 and fourteen data lines DL1-DL14.

When the curved portion L, the display divided area A1, and the non-display divided area A2 of the touch display panel 155 are defined as in FIG. 19, the curved portion L is parallel to at least one gate line and intersects each of the data lines DL1-DL14 as illustrated in FIG. 21. In this case, a driving operation of a gate driver 112 and a data driver 111 will be described hereinbelow.

The gate driver 112 drives at least one gate line in the display divided area A1, but stops a driving operation of each of the gate lines GL7-GL10 in the non-display divided area A2. The gate driver 112 may drive each of the gate lines GL1-GL6 in the display divided area A1. For example, the gate driver 112 may drive the first to sixth gate lines GL1-GL6 in the display divided area A1, but may not drive the seventh to tenth gate lines GL7-GL10 in the non-display divided area A2. In this case, the gate driver 112, as illustrated in FIG. 22, may output first to sixth gate signals GS1-GS6 sequentially. The first to sixth gate signals GS1-GS6 are applied to the first to sixth gate lines GL1-GL6 sequentially. However, the gate driver 112 may not output gate signals to the seventh to tenth gate lines GL7-GL10. For example, the gate driver 112 may apply a gate low voltage VGL to the seventh to tenth gate lines GL7-GL10.

The data driver 111 drives at least one data line. In one embodiment, the data driver 111 drives the first to fourteenth data lines DL1-DL14. To this end, the data driver 111, as illustrated in FIG. 22, may output first to fourteenth image data signals D1-D14 simultaneously. The first to fourteenth image data signals D1-D14 are simultaneously applied to the first to fourteenth data lines DL1-DL14, respectively. Each of the first to fourteenth image data signals D1-D14 include first to tenth pixel data ①, ②, ③, . . . , ⑥, ⑦, . . . , ⑩. Since the seventh to tenth gate lines GL7-GL10 to which the non-display pixels are connected are not driven, the seventh to tenth pixel data ⑦ to ⑩ of each image data signal are not applied to non-display pixels.

The driving operation of the gate driver 112 and the data driver 111 with respect to FIG. 22 may be controlled by the timing controller 163, in a manner similar to the timing controller 163 and in accordance with the gate driver 112 and the data driver 111 relating to FIG. 10.

Figure 23A:
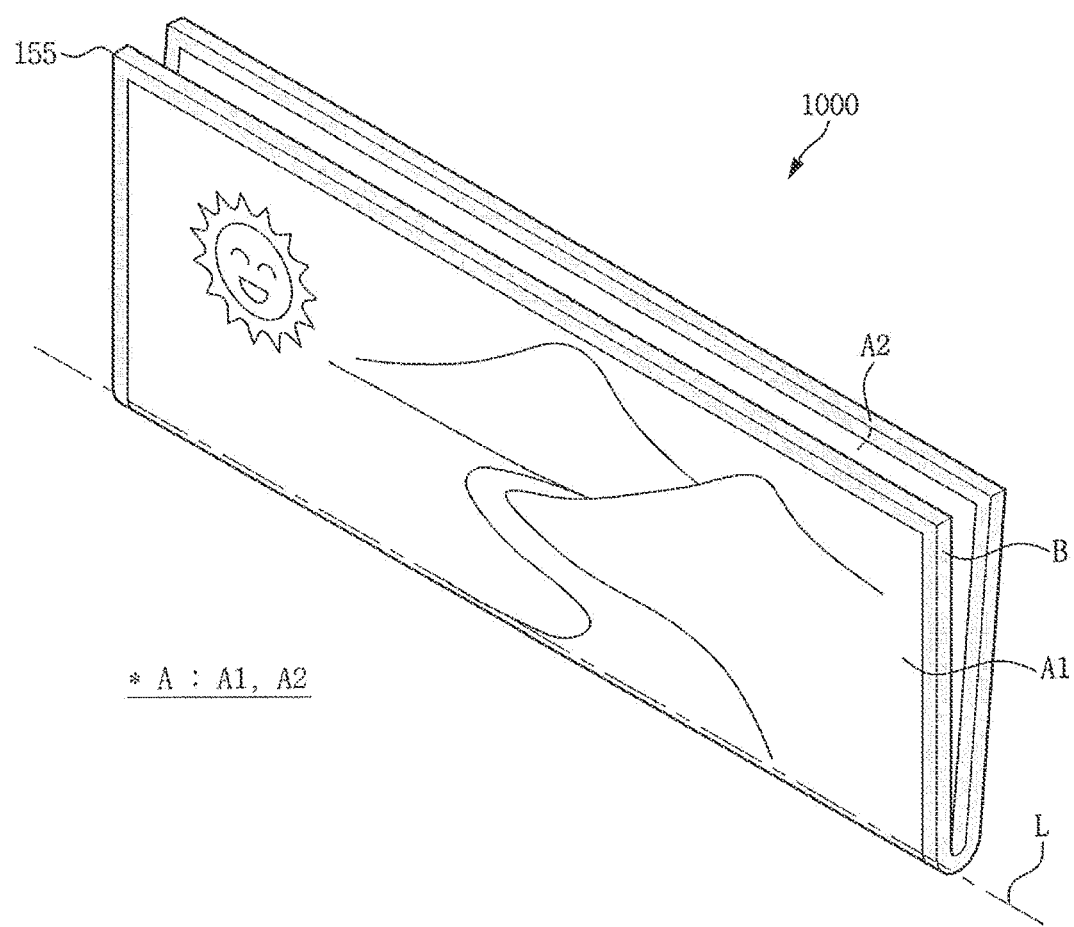
FIGS. 23A and 23B are views illustrating an image displayed in the display divided area and the non-display divided area based on the driving operation of the gate lines and the data lines of FIG. 22.
Figure 23B:
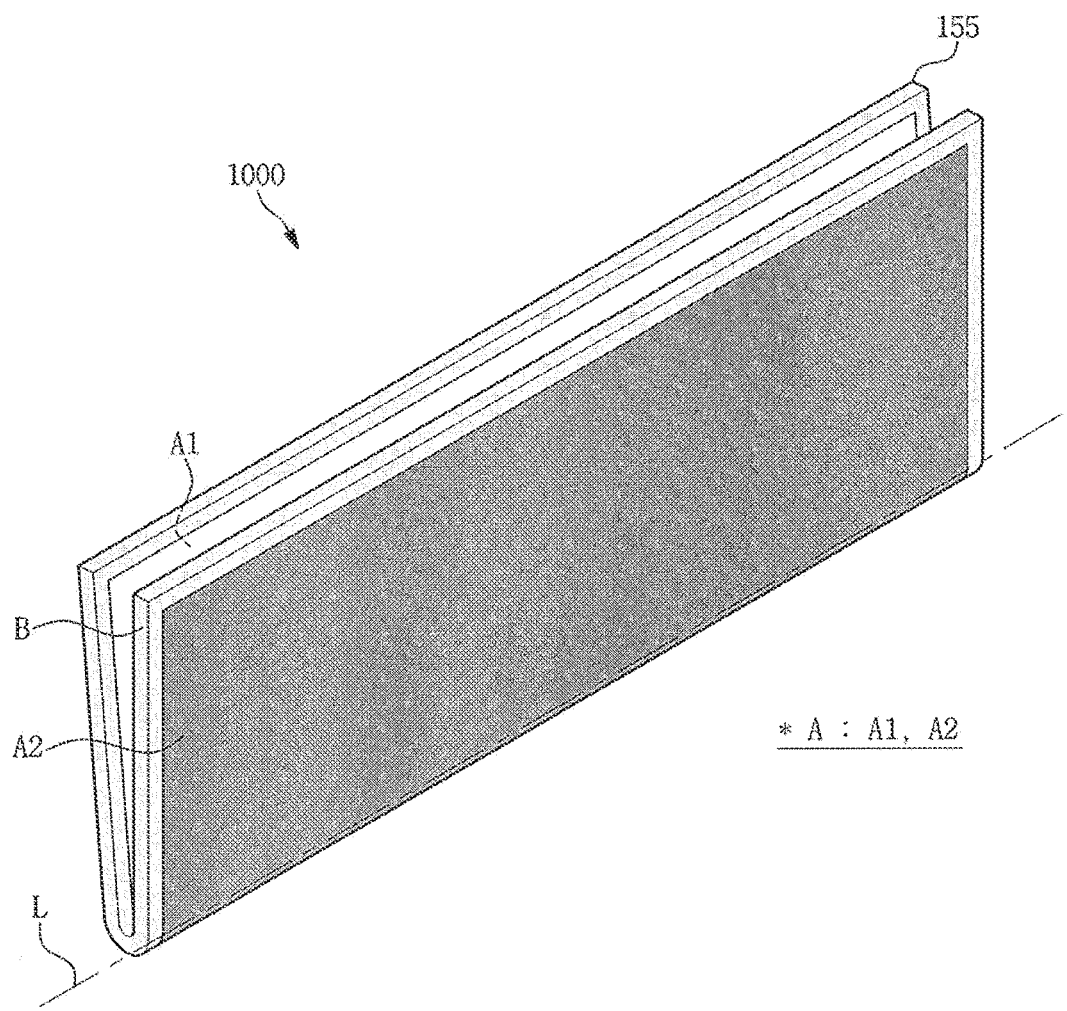

FIG. 23A illustrates an example of an image displayed in the display divided area A1 and FIG. 23B illustrates an example where an image is not displayed in the non-display divided area A2 based on the driving operation of the gate lines and the data lines in FIG. 22.

As illustrated in FIG. 23A, an image may be displayed throughout an entire portion of the display divided area A1. The image displayed on the display divided area A1 is based on the first to fourteenth image data signals D1-D14.

As illustrated in FIG. 23B, an image may not be displayed throughout an entire portion of the non-display divided area A2. For example, since the gate signals are not applied to the gate lines in the non-display divided area A2, image data signals may not be applied to non-display pixels. Accordingly, as time elapses, storage capacitors Cst of the non-display pixels in the non-display divided area A2 are to be discharged. In this case, driving switching elements Tr_D of the non-display pixels are turned off. Accordingly, light emitting elements EL of the non-display pixels no longer emit light.

Figure 24:
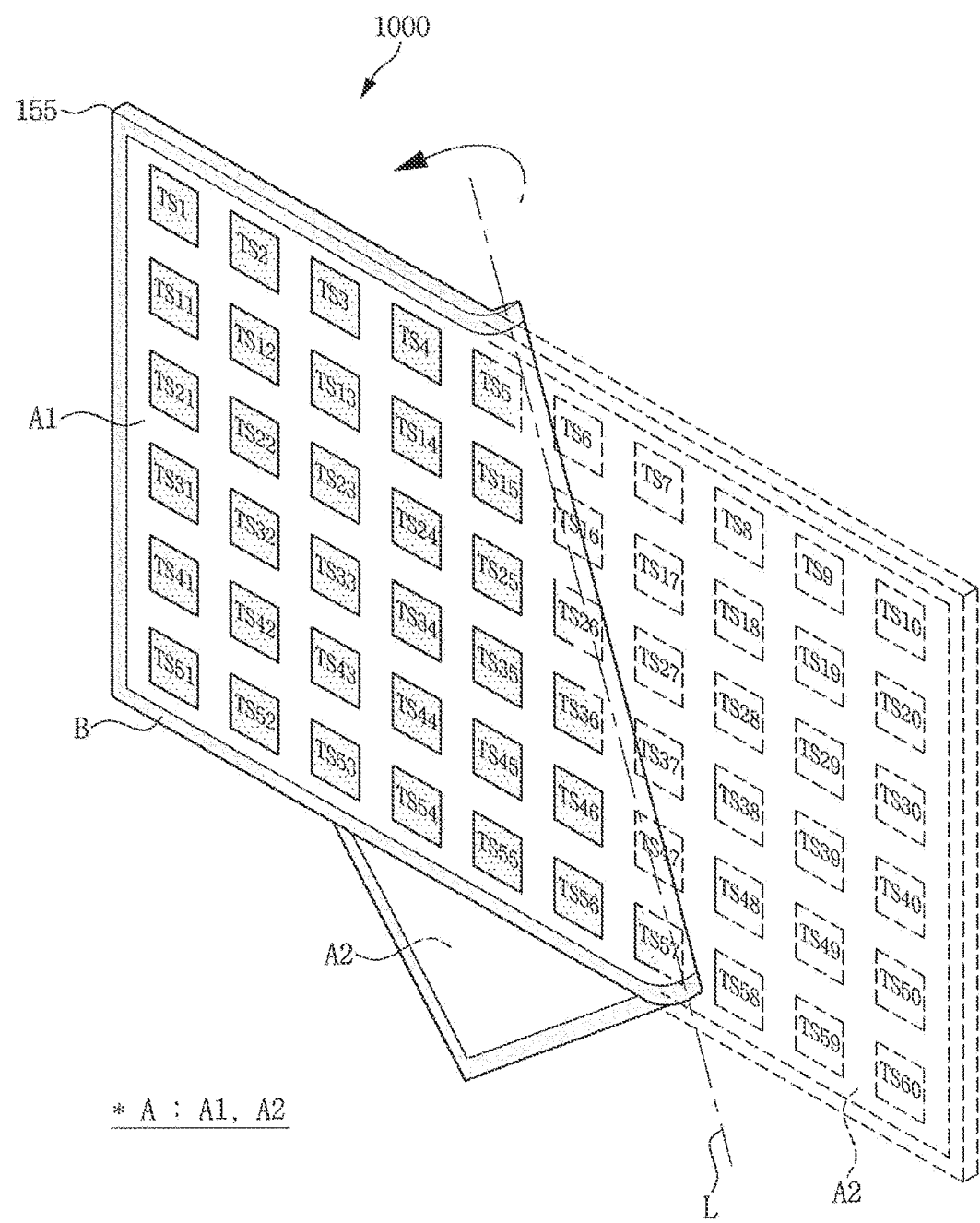
FIG. 24 is another view illustrating a state in which a flexible display device including elements of FIG. 1 is folded.

FIG. 24 illustrates the flexible display device 1000 in another folded state. As illustrated in FIG. 24, the flexible display device 1000 is folded with respect to an imaginary straight line L which intersects each of gate lines GL1-GL10 (i.e. all the gate lines; refer, e.g., to FIG. 25), and intersects a part of data lines DL8 and DL9 (i.e. some data lines; refer, e.g., to FIG. 25).

Fifth, sixteenth, twenty-sixth, forty-seventh, and fifty-seventh touch sensing elements TS5, TS16, TS26, TS47, and TS57 disposed along the imaginary straight line L may be bent to a greater extent than the other touch sensing elements. Accordingly, the fifth, sixteenth, twenty-sixth, forty-seventh, and fifty-seventh touch sensing elements TS5, TS16, TS26, TS47, and TS57 disposed along the imaginary straight line L may receive a greater pressure than a pressure the other touch sensing elements. The driving operation of the fifth, sixteenth, twenty-sixth, forty-seventh, and fifty-seventh touch sensing elements TS5, TS16, TS26, TS47, and TS57 disposed along the imaginary straight line L may be the same as the driving operation of the sixth, sixteenth, twenty-sixth, thirty-sixth, forty-sixth, and fifty-sixth touch sensing elements TS6, TS16, TS26, TS36, TS46, and TS56 described with reference to FIG. 8.

The touch detecting unit 171 detects a curved portion of the touch display panel 155 based on touch sensing signals from the touch sensing elements. For example, the touch detecting unit 171 may define, as the curved portion, a portion of the display area A overlapping the imaginary straight line L, which intersects at least two of the fifth, sixteenth, twenty-sixth, forty-seventh, and fifty-seventh touch sensing elements TS5, TS16, TS26, TS47, and TS57 generating touch sensing signals having a value greater than a predetermined threshold upper limit. For example, as illustrated in FIG. 24, a portion of the display area A overlapping the imaginary straight line L which intersects the fifth touch sensing element TS5 and the fifty-seventh touch sensing element TS57 disposed farthest from each other in space, may be defined as the curved portion. In exemplary embodiments, the curved portion will be represented by reference mark "L". The curved portion L of FIG. 24 intersects each of the gate lines GL1-GL10 and intersects the part of the data lines DL8 and DL9.

When the position of the curved portion L is defined in the manner described above, a screen dividing unit 172 divides the display area A of the touch display panel 155 into a plurality of divided areas with respect to the curved portion L. For example, as illustrated in FIG. 24, the display area A may be divided into two divided areas A1 and A2 with respect to the single curved portion L. When one of the divided areas is defined as a first divided area A1 and the other of the divided areas is defined as a second divided area A2, the second divided area A2 may be rotated by about 180 degrees with respect to the curved portion L as an axis to be disposed backwardly of the first divided area A1.

Subsequently, the screen dividing unit 172 defines the plurality of divided areas as a display divided area and a non-display divided area, respectively, based on the touch information. Descriptions with regard to the screen dividing unit 172 will make reference to the description described with reference to FIGS. 9A and 9B. The display area A, as illustrated in FIG. 24, is divided into the display divided area and the non-display divided area by the screen dividing unit 172. In exemplary embodiments, the display divided area will be represented by reference mark "A1" and the non-display divided area will be represented by reference mark "A2".

When the curved portion L, the display divided area A1, and the non-display divided area A2 of the touch display panel 155 are defined as in FIG. 24, a driving line scan unit 401 drives at least one of touch sensing elements in the display divided area A1, but stops a driving operation of each of touch sensing elements TS6-TS10, TS17-TS20, TS27-TS30, TS37-TS40, TS48-TS50, and TS58-TS60 in the non-display divided area A2. The driving line scan unit

401 may drive each of touch sensing elements TS1-TS4, TS11-TS15, TS21-TS25, TS31-TS36, TS41-TS46, and TS51-TS56 in the display divided area A1. For example, the driving line scan unit 401, as illustrated in FIG. 24, may drive each of the touch sensing elements TS1-TS4, TS11-TS15, TS21-TS25, TS31-TS36, TS41-TS46, and TS51-TS56 in the display divided area A1, but stop a driving operation of each of the touch sensing elements TS6-TS10, TS17-TS20, TS27-TS30, TS37-TS40, TS48-TS50, and TS58-TS60 in the non-display divided area A2. To this end, as described hereinabove, the driving line scan unit 401 sequentially outputs each of driving signals for driving the touch sensing elements in the display divided area A1, but deactivates driving signals for driving the touch sensing elements in the non-display divided area A2.

At least one of the touch sensing elements in the curved portion L receives a driving signal. For example, in FIG. 24, each of the fifth, sixteenth, twenty-sixth, forty-seventh, and fifty-seventh touch sensing elements TS5, TS16, TS26, TS47, and TS57 may receive driving signals.

The driving operation of the driving line scan unit 401 with respect to FIG. 24 may be controlled by a timing controller 163, which may operate in accordance with the timing controller 163 and the driving line scan unit 401 with reference to FIG. 10.

Figure 25:
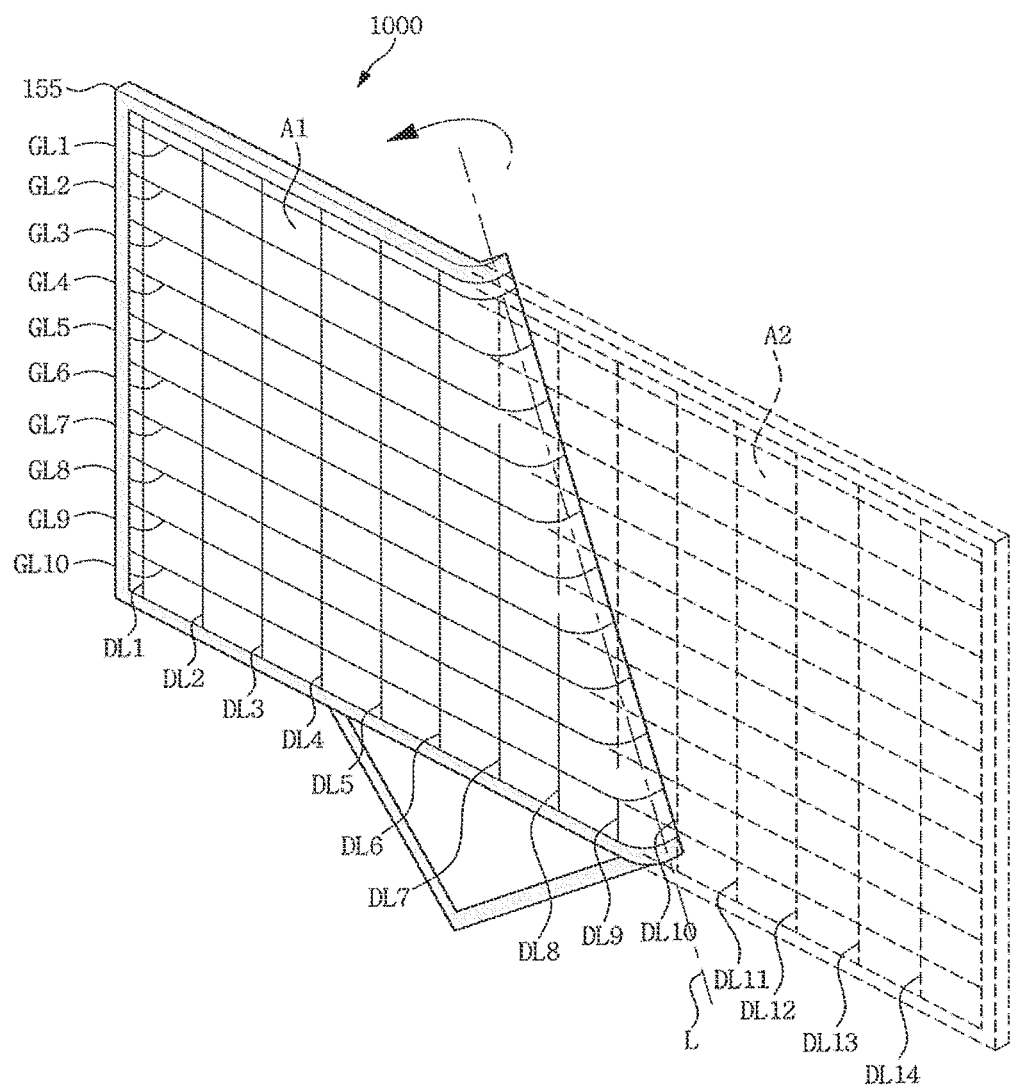
FIG. 25 is a view illustrating gate lines and data lines disposed in a display divided area and a non-display divided area of FIG. 24.

FIG. 25 illustrates an embodiment of the gate lines and the data lines in the display divided area A1 and the non-display divided area A2 of FIG. 24. For illustrative purposes only, the flexible display device 1000 includes ten gate lines GL1-GL10 and fourteen data lines DL1-DL14.

When the curved portion L, the display divided area A1, and the non-display divided area A2 of the touch display panel 155 are defined as in FIG. 24, the curved portion L intersects each of the gate lines GL1-GL10 and intersects a part of the data lines DL8 and DL9 as illustrated in FIG. 25.

The gate driver 112 drives at least one gate line. In one embodiment, the gate driver 112 may drive the first to tenth gate lines GL1-GL10. To this end, the gate driver 112 outputs first to tenth gate signals GS1-GS10 illustrated in FIG. 12 to the first to tenth gate lines GL1-GL10 sequentially.

The data driver 111 drives at least one data line in the display divided area A1 and not intersecting the curved portion L. For example, the data driver 111 may drive the first to seventh data lines DL1-DL7. However, the data driver 111 stops a driving operation of each of the data lines DL10-DL14 in the non-display divided area A2. For example, the data driver 111 stops a driving operation of the data lines DL10-DL14 in the non-display divided area A2 and the data lines DL8 and DL9 intersecting the curved portion L. For example, the data driver 111 may stop a driving operation of the eighth to fourteenth data lines DL8-DL14. To this end, the data driver 111 applies first to seventh image data signals to the first to seventh data lines DL1-DL7, but does not apply image data signals to the eighth to fourteenth data lines DL8-DL14.

The driving operation of the gate driver 112 and the data driver 111 with respect to FIG. 25 may be controlled by the timing controller 163, which may operate in accordance with the timing controller 163, the gate driver 112 and the data driver 111 described with reference to FIG. 10.

Figure 26A:
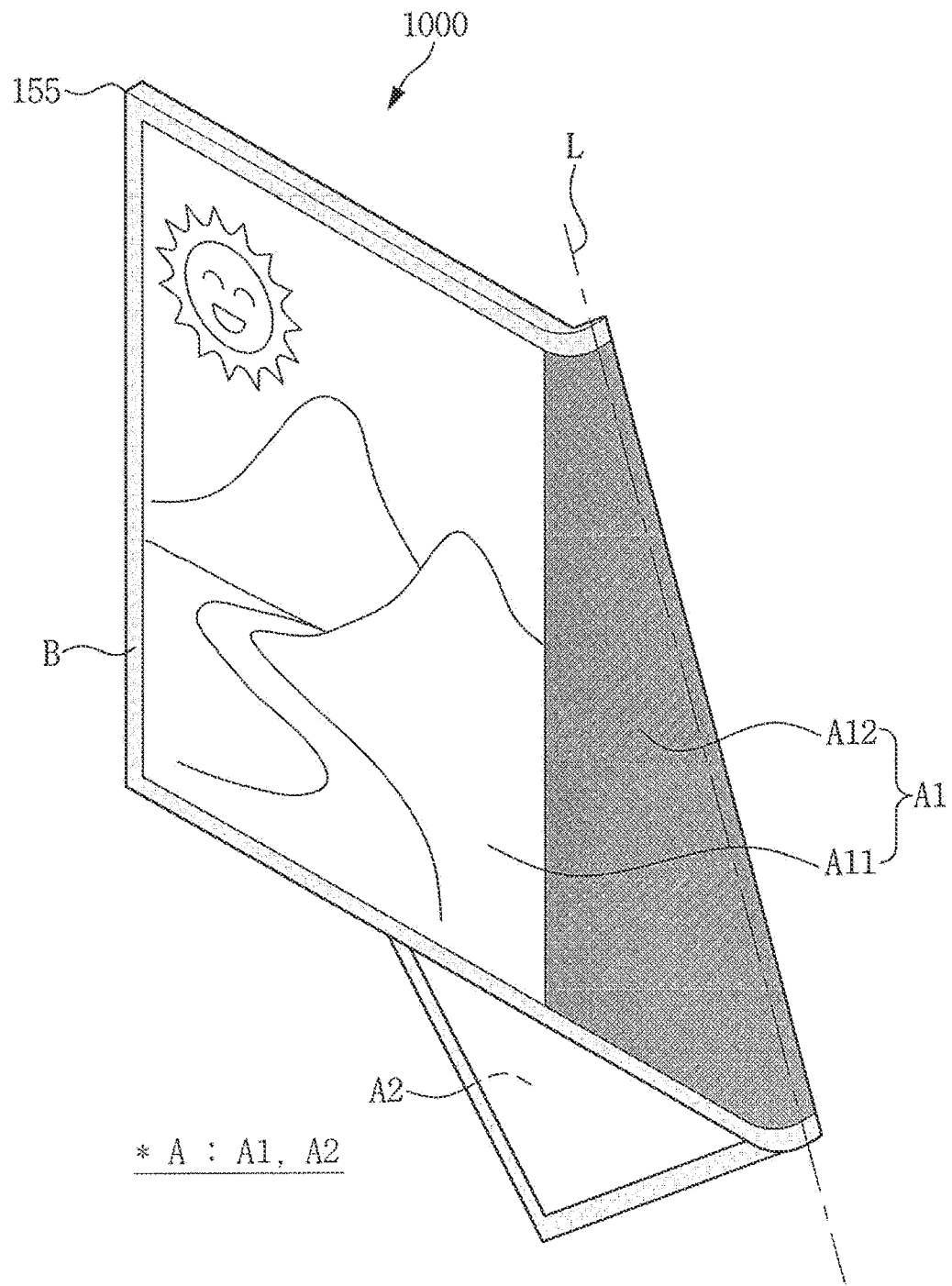
FIGS. 26A and 26B are views illustrating an image displayed in the display divided area and the non-display divided area based on the driving operation of the gate lines and the data lines of FIG. 25.
Figure 26B:
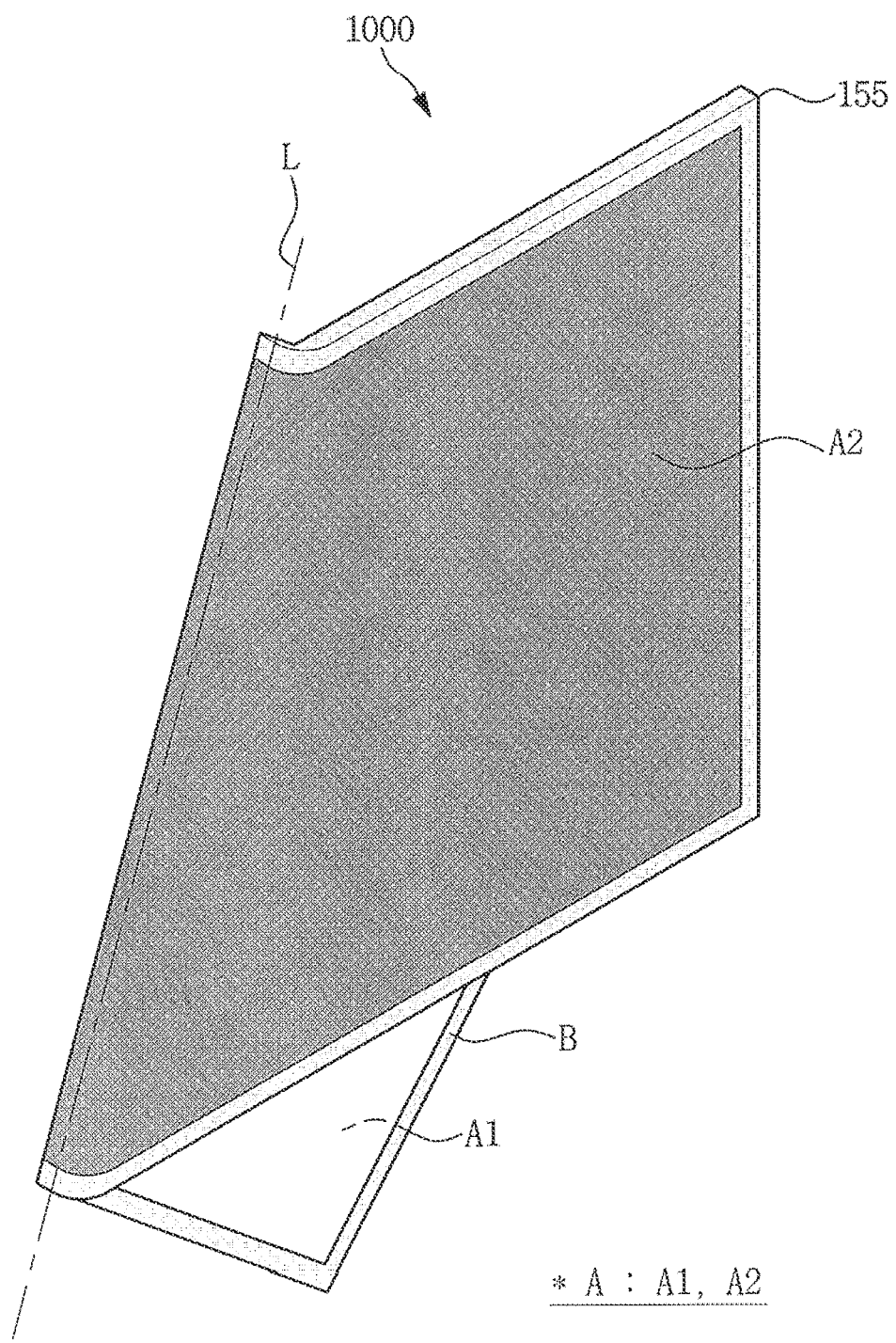

FIG. 26A illustrates an example of an image displayed in the display divided area A1 and FIG. 26B illustrates an example where in an image is not displayed in the non-display divided area A2 based on the driving operation of the gate lines and the data lines of FIG. 25.

As illustrated in FIG. 26A, an image is displayed on a portion A11 of the display divided area A1. However, an image is not displayed on the remainder A12 of the display divided area A1, aside from the portion A11. Pixels in the remainder A12 are connected to the data lines intersecting the curved portion L. The image displayed on the portion A11 of the display divided area A1 is based on the first to seventh image data signals D1-D7.

As illustrated in FIG. 26B, an image may not be displayed throughout an entire portion of the non-display divided area A2. For example, since image data signals are not applied to the data lines in the non-display divided area A2, as time elapses, storage capacitors Cst of non-display pixels in the non-display divided area A2 are to be discharged. In this case, driving switching elements Tr_D of the non-display pixels are turned off. Accordingly, light emitting elements EL of the non-display pixels no longer emit light.

Figure 27:
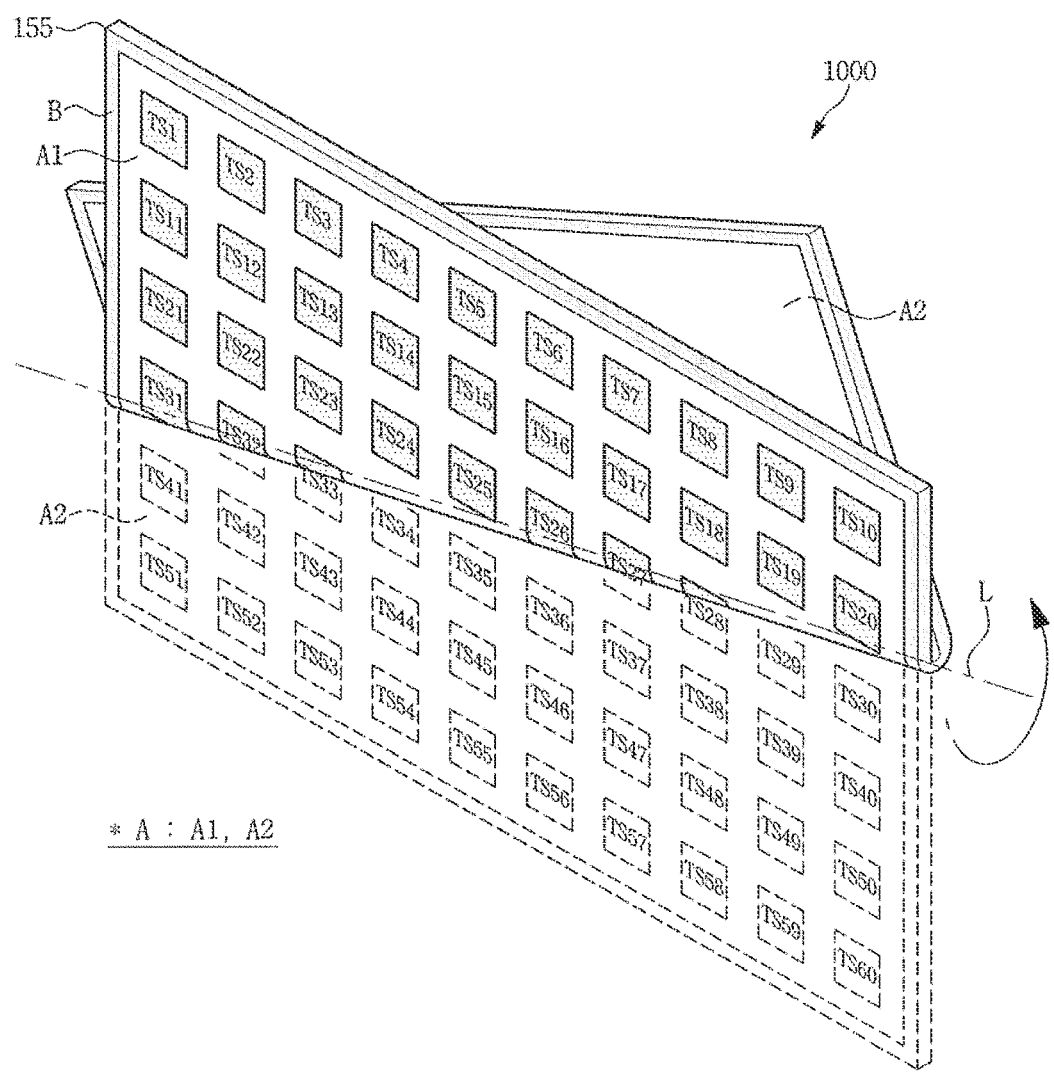
FIG. 27 is another view illustrating a state in which a flexible display device including elements of FIG. 1 is folded.

FIG. 27 illustrates another embodiment of the flexible display device 1000 in a folded state. As illustrated in FIG. 27, the flexible display device 1000 may be folded with respect to an imaginary straight line L. The imaginary straight line L in FIG. 27 intersects each of data lines DL1-DL14 (i.e. all the data lines; refer to FIG. 28) and intersects a part of gate lines GL4, GL5, and GL6 (i.e. some gate lines; refer, e.g., to FIG. 28).

Thirty-first, thirty-second, thirty-third, twenty-fifth, twenty-sixth, twenty-seventh, twenty-eighth, and twentieth touch sensing elements TS31, TS32, TS33, TS25, TS26, TS27, TS28, and TS20 disposed along the imaginary straight line L may be bent to a greater extent than the other touch sensing elements. Accordingly, the thirty-first, thirty-second, thirty-third, twenty-fifth, twenty-sixth, twenty-seventh, twenty-eighth, and twentieth touch sensing elements TS31, TS32, TS33, TS25, TS26, TS27, TS28, and TS20 disposed along the imaginary straight line L may receive a greater pressure than a pressure the other touch sensing elements.

The driving operation of the thirty-first, thirty-second, thirty-third, twenty-fifth, twenty-sixth, twenty-seventh, twenty-eighth, and twentieth touch sensing elements TS31, TS32, TS33, TS25, TS26, TS27, TS28, and TS20 disposed along the imaginary straight line L may be the same as the driving operation of the sixth, sixteenth, twenty-sixth, thirty-sixth, forty-sixth, and fifty-sixth touch sensing elements TS6, TS16, TS26, TS36, TS46, and TS56 in FIG. 8.

The touch detecting unit 171 detects a curved portion of the touch display panel 155 based on touch sensing signals from the touch sensing elements. For example, the touch detecting unit 171 may define, as the curved portion, a portion of the display area A overlapping the imaginary straight line L which intersects at least two of the thirty-first, thirty-second, thirty-third, twenty-fifth, twenty-sixth, twenty-seventh, twenty-eighth, and twentieth touch sensing elements TS31, TS32, TS33, TS25, TS26, TS27, TS28, and TS20 generating touch sensing signals having values greater than a predetermined threshold upper limit. For example, as illustrated in FIG. 27, a portion of the display area A overlapping the imaginary straight line L which intersects the thirty-first touch sensing element TS31 and the twentieth touch sensing element TS20 disposed farthest from each other in space, may be defined as the curved portion. In exemplary embodiments, the curved portion will be represented by reference mark "L". The curved portion L of FIG. 27 intersects each of the data lines DL1-DL14, and intersects the part of the gate lines GL4, GL5, and GL6.

When the position of the curved portion L is defined in the manner described above, a screen dividing unit 172 divides the display area A of the touch display panel 155 into a plurality of divided areas with respect to the curved portion L. For example, as illustrated in FIG. 27, the display area A may be divided into two divided areas A1 and A2 with respect to the single curved portion L. When one of the divided areas is defined as a first divided area A1 and the other of the divided areas is defined as a second divided area A2, the second divided area A2 may be rotated by about 180 degrees with respect to the curved portion L as an axis to be disposed backwardly of the first divided area A1.

Subsequently, the screen dividing unit 172 defines the plurality of divided areas as a display divided area and a non-display divided area, respectively, based on the touch information. Operation of the screen dividing unit 172 may be made with reference to FIGS. 9A and 9B. The display area A, as illustrated in FIG. 27, is divided into the display divided area and non-display divided area by the screen dividing unit 172. In exemplary embodiments, the display divided area will be represented by reference mark "A1" and the non-display divided area will be represented by reference mark "A2".

When the curved portion L, the display divided area A1, and the non-display divided area A2 of the touch display panel 155 are defined as in FIG. 27, a driving line scan unit 401 drives at least one of touch sensing elements in the display divided area A1, but stops a driving operation of each of touch sensing elements TS29, TS30, and TS34-TS60 in the non-display divided area A2. The driving line scan unit 401 may drive each of touch sensing elements TS1-TS19 and TS21-TS24 in the display divided area A1. For example, the driving line scan unit 401, as illustrated in FIG. 27, may drive each of the touch sensing elements TS1-TS19 and TS21-TS24 in the display divided area A1, but stop a driving operation of each of the touch sensing elements TS29, TS30, and TS34-TS60 in the non-display divided area A2. To this end, as described hereinabove, the driving line scan unit 401 sequentially outputs each of driving signals for driving the touch sensing elements TS1-TS19 and TS21-TS24 in the display divided area A1, but deactivates driving signals for driving the touch sensing elements TS29, TS30, and TS34-TS60 in the non-display divided area A2.

At least one of the touch sensing elements in the curved portion L receives a driving signal. For example, in FIG. 27, each of the thirty-first, thirty-second, thirty-third, twenty-fifth, twenty-sixth, twenty-seventh, twenty-eighth, and twentieth touch sensing elements TS31, TS32, TS33, TS25, TS26, TS27, TS28, and TS20 may receive driving signals.

The driving operation of the driving line scan unit 401 with respect to FIG. 27 may be controlled by a timing controller 163, which may operate in accordance with the timing controller 163 and the driving line scan unit 401 for FIG. 10.

Figure 28:
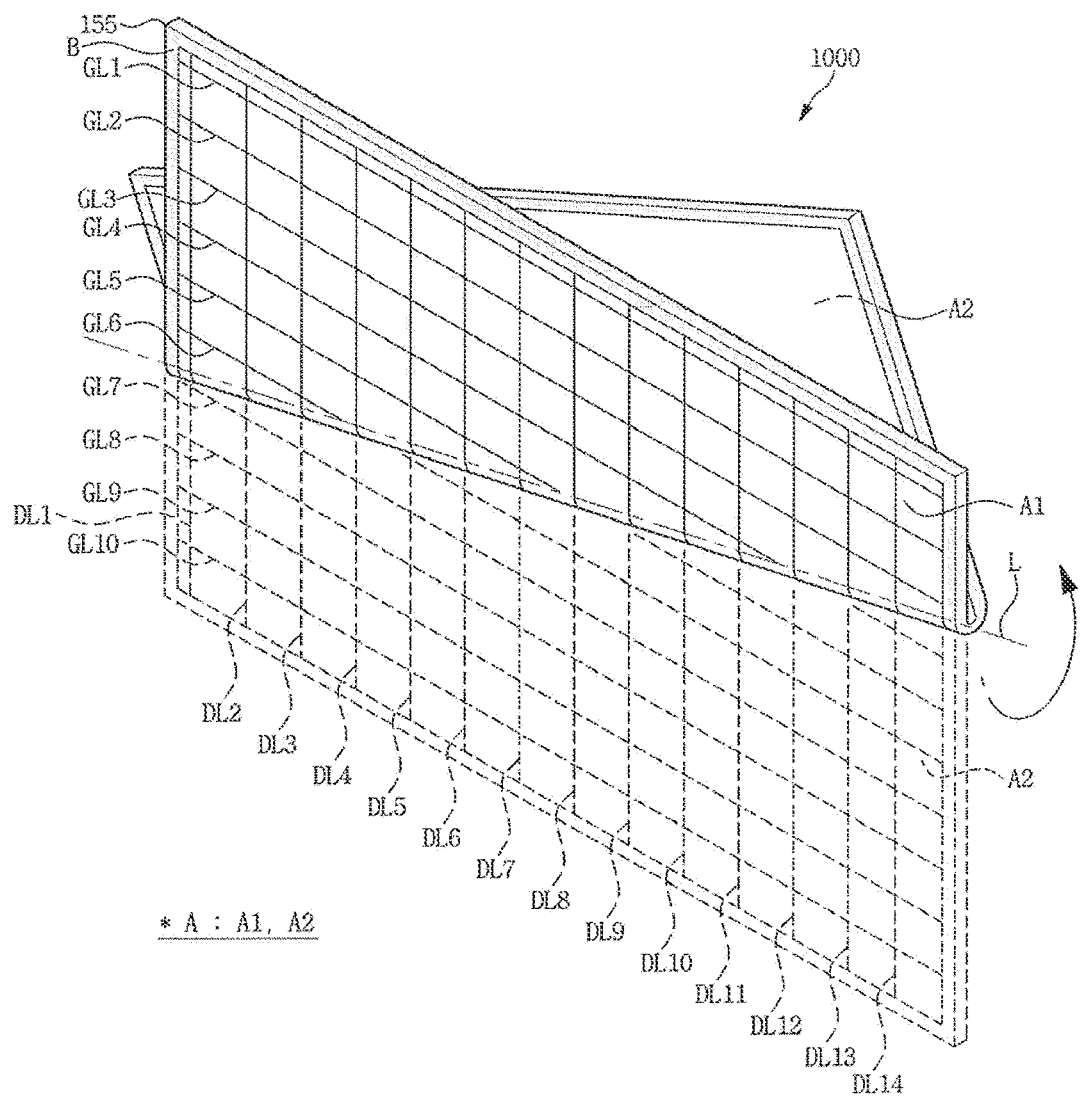
FIG. 28 is a view illustrating gate lines and data lines disposed in a display divided area and a non-display divided area of FIG. 27.

FIG. 28 illustrates an embodiment of the gate lines and the data lines in the display divided area A1 and the non-display divided area A2 of FIG. 27. For illustrative purposes only, the flexible display device 1000 includes ten gate lines GL1-GL10 and fourteen data lines DL1-DL14.

When the curved portion L, the display divided area A1, and the non-display divided area A2 of the touch display panel 155 are defined as in FIG. 27, the curved portion L intersects each of the data lines DL1-DL14 and intersects a part of the gate lines GL4-GL6 as illustrated in FIG. 28. In this case, a driving operation of a gate driver 112 and a data driver 111 will be described hereinbelow.

The gate driver 112 drives at least one gate line disposed in the display divided area A1 and not intersecting the curved portion L. For example, the gate driver 112 may drive the first to third data lines GL1-GL3. However, the gate driver 112 stops a driving operation of each of the gate lines GL7-GL10 in the non-display divided area A2. For example, the gate driver 112 stops a driving operation of the gate lines GL7-GL10 in the non-display divided area A2 and the gate lines GL4, GL5, and GL6 intersecting the curved portion L. For example, the gate driver 112 may stop a driving operation of the fourth to tenth gate lines GL4-GL10. To this end, the gate driver 112 applies first to third gate signals GL1-GL3 to the first to third gate lines GL1-GL3, but does not apply gate signals to the fourth to tenth gate lines GL4-GL10.

The data driver 111 drives at least one data line. In one embodiment, the data driver 111 may drive the first to fourteenth gate lines DL1-DL14. To this end, the data driver 111 outputs first to fourteenth data signals D1-D14 illustrated in FIG. 22 to the first to fourteenth data lines DL1-DL14. Each of the first to fourteenth image data signals D1-D14 include first to tenth pixel data.

The driving operation of the gate driver 112 and the data driver 111 with respect to FIG. 28 may be controlled by the timing controller 163, which may operate in accordance with the timing controller 163, the gate driver 112 and the data driver 111 described with reference to FIG. 10.

Figure 29A:
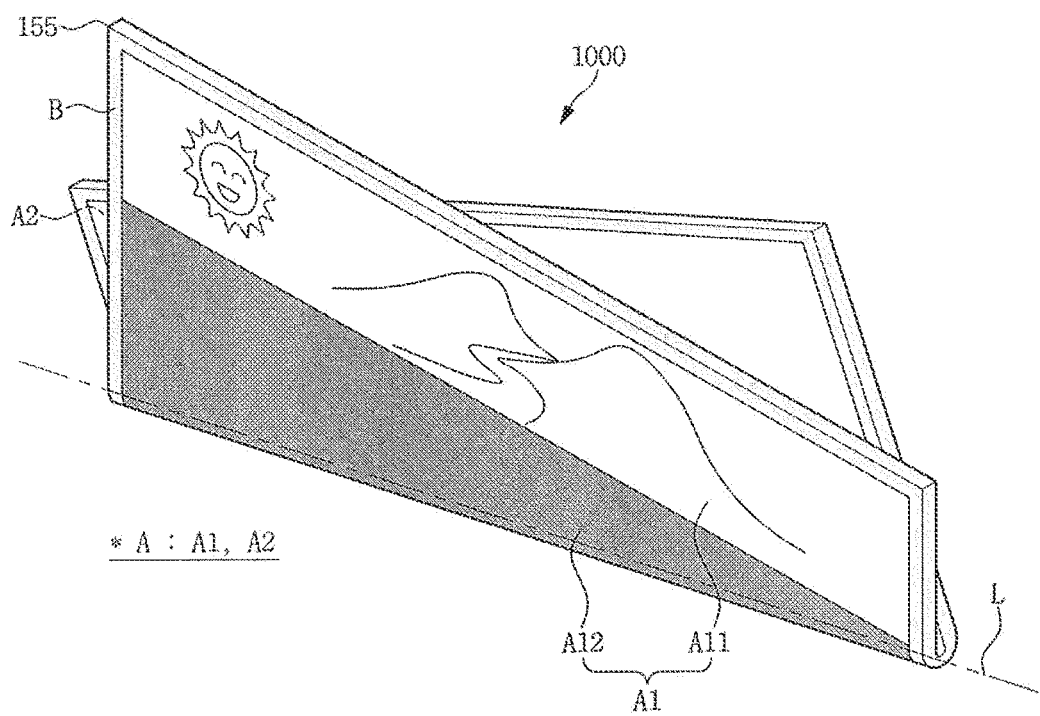
FIGS. 29A and 29B are views illustrating an image displayed in the display divided area and the non-display divided area based on the driving operation of the gate lines and the data lines of FIG. 28.
Figure 29B:
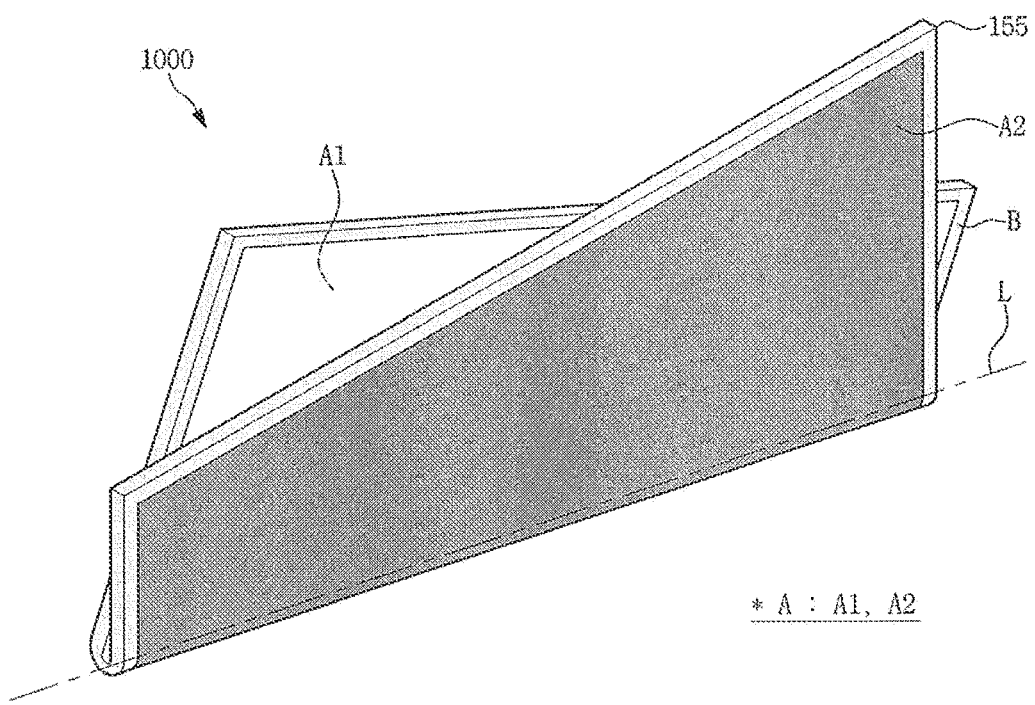

FIG. 29A illustrates an example of an image displayed in the display divided area A1 and FIG. 29B illustrates an example where an image is not displayed in the non-display divided area A2 based on the driving operation of the gate lines and the data lines of FIG. 28.

As illustrated in FIG. 29A, an image may be displayed on a portion A11 of the display divided area A1. However, an image is not displayed on the remainder A12 of the display divided area A1, aside from the portion A11. Pixels in the remainder A12 are connected to the gate lines intersecting the curved portion L. The image displayed on the portion A11 of the display divided area A1 is based on the first to fourteenth image data signals D1-D14. On the other hand, as illustrated in FIG. 29B, an image may not be displayed throughout an entire portion of the non-display divided area A2.

Figure 30:
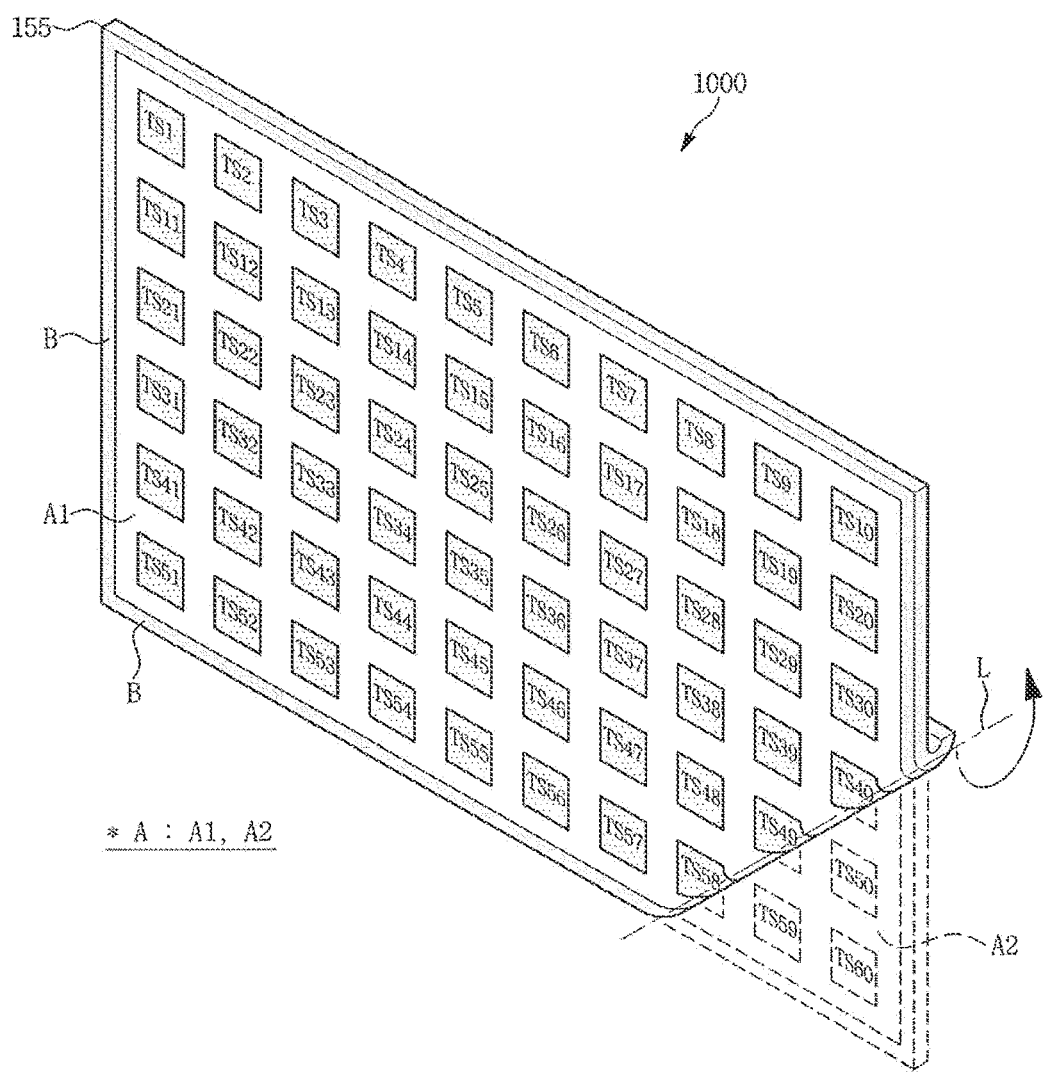
FIG. 30 is another view illustrating a state in which a flexible display device including elements of FIG. 1 is folded.

FIG. 30 illustrates another embodiment of the flexible display device 1000 in a folded state. As illustrated in FIG. 30, the flexible display device 1000 is folded with respect to an imaginary straight line L. The imaginary straight line L in FIG. 30 intersects a part of gate lines GL6, GL7, GL8, GL9, and GL10 (refer, e.g., to FIG. 31), and intersects a part of data lines DL11, DL12, DL13, and DL14 (refer, e.g., to FIG. 31).

Fifty-eighth, forty-ninth, and fortieth touch sensing elements TS58, TS49, and TS40 disposed along the imaginary straight line L may be bent to a greater extent that the other touch sensing elements. Accordingly, the fifty-eighth, forty-ninth, and fortieth touch sensing elements TS58, TS49, and TS40 disposed along the imaginary straight line L may receive a greater pressure than a pressure the other touch sensing elements. The driving operation of the fifty-eighth, forty-ninth, and fortieth touch sensing elements TS58, TS49, and TS40 disposed along the imaginary straight line L may be the same as the driving operation of the sixth, sixteenth, twenty-sixth, thirty-sixth, forty-sixth, and fifty-sixth touch sensing elements TS6, TS16, TS26, TS36, TS46, and TS56 described with reference to FIG. 8.

The touch detecting unit 171 detects a curved portion of the touch display panel 155 based on touch sensing signals from the touch sensing elements. For example, the touch detecting unit 171 may define, as the curved portion, a portion of the display area A overlapping the imaginary straight line L, which intersects at least two of the fifty-eighth, forty-ninth, and fortieth touch sensing elements TS58, TS49, and TS40 generating touch sensing signals having values greater than a predetermined threshold upper limit. For example, as illustrated in FIG. 30, a portion of the display area A overlapping the imaginary straight line L which intersects the fifty-eighth touch sensing element TS58 and the fortieth touch sensing element TS40 disposed farthest from each other in space, may be defined as the curved portion. In exemplary embodiments, the curved portion will be represented by reference mark "L". The curved portion L of FIG. 30 intersects a part of the gate lines GL6-GL10, and intersects a part of the data lines DL11-DL14.

When the position of the curved portion L is defined in the manner described above, a screen dividing unit 172 divides the display area A of the touch display panel 155 into a plurality of divided areas with respect to the curved portion L. For example, as illustrated in FIG. 30, the display area A may be divided into two divided areas A1 and A2 with respect to the single curved portion L. When one of the divided areas is defined as a first divided area A1 and the other of the divided areas is defined as a second divided area A2, the second divided area A2 may be rotated by about 180 degrees with respect to the curved portion L as an axis to be disposed backwardly of the first divided area A1.

Subsequently, the screen dividing unit 172 defines the plurality of divided areas as a display divided area and a non-display divided area, respectively, based on the touch information. The screen dividing unit 172 may operate in accordance with FIGS. 9A and 9B. The display area A, as illustrated in FIG. 30, is divided into the display divided area and the non-display divided area by the screen dividing unit 172. In exemplary embodiments, the display divided area will be represented by reference mark "A1" and the non-display divided area will be represented by reference mark "A2".

When the curved portion L, the display divided area A1, and the non-display divided area A2 of the touch display panel 155 are defined as in FIG. 30, a driving line scan unit 401 drives at least one of touch sensing elements in the display divided area A1, but stops a driving operation of each of touch sensing elements in the non-display divided area A2. The driving line scan unit 401 may drive each of the touch sensing elements in the display divided area A1. For example, the driving line scan unit 401, as illustrated in FIG. 30, may drive each of the touch sensing elements TS1-TS39, TS41-TS48, and TS51-TS57 in the display divided area A1, but stop a driving operation of each of the touch sensing elements TS50, TS59, and TS60 in the non-display divided area A2. As described above, the driving line scan unit 401 sequentially outputs each of driving signals for driving the touch sensing elements TS1-TS39, TS41-TS48, and TS51-TS57 in the display divided area A1, but deactivates driving signals for driving the touch sensing elements TS50, TS59, and TS60 in the non-display divided area A2.

At least one of the touch sensing elements in the curved portion L receives a driving signal. For example, in FIG. 30, each of the fifty-eighth, forty-ninth, and fortieth touch sensing elements TS58, TS49, and TS40 receives driving signals.

The driving operation of the driving line scan unit 401 with respect to FIG. 30 may be controlled by a timing controller 163, which may operate in accordance with the timing controller 163 and the driving line scan unit 401 described for FIG. 10.

Figure 31:
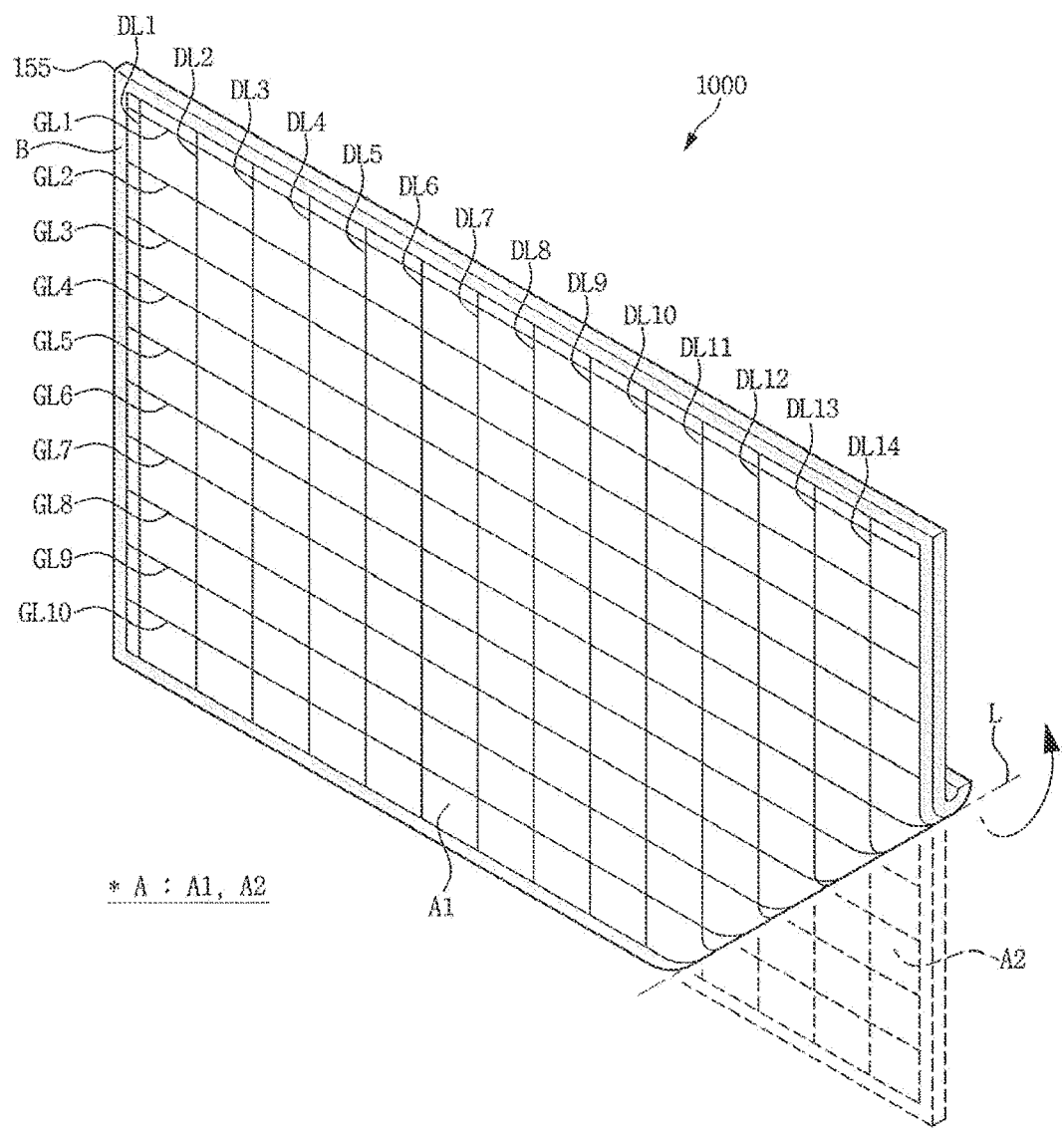
FIG. 31 is a view illustrating gate lines and data lines disposed in a display divided area and a non-display divided area of FIG. 30.

FIG. 31 illustrates an embodiment of the gate lines and the data lines in the display divided area A1 and the non-display divided area A2 of FIG. 30. For illustrative purposes only, the flexible display device 1000 includes ten gate lines GL1-GL10 and fourteen data lines DL1-DL14.

When the curved portion L, the display divided area A1, and the non-display divided area A2 of the touch display panel 155 are defined as in FIG. 31, the curved portion L intersects a part of the gate lines GL6-GL10 and intersects a part of the data lines DL11-DL14 as illustrated in FIG. 31.

The gate driver 112 drives at least one gate line. In one embodiment, the gate driver 112 may drive the first to tenth gate lines GL1-GL10. The driving operation of the gate driver 112 with respect to FIG. 31 may be the same as the driving operation of the gate driver 112 described with reference to FIG. 25.

The data driver 111 drives at least one of data lines in the display divided area A1 and not intersecting the curved portion L. For example, the data driver 111 may drive the first to tenth data lines DL1-DL10. However, the data driver 111 stops a driving operation of each of the data lines in the non-display divided area A2. The data driver 111 stops a driving operation of the data lines disposed in the non-display divided area A2 and the data lines DL11-DL14 intersecting the curved portion L. For example, the data driver 111 may stop a driving operation of the eleventh to fourteenth data lines DL11-DL14. The driving operation of the data driver 111 with respect to FIG. 31 may be the same as the driving operation of the data driver 111 described with reference to FIG. 25. Also, the driving operation of the gate driver 112 and the data driver 111 with respect to FIG. 31 may be controlled by the timing controller 163, which may operate in accordance with the timing controller 163, the gate driver 112 and the data driver 111 described with reference to FIG. 10.

Figure 32A:
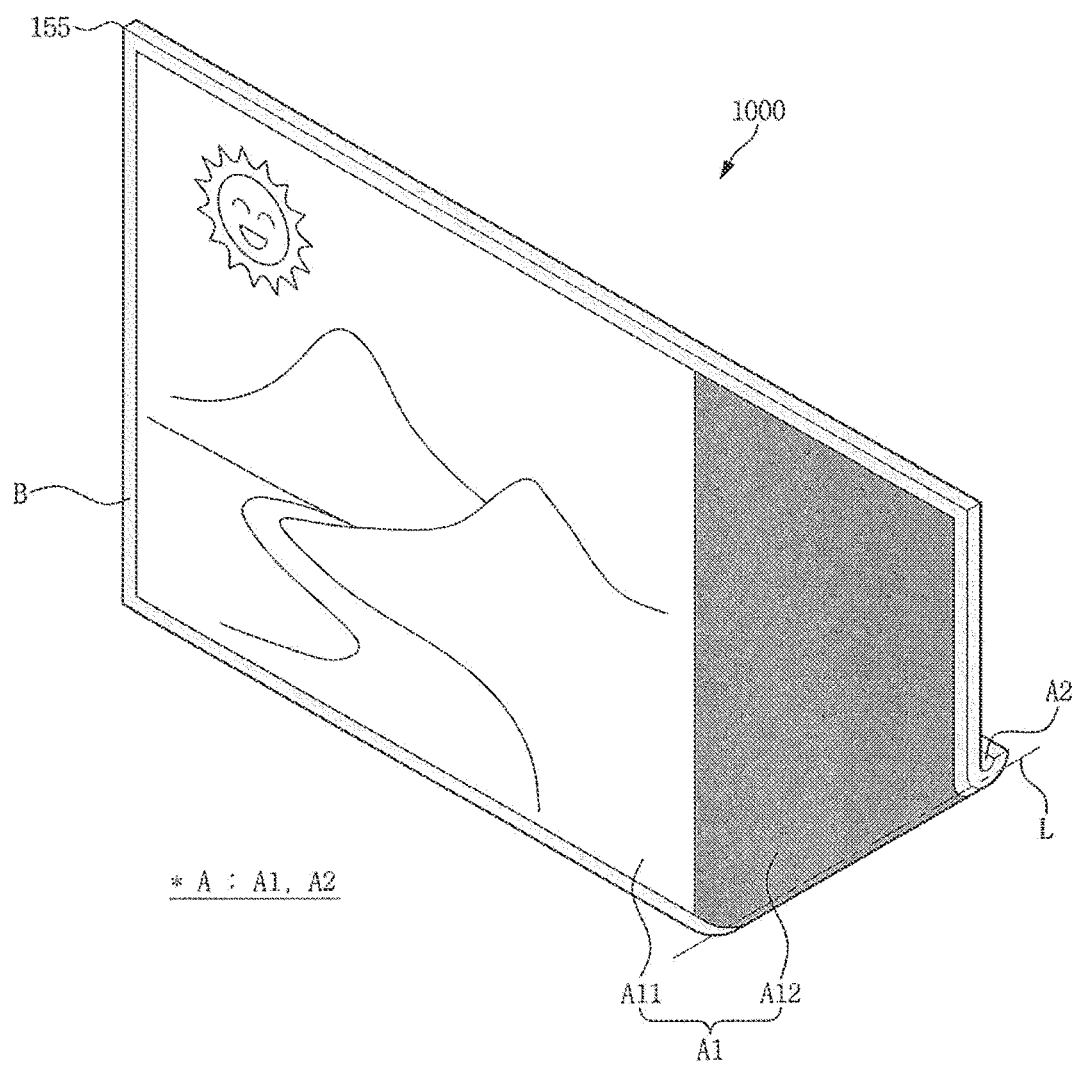
FIGS. 32A and 32B are views illustrating an image displayed in the display divided area and the non-display divided area based on the driving operation of the gate lines and the data lines of FIG. 31.
Figure 32B:
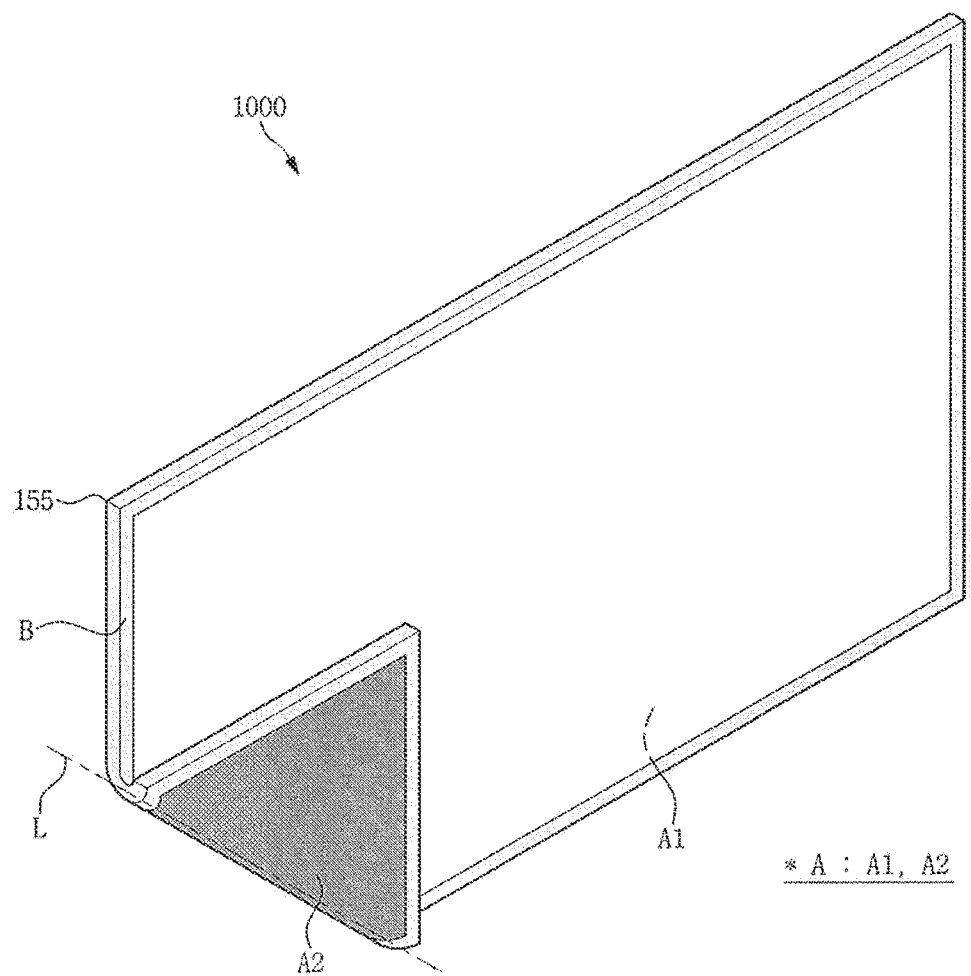

FIG. 32A illustrates an example of an image displayed in the display divided area A1 and FIG. 32B illustrates an example where in an image is not displayed in the non-display divided area A2 based on the driving operation of the gate lines and the data lines of FIG. 31.

As illustrated in FIG. 32A, an image may be displayed on a portion A11 of the display divided area A1. However, an image is not displayed on the remainder A12 of the display divided area A1, aside from the portion A11. Pixels in the remainder A12 are connected to the data lines intersecting the curved portion L. The image displayed on the portion A11 of the display divided area A1 is based on the first to tenth image data signals D1-D10. On the other hand, as illustrated in FIG. 32B, an image may not be displayed throughout an entire portion of the non-display divided area A2.

The driving operation of the gate driver 112 and the data driver 111 with respect to FIG. 31 may be the same as the driving operation of the gate driver 112 and the data driver 111 described with reference to FIG. 28. In this case, an image based on the driving operation of the gate driver 112 and the data driver 111 of FIG. 31 may be displayed in the same manner as a manner in which the image is displayed in FIGS. 29A and 29B.

Figure 33:
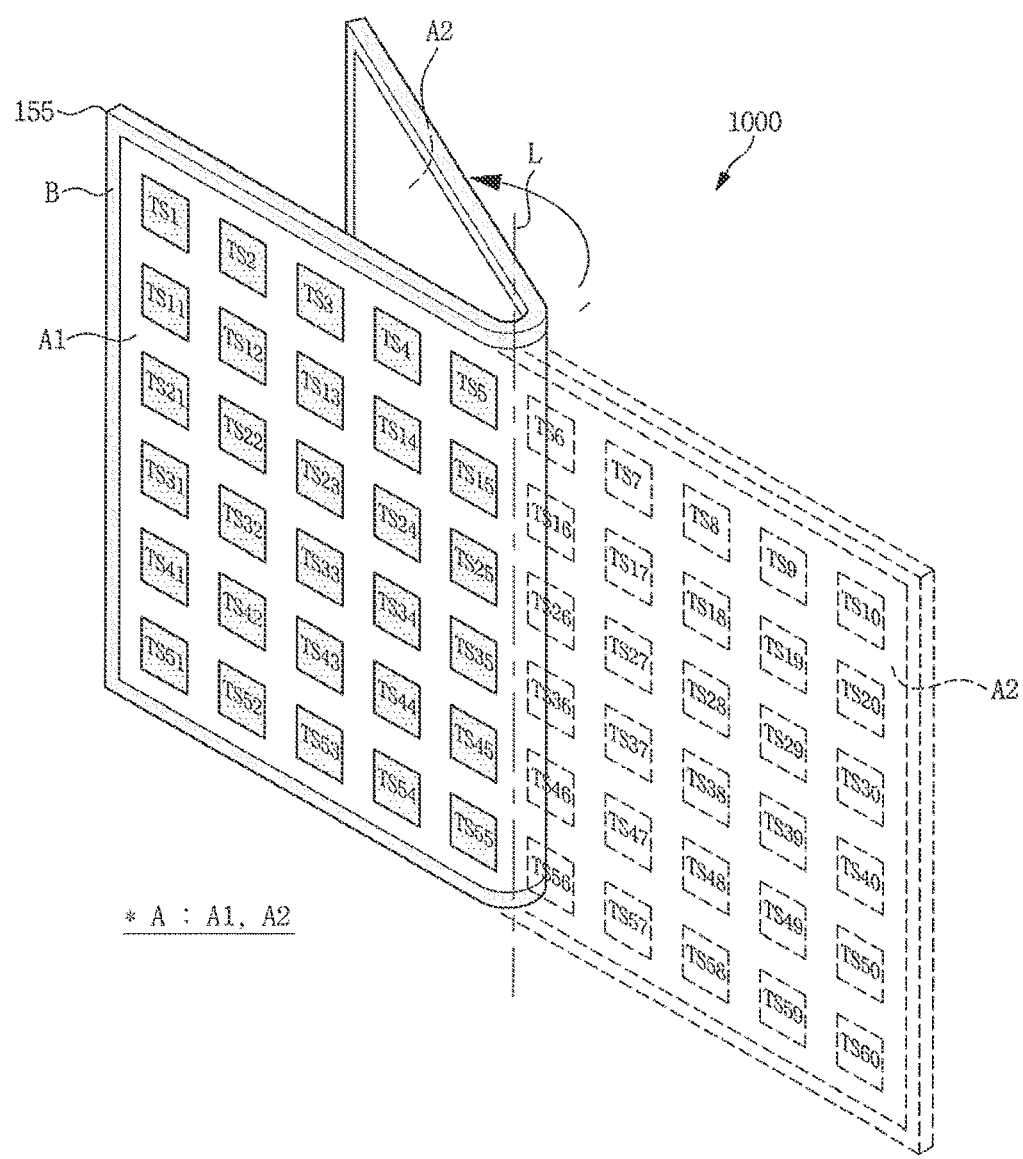
FIG. 33 is yet another view illustrating a state in which a flexible display device including elements of FIG. 1 is folded.

FIG. 33 illustrates another embodiment of the flexible display device 1000 in a folded state. As illustrated in FIG. 33, the touch display panel 155 of the flexible display device 1000 includes a display area A and a non-display area B. Gate lines GL1-GL10, data lines DL1-DL14, touch sensing elements TS1-TS60, and pixels may be in the display area A, and the panel driving unit 180 in FIG. 1 may be in non-display area B.

As illustrated in FIG. 33, the flexible display device 1000 may be folded with respect to an imaginary straight line L. The imaginary straight line L in FIG. 33 is substantially parallel to at least one data line and intersects each of the gate lines GL1-GL10. In this case, the imaginary straight line L intersects none of the touch sensing elements.

The fifth, sixth, fifteenth, sixteenth, twenty-fifth, twenty-sixth, thirty-fifth, thirty-sixth, forty-fifth, forty-sixth, fifty-fifth, and fifty-sixth touch sensing elements TS5, TS6, TS15, TS16, TS25, TS26, TS35, TS36, TS45, TS46, TS55, and TS56 adjacent to the imaginary straight line L may be bent to a greater extent than the other touch sensing elements. Accordingly, the fifth, sixth, fifteenth, sixteenth, twenty-fifth, twenty-sixth, thirty-fifth, thirty-sixth, forty-fifth, forty-sixth, fifty-fifth, and fifty-sixth touch sensing elements TS5, TS6, TS15, TS16, TS25, TS26, TS35, TS36, TS45, TS46, TS55, and TS56 adjacent to the imaginary straight line L may receive a greater pressure than a pressure the other touch sensing elements.

Accordingly, the fifth, sixth, fifteenth, sixteenth, twenty-fifth, twenty-sixth, thirty-fifth, thirty-sixth, forty-fifth, forty-sixth, fifty-fifth, and fifty-sixth touch sensing elements TS5, TS6, TS15, TS16, TS25, TS26, TS35, TS36, TS45, TS46, TS55, and TS56 adjacent to the imaginary straight line L may exhibit resistance values different from a resistance value of the other touch sensing elements. For example, when a touch sensing element has a resistance value inversely proportional to an applied pressure, the fifth, sixth, fifteenth, sixteenth, twenty-fifth, twenty-sixth, thirty-fifth, thirty-sixth, forty-fifth, forty-sixth, fifty-fifth, and fifty-sixth touch sensing elements TS5, TS6, TS15, TS16, TS25, TS26, TS35, TS36, TS45, TS46, TS55, and TS56 adjacent to the imaginary straight line L have resistance values less than resistance values of the other touch sensing elements.

In this case, touch sensing signals generated from the fifth, sixth, fifteenth, sixteenth, twenty-fifth, twenty-sixth, thirty-fifth, thirty-sixth, forty-fifth, forty-sixth, fifty-fifth, and fifty-sixth touch sensing elements TS5, TS6, TS15, TS16, TS25, TS26, TS35, TS36, TS45, TS46, TS55, and TS56 adjacent to the imaginary straight line L may have values greater than values of touch sensing signals from the other touch sensing elements.

For example, the touch sensing signals generated from the fifth, sixth, fifteenth, sixteenth, twenty-fifth, twenty-sixth, thirty-fifth, thirty-sixth, forty-fifth, forty-sixth, fifty-fifth, and fifty-sixth touch sensing elements TS5, TS6, TS15, TS16, TS25, TS26, TS35, TS36, TS45, TS46, TS55, and TS56 adjacent to the imaginary straight line L may have values greater than a predetermined threshold upper limit. The touch sensing signals from the other touch sensing elements may have values less than the predetermined threshold upper limit.

The touch detecting unit 171 detects a curved portion of the touch display panel 155 based on the touch sensing signals from the touch sensing elements TS1-TS60. For example, the touch detecting unit 171 may define, as the curved portion, a portion of the display area A overlapping the imaginary straight line L, which is positioned among the fifth, sixth, fifteenth, sixteenth, twenty-fifth, twenty-sixth, thirty-fifth, thirty-sixth, forty-fifth, forty-sixth, fifty-fifth, and fifty-sixth touch sensing elements TS5, TS6, TS15, TS16, TS25, TS26, TS35, TS36, TS45, TS46, TS55, and TS56 generating touch sensing signals having values greater than the predetermined threshold upper limit. In exemplary embodiments, the curved portion will be represented by reference mark "L". The curved portion L of FIG. 33 is substantially parallel to at least one data line and intersects each of the gate lines GL1-GL10. The curved portion L intersects none of the touch sensing elements.

When the position of the curved portion L is defined in the manner described above, a screen dividing unit 172 divides the display area A of the touch display panel 155 into a plurality of divided areas with respect to the curved portion L. For example, as illustrated in FIG. 33, the display area A may be divided into two divided areas A1 and A2 with respect to the single curved portion L. When one of the divided areas is defined as a first divided area A1 and the other of the divided areas is defined as a second divided area A2, the second divided area A2 may be rotated by about 180 degrees with respect to the curved portion L as an axis to be disposed backwardly of the first divided area A1.

Subsequently, the screen dividing unit 172 defines the plurality of divided areas as a display divided area and a non-display divided area, respectively, based on the touch information. The screen dividing unit 172 may operate in accordance with FIGS. 9A and 9B. In exemplary embodiments, the display divided area will be represented by reference mark "A1" and the non-display divided area will be represented by reference mark "A2". The display area, as illustrated in FIG. 33, is divided into the display divided area A1 and the non-display divided area A2 by the screen dividing unit 172.

When the curved portion L, the display divided area A1, and the non-display divided area A2 of the touch display panel 155 are defined as in FIG. 33, a driving line scan unit 401 drives at least one of touch sensing elements in the display divided area A1, but stops a driving operation of each of touch sensing elements TS6-TS10, TS16-TS20, TS26-TS30, TS36-TS40, TS46-TS50, and TS56-TS60 in the non-display divided area A2. The driving line scan unit 401 may drive each of the touch sensing elements TS1-TS5, TS11-TS15, TS21-TS25, TS31-TS35, TS41-TS45, and TS51-TS55 in the display divided area A1.

The driving line scan unit 401 applies a driving signal to at least one of the touch sensing elements in the display divided area A1, but applies a driving signal to none of the touch sensing elements TS6-TS10, TS16-TS20, TS26-TS30, TS36-TS40, TS46-TS50, and TS56-TS60 in the non-display divided area A2. The driving operation of the gate lines GL1-GL10 and the data lines DL1-DL14 with respect to FIG. 33 may be the same as the driving operation of the gate lines GL1-GL10 and the data lines DL1-DL14 described with reference to FIG. 10.

When the folded flexible display device 1000 is unfolded back to an original state, the driving line scan unit 401, the gate driver 112, and the data driver 111 perform a driving operation in a normal state. For example, when the flexible display device 1000 in FIG. 8 is unfolded back to an original state, the sixth, sixteenth, twenty-sixth, thirty-sixth, forty-sixth, and fifty-sixth touch sensing elements T6, TS16, TS26, TS36, TS46, and TS56 generate touch sensing signals having values less than or equal to the threshold upper limit. In this case, the timing controller 163 recognizes that the curved portion L is removed based on information from the sensor driver 161 and the touch control unit 170.

Subsequently, the timing controller 163 changes information of the sensor control signal SCS, information of the gate control signal GCS, and information of the data control signal DCS and supplies the changed information to the sensor driver 161, the gate driver 112, and the data driver 111, respectively. The driving line scan unit 401 of the sensor driver 161 drives each of the touch sensing elements TS1-TS60 in the display area A in response to the sensor control signal SCS. For example, the driving line scan unit 401, as illustrated in FIG. 6, outputs first to sixtieth driving signals DS1-DS60, sequentially. Further, the gate driver 112 and the data driver 111 may output gate signals and data signals in FIG. 34.

Figure 34:
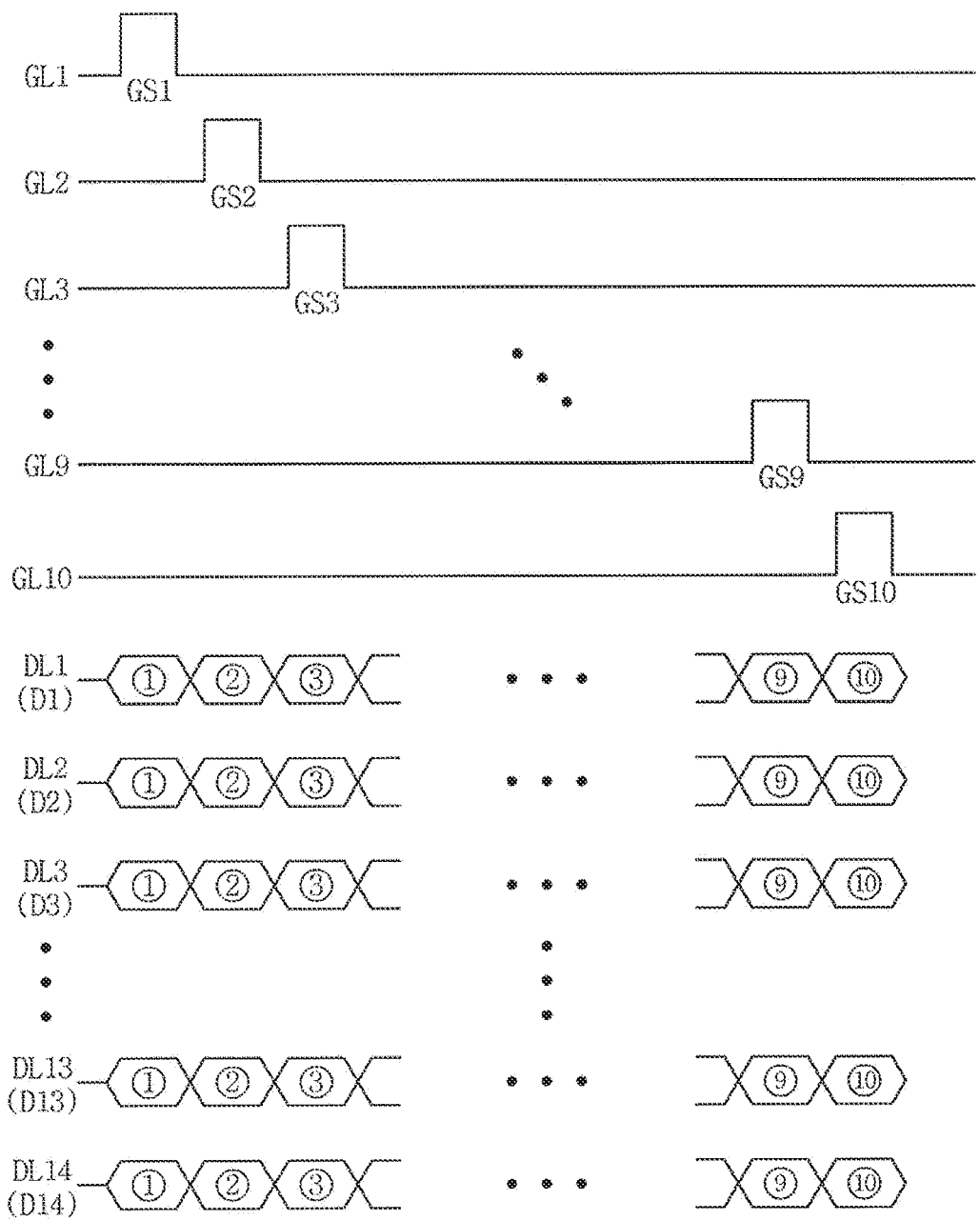
FIG. 34 is a view illustrating waveforms of gate signals and data signals applied to gate lines and data lines when a flexible display device is unfolded into an initial state.

FIG. 34 illustrating examples of waveforms of the gate signals and the data signals that may be applied to the gate lines and the data lines when the flexible display device 1000 is unfolded back to an initial state. The gate driver 112 that receives the gate control signal GCS, as illustrated in FIG. 34, applies the first to tenth gate signals GS1-GS10 to the first to tenth gate lines GL1-GL10 sequentially. The data driver 111 that receives the data control signal DCS, as illustrated in FIG. 34, applies the first to fourteenth image data signals D1-D14 to the first to fourteenth data lines DL1-DL14. Accordingly, an image may be displayed throughout an entire portion of display area A.

In another example, when the flexible display device 1000 in FIG. 33 is unfolded back into an original state, the fifth, fifteenth, twenty-fifth, thirty-fifth, forty-fifth, and fifty-fifth touch sensing elements TS5, TS15, TS25, TS35, TS45, and TS55 adjacent to the curved portion L generate touch sensing signals having values less than or equal to the threshold upper limit. The timing controller 163 recognizes that the curved portion L is removed based on the information from the sensor driver 161 and the touch control unit 170.

Figure 35:
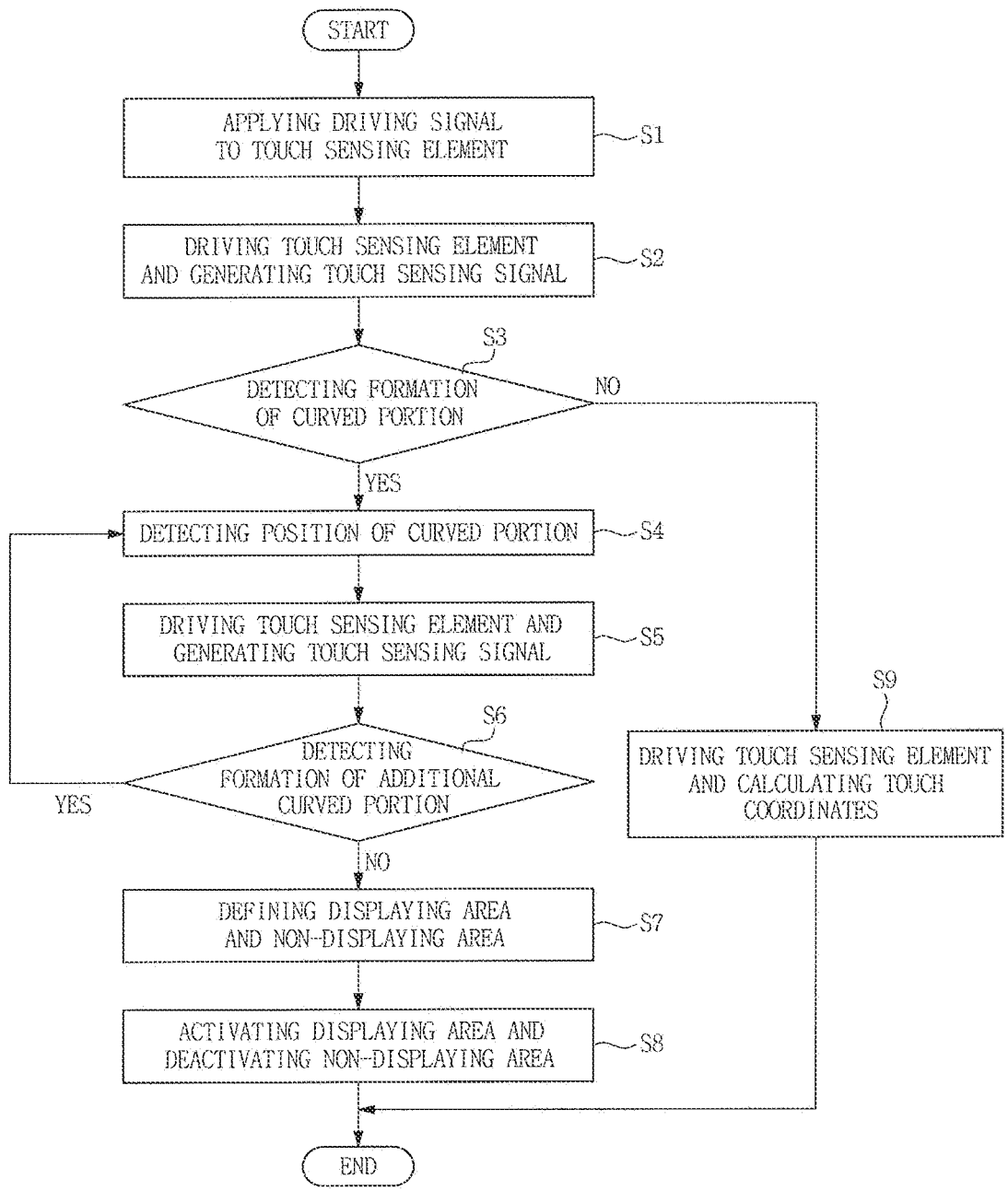
FIG. 35 is a flow diagram illustrating a method of driving a flexible display device according to one exemplary embodiment.

FIG. 35 illustrates operations included in an embodiment of a method for driving a flexible display device 1000. In operation S1, driving signals are applied to touch sensing elements. Next, in operation S2, a pressure is applied to the touch sensing elements and the touch sensing elements generate touch sensing signals.

Subsequently, in operation S3, whether a curved portion L is formed or not in the flexible display device 1000 is detected based on a change in touch sensing signals among the touch sensing elements. For example, when a touch sensing signal applied from at least one touch sensing element is less than a predetermined threshold lower limit, it may be verified that the curved portion L is present. In this regard, the number of touch sensing elements outputting a touch sensing signal having a value smaller than the threshold lower limit (hereinafter, "activated touch sensing elements"), a spatial continuity (or vicinity) among the activated touch sensing elements, or an output timing of the activated touch sensing elements may be further considered in order to detect the presence of the curved portion more accurately. The output timing may refer to an output timing of the touch sensing signals generated from the activated touch sensing elements.

Next, in operation S4, when it is verified that the curved portion L is present in S3, the position of the curved portion L is defined based on the activated touch sensing elements.

Next, in operation S5, a pressure is applied to the touch sensing elements and the touch sensing elements generate touch sensing signals.

Subsequently, in operation S6, whether an additional curved portion L is formed or not in the flexible display device 1000 is verified based on a change in resistance values of the touch sensing elements. Operation S6 may be substantially the same as operation S3.

Subsequently, in operation S7, when it is verified that the additional curved portion L is absent, a display area is divided into a display divided area and a non-display divided area based on the position of the curved portion L calculated in operation S4 and the touch information.

Subsequently, in operation S8, touch sensing elements in the display divided area and the curved portion are driven and a driving operation of touch sensing elements in the non-display area is stopped. Further, an image is displayed in the display divided area and an image is not displayed in the non-display divided area.

In operation S9, when it is verified that the curved portion L is absent in operation S3, the touch sensing elements are driven to calculate touch coordinates of a touch. The touch coordinates may represent a position corresponding to the touch.

In one embodiment, the touch display panel 155 may include another touch panel in addition to touch panel 144. The aforementioned touch panel 144 may be defined as a first touch panel and the other touch panel may be referred to as a second touch panel. The first touch panel 144 may have a configuration, for example, described with reference to FIGS. 1 and 4. The second touch panel may include at least one of a resistive touch sensor and a capacitive touch sensor.

When the first touch panel 144 is on the display panel 133, the second touch panel may be on the first touch panel 144. Further, when the display panel 133 is on the first touch panel 144, the second touch panel may be on the display panel 133. When the touch display panel 155 includes the second touch panel, the touch control unit 170 may generate touch information using the first touch panel 144 and may detect the curved portion L using the second touch panel.

Figure 36:
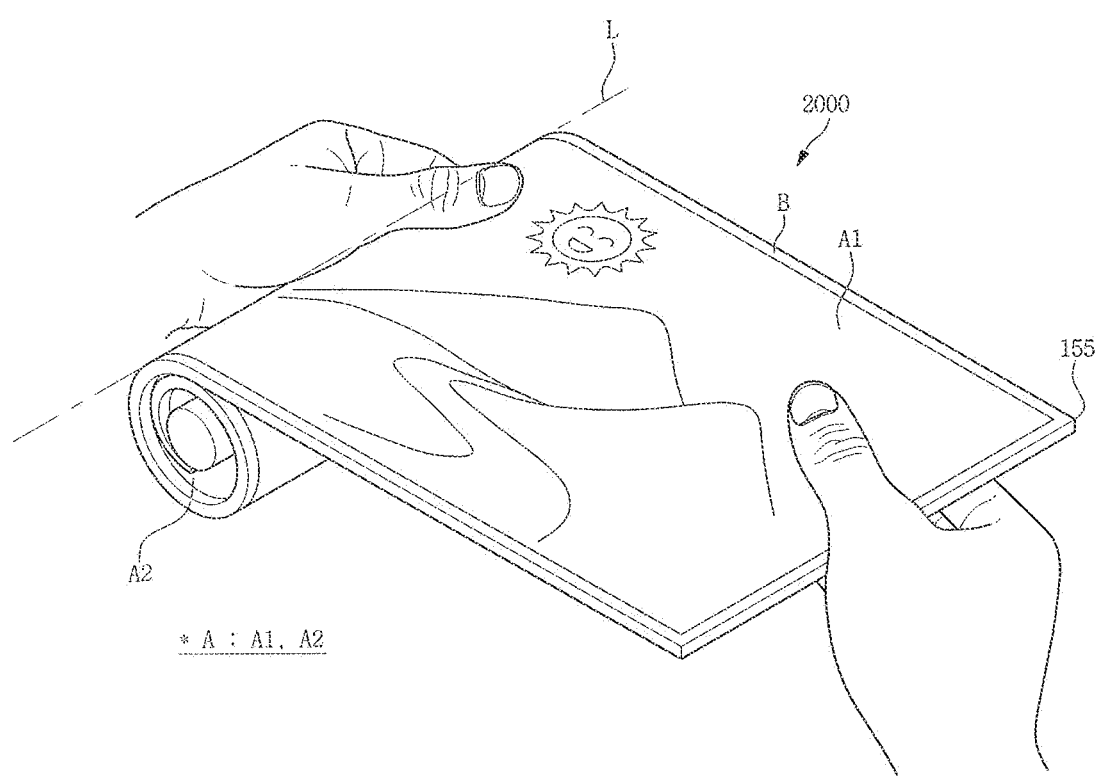
FIG. 36 is a view illustrating a flexible display device according to another exemplary embodiment.

FIG. 36 illustrates another embodiment of a flexible display device 2000 which may have a scroll shape. As illustrated in FIG. 36, a display area A is divided into a display divided area A1 and a non-display divided area A2 with respect to a curved portion L. The display divided area A1 corresponds to a portion of the display area A which is unrolled, and the non-display divided area A2 corresponds to a portion of the display area A which is rolled. The area of a touch which contacts the non-display divided area A2 may be greater than an area of a touch which contacts the display divided area A1.

In FIGS. 13A, 18A, 23A, 26A, 29A, 32A, and 36, an image in the display divided area may be displayed in a smaller size corresponding to the resolution of an original image. For example, when an image displayed on an entire portion of the display area A in the flexible display device 1000 which is unrolled completely (hereinafter, "original image") is to be displayed in the display divided area of FIG. 13A, the original image may be reduced in size. The reduced image differs from the original image in size, but may have the same image ratio. In this case, the reduced image may only be displayed in a portion of the display divided area in FIG. 13A.

In accordance with one or more of the aforementioned embodiments, a flexible display device is provided in which a non-display divided area invisible to a user is deactivated. For example, an image is not displayed in the non-display divided area and a touch sensing element is not driven. Accordingly, power consumption may be reduced and touch errors and privacy invasion may be prevented.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The control units and other processing features described herein may be implemented in logic which, for example, may include hardware, software, or both. When implemented at least partially in hardware, the control units and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the control units and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A flexible display device, comprising:
   a touch display panel comprising a plurality of touch sensors;
   a detector to detect a curved portion of the touch display panel and touch information corresponding to a touch applied to the touch display panel based on a sensing result from the plurality of touch sensors;
   a screen divider to divide a display area of the touch display panel into a plurality of divided areas with respect to the curved portion and to define the divided areas as a display divided area and a non-display divided area, respectively, based on:
      a difference between an area of a touch in the display divided area and an area of a touch in the non-display divided area, and/or
      a difference between a number of touches in the display divided area and a number of touches in the non-display divided area; and
   a panel driver to control the display divided area and the non-display divided area,
   wherein:
   the panel driver is to display an image on at least a portion of the display divided area and not to display an image on the non-display divided area, and
   the panel driver is to drive at least one touch sensor in the display divided area from among the plurality of touch sensors and to stop a driving operation of at least one touch sensor in the non-display divided area from among the plurality of touch sensors.

2. The device as claimed in claim 1, wherein the screen divider is to define:
   one of the divided areas to which a touch of a relatively smaller area is applied as the display divided area, and
   another one of the divided areas to which a touch of a relatively greater area is applied as the non-display divided area.

3. The device as claimed in claim 1, wherein the screen divider is to define:
   one of the divided areas to which a relatively smaller number of touches is applied as the display divided area, and
   another one of the divided areas to which a relatively greater number of touches are applied as the non-display divided area.

4. The device as claimed in claim 1, wherein the detector is to detect:
   the curved portion based on the sensing result from the plurality of touch sensors in a first period, and
   the touch information based on the sensing result from the plurality of touch sensors in a second period.

5. The device as claimed in claim 4, wherein the first period and the second period are included in a single frame.

6. The device as claimed in claim 1, wherein:
   in response to the curved portion being substantially parallel to a gate line of the touch display panel, the panel driver is to drive at least one of gate lines in the display divided area and is to stop a driving operation of each of gate lines in the non-display divided area.

7. The device as claimed in claim 1, wherein:
   in response to the curved portion intersecting each gate line of the touch display panel and intersecting at least one data line of the touch display panel, the panel driver
   is to drive at least one data line that is in the display divided area and that does not intersect the curved portion and
   is to stop a driving operation of each data line in the non-display divided area.

8. The device as claimed in claim 1, wherein:
   in response to the curved portion intersecting each of a plurality of data lines of the touch display panel and intersecting at least one gate line of the touch display panel, the panel driver
   is to drive at least one gate line that is in the display divided area and that does not intersect the curved portion and
   is to stop a driving operation of each gate line in the non-display divided area.

9. The device as claimed in claim 1, wherein the plurality of touch sensors comprises one selected from a resistive touch sensor, a capacitive touch sensor and a force sensor.

10. The device as claimed in claim 9, wherein the force sensor comprises at least one selected from a piezo sensor, a polyvinylidene fluoride sensor and a piezoresistive sensor.

11. The device as claimed in claim 1, wherein the panel driver comprises:
   a gate driver connected to a gate line of the touch display panel;
   a data driver connected to a data line of the touch display panel;
   a sensor driver connected to the plurality of touch sensors;

a timing controller to control a driving operation of the gate driver, the data driver, and the sensor driver based on a detected result from the detector; and a power supplier to generate power for the driving operation of the touch display panel, the gate driver, the data driver, the sensor driver, and the timing controller.

12. A flexible display device, comprising:

a touch display panel comprising a plurality of touch sensors;

a detector to detect a curved portion of the touch display panel and touch information corresponding to a touch applied to the touch display panel based on a sensing result from the plurality of touch sensors;

a screen divider to divide a display area of the touch display panel into a plurality of divided areas with respect to the curved portion and to define the divided areas as a display divided area and a non-display divided area, respectively, based on the touch information; and a panel driver to control the display divided area and the non-display divided area, wherein:

the panel driver is to display an image on at least a portion of the display divided area and not to display an image on the non-display divided area, the panel driver is to drive at least one touch sensor in the display divided area from among the plurality of touch sensors and to stop a driving operation of at least one touch sensor in the non-display divided area from among the plurality of touch sensors, in response to the sensing result from the plurality of touch sensors having a value in a first range, the detector is to detect the touch information based on the sensing result, and in response to the sensing result from the plurality of touch sensors having a value in a second range, the detector is to detect the curved portion based on the sensing result.

13. The device as claimed in claim 1, wherein:

in response to the curved portion being substantially parallel to a data line of the touch display panel, the panel driver is to drive at least one data line in the display divided area and is to stop a driving operation of each data line in the non-display divided area.

14. The device as claimed in claim 12, wherein the screen divider divides the display area of the touch display panel into the plurality of divided areas with respect to the curved portion and defines the divided areas as the display divided area and the non-display divided area, respectively, based on a difference between the touch information corresponding to the divided areas.

15. A flexible display device, comprising:

a touch display panel comprising a plurality of touch sensors;

a detector to detect a curved portion of the touch display panel and touch information corresponding to a touch applied to the touch display panel based on a sensing result from the plurality of touch sensors;

a screen divider to divide a display area of the touch display panel into a plurality of divided areas with respect to the curved portion and to define the divided areas as a display divided area and a non-display divided area, respectively, based on the touch information; and a panel driver to control the display divided area and the non-display divided area, wherein:

the panel driver is to display an image on at least a portion of the display divided area and not to display an image on the non-display divided area, the panel driver is to drive at least one touch sensor in the display divided area from among the plurality of touch sensors and to stop a driving operation of at least one touch sensor in the non-display divided area from among the plurality of touch sensors, the panel driver is to display a first image in the display divided area that is smaller than a second image that the panel driver is to display in an entire portion of the display area, and the first image has a same image ratio as the second image.

16. The device as claimed in claim 1, further comprising a roller surrounded by the touch display panel.

17. The device as claimed in claim 16, wherein the touch display panel has a scroll shape.

18. The device as claimed in claim 17, wherein a position of the curved portion changes as the touch display panel is wound or unwound.

* * * * *